US012663654B2

(12) United States Patent
Davidson

(10) Patent No.: US 12,663,654 B2
(45) Date of Patent: Jun. 23, 2026

(54) POSITIONING, STABILISING, AND INTERFACING STRUCTURES AND SYSTEM INCORPORATING SAME

(71) Applicant: ResMed Pty Ltd, Bella Vista (AU)

(72) Inventor: Aaron Samuel Davidson, Sydney (AU)

(73) Assignee: ResMed Pty Ltd, Bella Vista (AU)

( * ) Notice: Subject to any disclaimer, the term of this patent is extended or adjusted under 35 U.S.C. 154(b) by 0 days.

(21) Appl. No.: 18/845,275

(22) PCT Filed: Mar. 10, 2023

(86) PCT No.: PCT/AU2023/050167
§ 371 (c)(1),
(2) Date: Sep. 9, 2024

(87) PCT Pub. No.: WO2023/168494
PCT Pub. Date: Sep. 14, 2023

(65) Prior Publication Data
US 2025/0180915 A1 Jun. 5, 2025

(30) Foreign Application Priority Data
Mar. 10, 2022 (AU) ................................. 2022900581

(51) Int. Cl.
*G02B 27/01* (2006.01)

(52) U.S. Cl.
CPC ..... *G02B 27/0176* (2013.01); *G02B 27/0179* (2013.01)

(58) Field of Classification Search
CPC ............ G02B 27/0176; G02B 27/0179; G02B 2027/0152; G02B 2027/0158; G02B 2027/015; G02B 2027/0154
See application file for complete search history.

(56) References Cited

U.S. PATENT DOCUMENTS 10,739,600 B1 8/2020 Yee
11,480,801 B1 * 10/2022 Morris ............... G02B 27/0176
(Continued)

FOREIGN PATENT DOCUMENTS

WO 2021/137766 A1 7/2021
WO 2021/189096 A1 9/2021
WO 2021/189114 A1 9/2021

OTHER PUBLICATIONS

Written Opinion of the ISA for International Application No. PCT/AU2023/050167, six pages, dated May 30, 2023.
(Continued)

*Primary Examiner* — Xuemei Zheng
(74) *Attorney, Agent, or Firm* — Nixon & Vanderhye P.C.

(57) ABSTRACT

A head-mounted display system, comprising a head-mounted display unit comprising a display, a positioning and stabilising structure structured and arranged to hold the head-mounted display unit in an operational position over a user's face in use; an interfacing structure constructed and arranged to be in opposing relation with the user's face, the interfacing structure comprising a face engaging portion configured to contact the user's face; and a shroud. The shroud comprises a frame, comprising a posterior portion connected to the face engaging portion, an anterior portion defining a viewing opening through which the display may be viewed in use; and a radially outward facing light-blocking surface extending between the posterior portion and the anterior portion.

24 Claims, 50 Drawing Sheets

(56)          References Cited

U.S. PATENT DOCUMENTS

| | | | |
|---|---|---|---|
| 2017/0192198 A1 | 7/2017 | Bristol et al. | |
| 2020/0233453 A1* | 7/2020 | Hatfield | G06F 3/011 |
| 2023/0229008 A1* | 7/2023 | Jo | G02B 27/017 |
| | | | 359/630 |
| 2024/0184121 A1* | 6/2024 | Bosch | G02B 27/0149 |
| 2024/0192511 A1* | 6/2024 | Wang | G06F 1/163 |

OTHER PUBLICATIONS

International Search Report for International Application No. PCT/AU2023/050167, eight pages, dated May 30, 2023.

* cited by examiner

Nasal cavity

Nasal bone

Lateral nasal cartilage

Greater alar cartilage

Nostril

Lip superior

Lip inferior

Hard palate

Soft palate

Oropharynx

Tongue

Epiglottis

Vocal folds

Larynx

Esophagus

Trachea

Coronal plane

Frankfort horizontal

Nasolabial angle

Superior

Posterior

Anterior

Inferior

Frontal sinus

Nasal bone

Septum cartilage

Medial crus of greater alar cartilage

Anterior nasal spine

Frontal process of maxilla

Lesser alar cartilage

Fibrofatty tissue

Epidermis

Adipose tissue

Nasal bone

Lateral cartilage

Septum cartilage

Greater alar cartilage

Parietal bone

Temporal bone

Occipital bone

Trapezius m.

Frontal bone

Sphenoid bone

Nasal bone

Zygomatic bone

Maxilla

Masseter m.

Mandible

Mental protuberance

Digastricus m.

Sternocleidomastoid m.

Concha

Frontal bone

Supraorbital
foramen

Nasal bones

Septal cartilage

Lateral cartilage

Sesamoid
cartilage

Greater alar
cartilage

Medial crus
of greater alar
cartilage

Anterior nasal spine

Infraorbital
foramen

Lesser nasal
cartilage

Alar fibrofatty
tissue

Septal cartilage

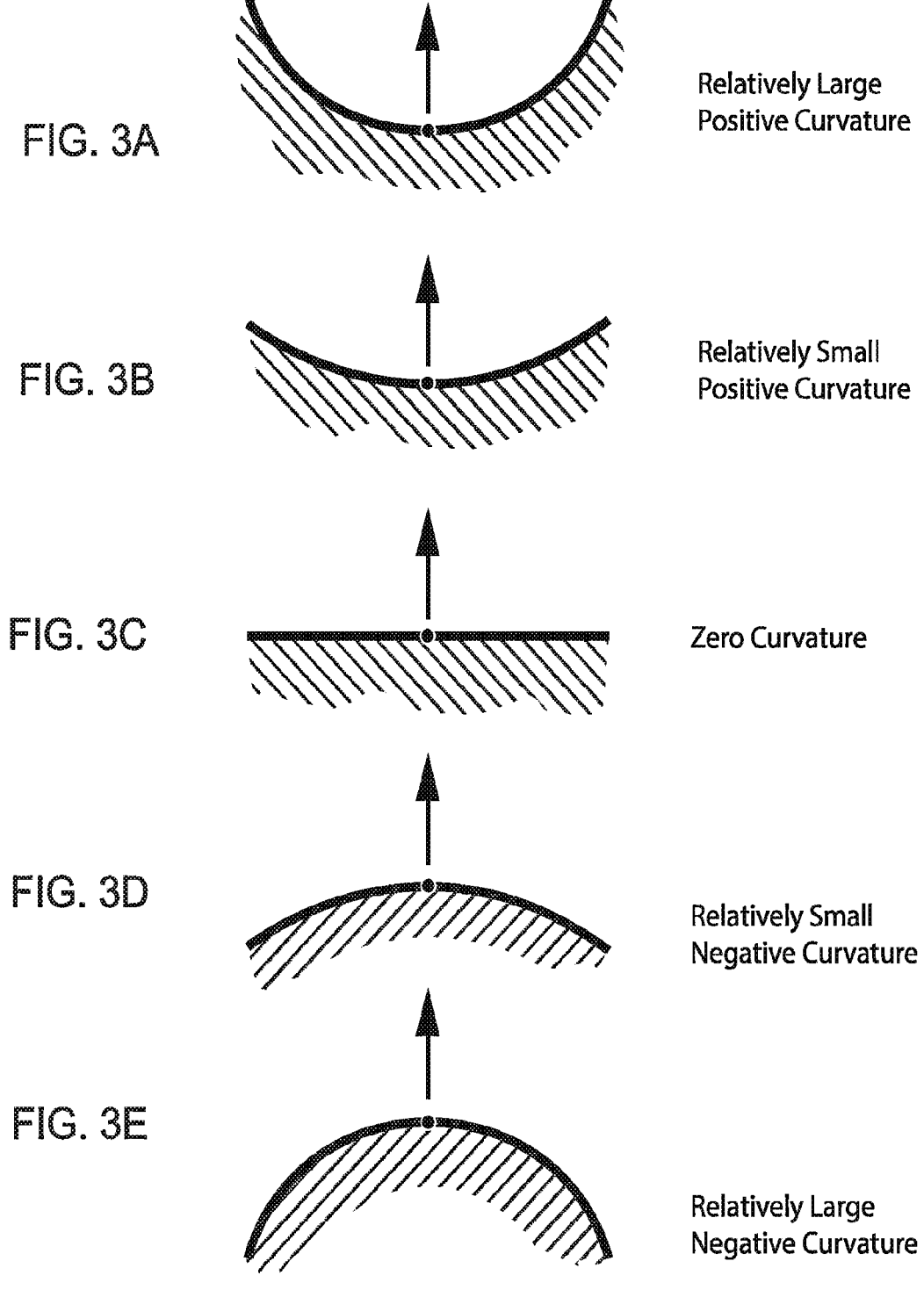
FIG. 3A          Relatively Large
Positive Curvature
FIG. 3B          Relatively Small
Positive Curvature
FIG. 3C          Zero Curvature
FIG. 3D          Relatively Small
Negative Curvature
FIG. 3E          Relatively Large
Negative Curvature

Left-hand rule
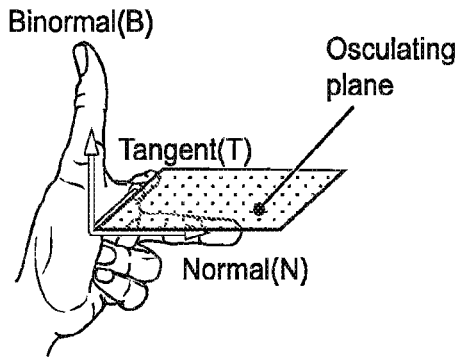
FIG. 3K
Right-hand rule
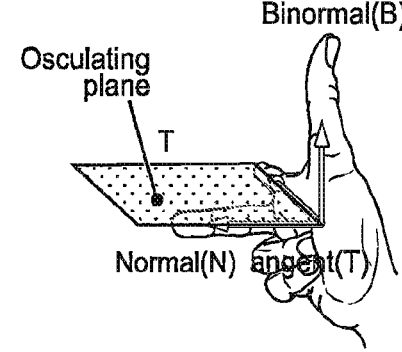
FIG. 3L
Left ear helix
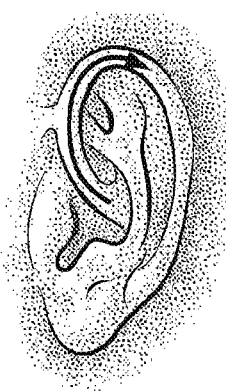
FIG. 3M
Right ear helix
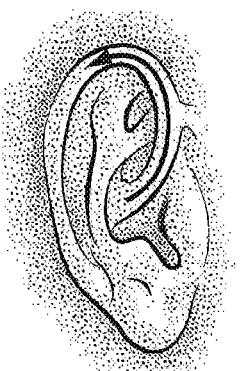
FIG. 3N
Right-hand helix
Right-hand positive
FIG. 3O

POSITIONING, STABILISING, AND INTERFACING STRUCTURES AND SYSTEM INCORPORATING SAME

1 CROSS-REFERENCE TO RELATED APPLICATIONS

This application is the U.S. national phase of International Application No. PCTAU2023/050167 filed Mar. 10, 2023 which designated the U.S. and claims priority to AU 2022900581 filed Mar. 10, 2022, the entire contents of each of which are hereby incorporated by reference.

2 BACKGROUND OF THE TECHNOLOGY

2.1 Field of the Technology

The present technology relates generally to head mounted displays, positioning and stabilizing structures, user interfacing structures, and other components for use in head mounted displays, associated head-mounted display assemblies and systems including a display unit and positioning and stabilizing structure, interfacing structures and or components, and methods. The present technology finds particular application in the use of immersive reality head mounted displays and is herein described in that context. It is to be appreciated that the present technology may have broader application and may be used in any type of head-mounted display arrangement including, but not limited to, virtual reality displays, augmented reality displays, and/or mixed reality displays.

2.2 Description of the Related Art

It is to be understood that, if any prior art is referred to herein, such reference does not constitute an admission that the prior art forms a part of the common general knowledge in the art, in Australia or any other country.

2.2.1 Immersive Technology

An immersive technology refers to technology that attempts to replicate or augment a physical environment through the means of a digital or virtual environment by creating a surrounding sensory feeling, thereby creating a sense of immersion.

In particular, an immersive technology provides the user visual immersion, and creates virtual objects and/or a virtual environment. The immersive technology may also provide immersion for at least one of the other five senses.

2.2.2 Virtual Reality

Virtual reality (VR) is a computer-generated three-dimensional image or environment that is presented to a user. In other words, the environment may be entirely virtual. Specifically, the user observes an electronic screen in order to observe virtual or computer generated images in a virtual environment. Since the created environment is entirely virtual, the user may be blocked and/or obstructed from interacting with their physical environment (e.g., they may be unable to hear and/or see the physical objects in the physical environment that they are currently located).

The electronic screen may be supported in the user's line of sight (e.g., mounted to the user's head). While observing the electronic screen, visual feedback output by the electronic screen and observed by the user may produce a virtual environment intended to simulate an actual environment. For example, the user may be able to look around (e.g., 360°) by pivoting their head or their entire body, and interact with virtual objects observable by the user through the electronic screen. This may provide the user with an immersive experience where the virtual environment provides stimuli to at least one of the user's five senses, and replaces the corresponding stimuli of the physical environment while the user uses the VR device. Typically, the stimuli relates at least to the user's sense of sight (i.e., because they are viewing an electronic screen), but other senses may also be included. The electronic screens are typically mounted to the user's head so that they may be positioned in close proximity to the user's eyes, which allows the user to easily observe the virtual environment.

The VR device may produce other forms of feedback in addition to, or aside from, visual feedback. For example, the VR device may include and/or be connected to a speaker in order to provide auditory feedback. The VR device may also include tactile feedback (e.g., in the form of haptic response), which may correspond to the visual and/or auditory feedback. This may create a more immersive virtual environment, because the user receives stimuli corresponding to more than one of the user's senses.

While using a VR device, a user may wish to limit or block ambient stimulation. For example, the user may want to avoid seeing and/or hearing the ambient environment in order to better process stimuli from the VR device in the virtual environment. Thus, VR devices may limit and/or prevent the user's eyes from receiving ambient light. In some examples, this may be done by providing a seal against the user's face. In some examples, a shield may be disposed proximate to (e.g., in contact or close contact with) the user's face, but may not seal against the user's face. In either example, ambient light may not reach the user's eyes, so that the only light observable by the user is from the electronic screen.

In other examples, the VR devices may limit and/or prevent the user's ears from hearing ambient noise. In some examples, this may be done by providing the user with headphones (e.g., noise cancelling headphones), which may output sounds from the VR device and/or limit the user from hearing noises from their physical environment. In some examples, the VR device may output sounds at a volume sufficient to limit the user from hearing ambient noise.

In any example, the user may not want to become overstimulated (e.g., by both their physical environment and the virtual environment). Therefore, blocking and/or limiting the ambient from stimulating the user assists the user in focusing on the virtual environment, without possible distractions from the ambient.

Different types of VR devices are described below. Generally, a single VR device may include at least two different classifications. For example, the VR device may be classified by its portability and by how the display unit is coupled to the rest of the interface. These classifications may be independent, so that classification in one group (e.g., the portability of the unit) does not predetermine classification into another group. There may also be additional categories to classify VR devices, which are not explicitly listed below.

2.2.2.1 Portability

2.2.2.1.1 Fixed Unit

In some forms, a VR device may be used in conjunction with a separate device, like a computer or video game console. This type of VR device may be fixed, since it cannot be used without the computer or video game console, and thus locations where it can be used are limited (e.g., by the location of the computer or video game console).

Since the VR device can be used in conjunction with the computer or video game console, the VR device may be connected to the computer or video game console. For example, an electrical cord may tether the two systems together. This may further "fix" the location of the VR device, since the user wearing the VR device cannot move further from the computer or video game console than the length of the electrical cord. In other examples, the VR device may be wirelessly connected (e.g., via Bluetooth, Wi-Fi, etc.), but may still be relatively fixed by the strength of the wireless signal.

The connection to the computer or video game console may provide control functions to the VR device. The controls may be communicated (i.e., through a wired connector or wirelessly) in order to help operate the VR device. In examples of a fixed unit VR device, these controls may be necessary in order to operate the display screen, and the VR device may not be operable without the connection to the computer or video game console.

In some forms, the computer or video game console may provide electrical power to the VR device, so that the user does not need to support a battery on their head. This may make the VR device more comfortable to wear, since the user does not need to support the weight of a battery.

The user may also receive outputs from the computer or video game console at least partially through the VR device, as opposed to through a television or monitor, which may provide the user with a more immersive experience while using the computer or video game console (e.g., playing a video game). In other words, the display output of the VR device may be substantially the same as the output from a computer monitor or television. Some controls and/or sensors necessary to output these images may be housed in the computer or video game console, which may further reduce the weight that the user is required to support on their body.

In some forms, movement sensors may be positioned remote from the VR device, and connected to the computer or video game console. For example, at least one camera may face the user in order to track movements of the user's head. The processing of the data recorded by the camera(s) may be done by the computer or video game console, before being transmitted to the VR device. While this may assist in weight reduction of the VR device, it may also further limit where the VR device can be used. In other words, the VR device must be in the sight line of the camera(s).

2.2.2.1.2 Portable Unit

In some forms, the VR device may be a self-contained unit, which includes a power source and sensors, so that the VR device does not need to be connected to a computer or video game console. This provides the user more freedom of use and movement. For example, the user is not limited to using the VR device near a computer or video game console, and could use the VR device outdoors, or in other environments that do not include computers or televisions.

Since the VR device is not connected to a computer or video game console in use, the VR device is required to support all necessary electronic components. This includes batteries, sensors, and processors. These components add weight to the VR device, which the user must support on their body. Appropriate weight distribution may be needed so that this added weight does not increase discomfort to a user wearing the VR device.

In some forms, the electrical components of the VR device are contained in a single housing, which may be disposed directly in front of the user's face, in use. This configuration may be referred to as a "brick." In this configuration, the center of gravity of the VR device without the positioning and stabilizing structure is directly in front of the user's face. In order to oppose the moment created by the force of gravity, the positioning and stabilizing structure coupled to the brick configuration must in provide a force directed into the user's face, for example created by tension in headgear straps. While the brick configuration may be beneficial for manufacturing (e.g., since all electrical components are in close proximity) and may allow interchangeability of positioning and stabilizing structures (e.g., because they include no electrical connections), the force necessary to maintain the position of the VR device (e.g. tensile forces in headgear) may be uncomfortable to the user. Specifically, the VR device may dig into the user's face, leading to irritation and markings on the user's skin. The combination of forces may feel like "clamping" as the user's head receives force from the display housing on their face and force from headgear on the back of their head. This may make a user less likely to wear the VR device.

As VR and other mixed reality devices may be used in a manner involving vigorous movement of the user's head and/or their entire body (for example during gaming), there may be significant forces/moments tending to disrupt the position of the device on the user's head. Simply forcing the device more tightly against the user's head to tolerate large disruptive forces may not be acceptable as it may be uncomfortable for the user or become uncomfortable after only a short period of time.

In some forms, electrical components may be spaced apart throughout the VR device, instead of entirely in front of the user's face. For example, some electrical components (e.g., the battery) may be disposed on the positioning and stabilizing structure, particularly on a posterior contacting portion. In this way, the weight of the battery (or other electrical components) may create a moment directed in the opposite direction from the moment created by the remainder of the VR device (e.g., the display). Thus, it may be sufficient for the positioning and stabilizing structure to apply a lower clamping force, which in turn creates a lower force against the user's face (e.g., fewer marks on their skin). However, cleaning and/or replacing the positioning and stabilizing structure may be more difficult in some such existing devices because of the electrical connections.

In some forms, spacing the electrical components apart may involve positioning some of the electrical components separate from the rest of the VR device. For example, a battery and/or a processor may be electrically connected, but carried separately from the rest of the VR device. Unlike in the "fixed units" described above, the battery and/or processor may be portable, along with the remainder of the VR device. For example, the battery and/or the processor may be carried on the user's belt or in the user's pocket. This may provide the benefit of reduced weight on the user's head, but would not provide a counteracting moment. The tensile force provided by the positioning and stabilizing structure may still be less than the "brick" configuration, since the total weight supported by the head is less.

2.2.2.2 Display Connection

2.2.2.2.1 Integrated Display Screen

In some forms, the display screen is an integral piece of the VR device, and generally cannot be detached or removed from the rest of the VR device.

The display screen may be fixed within a housing, and protected from damage. For example, the display screen may be completely covered by the housing, which may reduce the occurrence of scratches. Additionally, integrating display screen with the rest of the VR device eliminates the occurrence of losing the display screen.

In these forms, the display screen functions purely as an immersive technology display. The vast majority of "fixed units" will include an integrated display screen. "Portable units" may include an integrated display screen, or may include a removable display screen (described below).

2.2.2.2.2 Removable Display Screen

In some forms, the display screen is a separate structure that can be removed from the VR device, and used separately.

In some forms, a portable electronic device (e.g., a cell phone) may be selectively inserted into a housing of the VR device. The portable electronic device may include most or all of the sensors and/or processors, and may create a virtual environment through a downloadable app.

Portable electronic devices are generally light weight, and may not require the positioning and stabilizing structure to apply a large force to the user's head.

2.2.3 Augmented Reality

In some forms, augmented reality (AR) is a computer-generated three-dimensional image or environment that is presented to a user.

While similar to VR, AR differs in that the virtual environment created at least in part by the electronic screen is observed in combination with the user's physical environment. In other words, AR creates virtual objects in order to alter and/or enhance the user's physical environment with elements of a virtual environment. The result of AR is a combined environment that includes physical and virtual objects, and therefore an environment that is both physical and virtual.

For example, images created by the electronic screen may be overlayed into the user's physical environment. Only a portion of an AR combination environment presented to the user includes virtual objects. Thus, the user may wish to continue to receive ambient stimulation from their physical environment while using an AR device (e.g., in order to continue to observe the physical or non-virtual component of the combination environment).

Since AR may be used with the user's physical environment, an AR device may not be electrically connected, or otherwise tethered, to a computer or video game console. Instead the AR device may include a battery, or other power source. This may provide the user with the greatest freedom of movement, so that they can explore a variety of physical environments while using the AR device.

This key difference between VR and AR may lead to different types of wearable electronic screens. As described above, a user of a VR device may wish to block ambient light, so the housing of the electronic screen may be opaque in order to limit or prevent ambient light from reaching the user. However, the user of an AR device may want to see the virtual environment blended with their actual environment. The electronic screen in an AR device may be similarly supported in front of the user's eyes, but, screens in AR devices may be transparent or translucent, and the screens may not be supported by an opaque housing (or opaque material may not substantially obstruct the user's line of sight). This may allow the user to continue receiving ambient stimulation, where the virtual environment is simultaneously present. Notwithstanding, some VR devices that do not have a transparent screen through which the user can see their real world surroundings may be configurable for AR by acquiring real-time video of the user's real-world surroundings from the user's perspective (e.g. with cameras on the display housing) and displaying it on the display screen.

Additionally, a person using an AR device may be more mobile than a person using a VR device (e.g., because an AR user can see their physical environment and/or are not tethered to a computer or video game console). Thus, a person using an AR device may wish to wear the device for an extended period of time, while also moving around (e.g., walking, running, biking, etc.). Including components, like batteries, on the AR device may make the AR device uncomfortable for the user's head and/or neck, and may discourage the user from wearing the AR device for long periods of time.

2.2.4 Mixed Reality

Mixed reality (MR) is similar to AR but may be more immersive because the MR device may provide the user more ways to interact with virtual objects or environment than an AR device. The virtual reality in MR may also be overlayed and/or blended with the user's physical environment. Unlike AR however, a user may be able to interact with the virtual environment akin to what occurs in VR. In other words, while AR may present only a computer generated image in the physical environment, MR may present the user with the same or similar computer generated image but allow for interaction with the image in the physical environment (e.g., using a hand to "grab" an object produced virtually). Thus, the virtual environment may further merge with a physical environment so that the combined environment better replicates an actual environment.

2.2.5 Head-Mounted Display Interface

A head-mounted display interface enables a user to have an immersive experience of a virtual environment and have broad application in fields such as communications, training, medical and surgical practice, engineering, and video gaming.

Different head-mounted display interfaces can each provide a different level of immersion. For example, some head-mounted display interfaces can provide the user with a total immersive experience. One example of a total immersive experience is virtual reality (VR). The head-mounted display interface can also provide partial immersion consistent with using an AR device.

VR head-mounted display interfaces typically are provided as a system that includes a display unit which is arranged to be held in an operational position in front of a user's face. The display unit typically includes a housing containing a display and a user interface structure constructed and arranged to be in opposing relation with the user's face. The user interface structure may extend about the display and define, in conjunction with the housing, a viewing opening to the display. The user interfacing structure may engage with the face and include a cushion for user comfort and/or be light sealing to block ambient light from the display. The head-mounted display system further comprises a positioning and stabilizing structure that is disposed on the user's head to maintain the display unit in position.

Other head-mounted display interfaces can provide a less than total immersive experience. In other words, the user can experience elements of their physical environment, as well as a virtual environment. Examples of a less than total immersive experience are augmented reality (AR) and mixed reality (MR).

AR and/or MR head-mounted display interfaces are also typically provided as a system that includes a display unit which is arranged to be held in an operational position in front of a user's face. Likewise, the display unit typically includes a housing containing a display and a user interface structure constructed and arranged to be in opposing relation with the user's face. The head-mounted display system of the AR and/or MR head-mounted display is also similar to VR in that it further comprises a positioning and stabilizing structure that is disposed on the user's head to maintain the display unit in position. However, AR and/or MR head-mounted displays do not include a cushion that totally seals ambient light from the display, since these less than total immersive experience require an element of the physical environment. Instead, head-mounted displays in augmented and/or mixed allow the user to see the physical environment in combination with the virtual environment.

In any types of immersive technology, it is important that the head-mounted display interface is comfortable in order to allow the user to wear the head-mounted display for extended periods of time. Additionally, it is important that the display is able to provide changing images with changing position and/or orientation of the user's head in order to create an environment, whether partially or entirely virtual, that is similar to or replicates one that is entirely physical.

2.2.5.1 Interfacing Structure

The head-mounted displays may include a user interfacing structure. Since it is in direct contact with the user's face, the shape and configuration of the interfacing portion can have a direct impact on the effectiveness and comfort of the display unit.

The design of a user interfacing structure presents a number of challenges. The face has a complex three-dimensional shape. The size and shape of noses and heads varies considerably between individuals. Since the head includes bone, cartilage and soft tissue, different regions of the face respond differently to mechanical forces.

One type of interfacing structure extends around the periphery of the display unit and is intended to seal against the user's face when force is applied to the user interface with the interfacing structure in confronting engagement with the user's face. The interfacing structure may include a pad made of a polyurethane (PU). With this type of interfacing structure, there may be gaps between the interfacing structure and the face, and additional force may be required to force the display unit against the face in order to achieve the desired contact.

The regions not engaged at all by the user interface may allow gaps to form between the facial interface and the user's face through which undesirable light pollution may ingress into the display unit (e.g., particularly when using virtual reality). The light pollution or "light leak" may decrease the efficacy and enjoyment of the overall immersive experience for the user. In addition, previous systems may be difficult to adjust to enable application for a wide variety of head sizes. Further still, the display unit and associated stabilizing structure may often be relatively heavy and may be difficult to clean which may thus further limit the comfort and useability of the system.

Another type of interfacing structure incorporates a flap seal of thin material positioned about a portion of the periphery of the display unit so as to provide a sealing action against the face of the user. Like the previous style of interfacing structure, if the match between the face and the interfacing structure is not good, additional force may be required to achieve a seal, or light may leak into the display unit in-use. Furthermore, if the shape of the interfacing structure does not match that of the user, it may crease or buckle in-use, giving rise to undesirable light penetration.

A user interface may be partly characterised according to the design intent of where the interfacing structure is to engage with the face in-use. Some interfacing structures may be limited to engaging with regions of the user's face that protrude beyond the arc of curvature of the face engaging surface of the interfacing structure. These regions may typically include the user's forehead and cheek bones. This may result in user discomfort at localised stress points. Other facial regions may not be engaged at all by the interfacing structure or may only be engaged in a negligible manner that may thus be insufficient to increase the translation distance of the clamping pressure. These regions may typically include the sides of the user's face, or the region adjacent and surrounding the users nose. To the extent to which there is a mismatch between the shape of the users' face and the interfacing structure, it is advantageous for the interfacing structure or a related component to be adaptable in order for an appropriate contact or other relationship to form.

2.2.5.2 Positioning and Stabilizing

To hold the display unit in its correct operational position, the head-mounted display system further comprises a positioning and stabilizing structure that is disposed on the user's head. These structures may be responsible for providing forces to counter gravitational forces of the head-mounted display and/or interfacing structure. In the past these structures have been formed from expandable rigid structures that are typically applied to the head under tension to maintain the display unit in its operational position. Such systems have been prone to exert a clamping pressure on the user's face which can result in user discomfort at localised stress points. Also, previous systems may be difficult to adjust to allow wide application head sizes. Further, the display unit and associated stabilizing structure are often heavy, difficult to clean which further limit the comfort and useability of the system.

Certain other head mounted display systems may be functionally unsuitable for the present field. For example, positioning and stabilizing structures designed for ornamental and visual aesthetics may not have the structural capabilities to maintain a suitable pressure around the face. For example, an excess of clamping pressure may cause discomfort to the user, or alternatively, insufficient clamping pressure on the users' face may not effectively seal the display from ambient light.

Certain other head mounted display systems may be uncomfortable or impractical for the present technology. For example, if the system is used for prolonged time periods.

As a consequence of these challenges, some head mounted displays suffer from being one or more of obtrusive, aesthetically undesirable, costly, poorly fitting, difficult to use, and uncomfortable especially when worn for long periods of time or when a user is unfamiliar with a system. Wrongly sized positioning and stabilizing structures can give rise reduced comfort and in turn, shortened periods of use.

Therefore, an interfacing portion of a user interface used for the fully immersive experience of a virtual environment are subject to forces corresponding to the movement of a user during the experience.

2.2.5.3 Materials

Materials used in head mounted display assemblies have included dense foams for contacting portions in the interfacing structures, rigid shells for the housings, and positioning and stabilizing structures formed from rigid plastic clamping structures. These materials have various drawbacks including not permitting the skin covered by the material to breath, being inflexible, difficult to clean and to prone trapping bacteria. As a result, products made with such material may be uncomfortable to wear for extended periods of time, causes skin irritation in some individuals and limit the application of the products.

3 BRIEF SUMMARY OF THE TECHNOLOGY

The present technology may be directed toward providing positioning and stabilizing structures used in the supporting, stabilizing, mounting, utilizing, and/or securing of a head-mounted display having one or more of improved comfort, cost, efficacy, ease of use and manufacturability.

A first aspect of the present technology relates to apparatuses used in the supporting, stabilizing, mounting, utilizing, and/or securing of a head-mounted display.

Another aspect of the present technology relates to methods used in the supporting, stabilizing, mounting, utilizing, and/or securing of a head-mounted display.

Another aspect is a positioning and stabilizing structure for a head-mounted display that comprises a rear (or posterior) support structure (or portion) arranged, in use, to contact a posterior region of the user's head.

In some forms, the posterior support portion or at least a portion thereof is disposed posterior of the otobasion superior of the user.

In some forms, the posterior support portion is biased into contact with the occipital region of the user.

In some forms, the positioning and stabilizing structure further comprises opposing connectors that are disposed on opposing sides of, and extending along the temporal regions of, the user's head to interconnect the posterior support portion to the head-mounted display unit. In some forms the positioning and stabilising structure comprises an anterior support portion connecting the posterior support portion to the head-mounted display unit.

The present technology may also be directed toward providing interfacing structures used in the supporting, cushioning, stabilizing, positioning, and/or sealing a head-mounted display in opposing relation with the user's face.

Another aspect relates to apparatuses used in the supporting, cushioning, stabilizing, positioning, and/or sealing a head-mounted display in opposing relation with the user's face.

Another aspect relates to methods used in supporting, cushioning, stabilizing, positioning, and/or sealing a head-mounted display in opposing relation with the user's face.

Another aspect of the present technology relates to a head-mounted display system, comprising:

a head-mounted display unit comprising a display;

a positioning and stabilising structure structured and arranged to hold the head-mounted display unit in an operational position over a user's face in use; and an interfacing structure constructed and arranged to be in opposing relation with the user's face, the interfacing structure comprising a face engaging portion configured to contact the user's face;

a shroud comprising:

a frame, comprising:

a posterior portion connected to the face engaging portion; and an anterior portion defining a viewing opening through which the display may be viewed in use; and a radially outward facing light-blocking surface extending between the posterior portion and the anterior portion.

Another aspect of the present technology relates to a head-mounted display system, comprising:

a head-mounted display unit comprising a display;

a positioning and stabilising structure structured and arranged to hold the head-mounted display unit in an operational position over a user's face in use;

an interfacing structure constructed and arranged to be in opposing relation with the user's face, the interfacing structure comprising a face engaging portion configured to contact the user's face;

a skeletal frame comprising:

a posterior portion connected to the face engaging portion;

an anterior portion defining a viewing opening through which the display may be viewed in use;

a support structure between the posterior portion and the anterior portion, comprising a plurality of openings; and a shroud provided to and covering at least superior and lateral portions of the skeletal frame.

In examples:

the anterior portion of the skeletal frame comprises a superior portion and an inferior portion;

the posterior portion of the skeletal frame comprises a forehead portion crossing the sagittal plane of the user's head in use, and a pair of lateral portions extending from the forehead portion in an inferior direction;

the lateral portions are connected to the inferior portion of the anterior portion of the skeletal frame; and/or each lateral portion comprises a superior lateral portion and an inferior lateral portion.

In examples:

the skeletal frame comprises at least one strut extending between the posterior portion and the anterior portion;

the at least one strut of the skeletal frame comprises at least one superior strut;

the skeletal frame comprises a first superior strut and a second superior strut; and/or the first superior strut and the second superior strut are laterally offset on opposing sides of a sagittal plane of the user's head in use.

In examples:

the skeletal frame comprises a central superior strut substantially aligned with the sagittal plane of the user's head in use;

the skeletal frame comprises a first angled strut extending from a position proximal the central superior strut at the posterior portion to a position laterally offset from the central superior strut at the anterior portion; and/or the skeletal frame comprises a second angled strut extending from a position proximal the central superior strut at the posterior portion to a position laterally offset from the central superior strut at the anterior portion away from the first angled strut.

In examples:

at least one of the superior struts may be configured to pivot relative to at least one of the posterior portion and the anterior portion of the skeletal frame;

pivoting of the at least one of the superior struts may be achieved by way of a flexible connection;

at least one of the superior struts may comprise a flexible connection to one of the posterior portion and the anterior portion of the skeletal frame;

at least one of the superior struts may comprise a flexible connection to both the posterior portion and the anterior portion of the skeletal frame;

at least one of the superior struts may comprise a flexible connection to the posterior portion and a relatively inflexible connection to the anterior portion of the skeletal frame; and/or at least one of the superior struts may comprise a flexible connection to the anterior portion and a relatively inflexible connection to the posterior portion of the skeletal frame.

In examples:

at least one of the superior struts may comprise a flexible portion and a rigidising portion;

one or more portions of the skeletal frame may have a different rigidity to one or more other portions of the skeletal frame;

the anterior portion of the skeletal frame may have a greater rigidity than at least a portion of the posterior portion of the skeletal frame;

the anterior portion of the skeletal frame may have a greater rigidity than the forehead portion and the lateral portions of the posterior portion of the skeletal frame; and/or the forehead portion and inferior lateral portion of the posterior portion of the skeletal frame may have a lower rigidity than the superior lateral portion of the posterior portion of the skeletal frame, and the anterior portion of the skeletal frame.

In examples:

the system comprises an interface chassis between the skeletal frame and the interfacing structure;

the interface chassis is configured to be connected to the skeletal frame;

the interface chassis is integral with the skeletal frame;

the interface chassis may comprise at least a portion of the posterior portion of the skeletal frame;

the interface chassis may be connected to the skeletal frame at a plurality of discrete points;

the forehead portion of the interface chassis is connected to the forehead portion of the posterior portion of the skeletal frame, and the nasal portion of the interface chassis is connected to the inferior portion of the anterior portion of the skeletal frame;

the forehead portion of the interface chassis is connected to the forehead portion of the posterior portion of the skeletal frame at a location proximal to the sagittal plane of the user's head in use;

the lateral portions of the interface chassis are connected to the lateral portions of the posterior portion of the skeletal frame;

the forehead portion of the interface chassis is connected to the forehead portion of the posterior portion of the skeletal frame at two points laterally offset on opposing sides of a sagittal plane of the user's head in use, and the nasal portion of the interface chassis is connected to the inferior portion of the anterior portion of the skeletal frame;

the forehead portion of the interface chassis is connected to the forehead portion of the posterior portion of the skeletal frame at two points laterally offset on opposing sides of a sagittal plane of the user's head in use, and the lateral portions of the interface chassis are connected to the lateral portions of the posterior portion of the skeletal frame;

the cheek portions of the interface chassis are connected to the inferior portion of the anterior portion of the skeletal frame; and/or the cheek portions of the interface chassis are connected to the inferior lateral portions of the posterior portion of the skeletal frame.

In examples:

the shroud spans between the posterior portion and the anterior portion of the skeletal frame;

the shroud is made of, or comprises, a flexible sheet material;

the shroud is made of, or comprises, a textile material;

the radially outward facing light-blocking surface comprises a flexible sheet material; and the radially outward facing light-blocking surface comprises a textile material.

In examples:

the face engaging portion may include a forehead portion crossing the sagittal plane of the user's head in use, a pair of cheek portions provided on respective sides of the user's nose in use, and lateral portions between the forehead portion and the cheek portions;

the cross-section of the lateral portions is different to that of the forehead portion;

the aspect-ratio of the cross-section of the lateral portions may be higher than that of the forehead portion;

at least lateral portions of the face engaging portion may be configured to be extensible between a face contacting surface and the interface chassis; and/or at least the lateral portions comprise a concertina section between the face contacting surface and the interface chassis.

In examples:

the interface chassis comprises a main portion having a radially outward facing surface, and a lip portion extending radially outward from the main portion;

the lip portion is provided to a posterior end of the main portion;

the face engaging portion is provided to the lip portion;

a posterior edge of the shroud overlaps the radially outward facing surface of the main portion of the interface chassis;

the posterior edge of the shroud does not overlap the lip portion of the interface chassis.

the interface chassis comprises a main portion having a radially outward facing surface, wherein the face engaging portion extends from the main portion in a radially outward direction;

a posterior edge of the shroud overlaps the radially outward facing surface of the main portion of the interface chassis, and a radially outward facing surface of the face engaging portion;

at least one airway is provided between the interface chassis and the shroud; and/or the at least one airway is provided between a radially inward facing surface of the shroud and the outward facing surface of the main portion of the interface chassis.

Another aspect of the present technology relates to a positioning and stabilising structure for holding a head-mounted display unit in an operative position on a user's head, the positioning and stabilising structure comprising a pair of lateral strap portions configured to extend along respective sides of the user's head in use.

In examples:

the lateral strap portions are configured to be connected to the interfacing structure;

the lateral strap portions are configured to be connected at the skeletal frame;

the lateral strap portions are configured to be connected proximal to the posterior portion;

the lateral strap portions are configured to be connected to the head-mounted display unit, and the positioning and stabilising structure comprises a pair of secondary lateral strap portions configured to be connected between the lateral strap portions and the interfacing structure;

the secondary lateral strap portions are configured to be connected at the skeletal frame;

the length of the secondary lateral strap portions is adjustable separately from the length of the lateral strap portions;

the elasticity of the secondary lateral strap portions is different to that of the lateral strap portions;

the head-mounted display system comprises a biasing mechanism between the positioning and stabilising structure and the frame, configured to bias the frame to rotate in a superior direction to increase contact pressure at a forehead portion of the face engaging portion relative to cheek portions of the face engaging portion;

each of the lateral strap portions comprises a rigidising portion;

the rigidising portions of the lateral strap portions may be integral with one or more of: the interfacing structure, and the frame;

the rigidising portions comprise at least one non-linear portion;

the at least one non-linear portion comprises an arcuate portion;

the positioning and stabilising structure comprises a flexible and/or resilient material disposed around the rigidising portion;

the flexible and/or resilient material comprises at least one textile layer;

the rigidising portion may comprise one or more cable locating features;

the one or more cable locating features may be provided on a radially outward facing surface of the rigidising portion.

Another form of the present technology comprises a head-mounted display system, comprising:

a head-mounted display unit comprising:

a display unit housing comprising a display; and an interfacing structure connected to the display unit housing and constructed and arranged to engage the user's face in use; and a positioning and stabilising structure substantially as described herein.

Another aspect of one form of the present technology is a positioning and stabilizing structure that is constructed with a shape which is complementary to that of an intended wearer.

Another aspect of one form of the present technology is an interfacing structure that is constructed with a shape which is complementary to that of an intended wearer.

Another aspect of the present technology relates to a user interface assembly for a head-mounted display system. The user interface assembly comprising: 1) a face-engaging portion, and 2) an interface chassis.

Another aspect of the present technology relates to a user interface assembly for a head-mounted display system. The user interface assembly comprising: 1) a face-engaging portion, and 2) an interface chassis. The face-engaging portion being configured to contact the user's face around a periphery of the user's eyes, in use, the face-engaging portion including a user-contacting portion configured to contact the user and a non-user-contacting portion opposite the user-contacting portion. The interface chassis having increased rigidity as compared to the face-engaging portion and being configured to support the face-engaging portion in use, the interface chassis being connected to the non-user-contacting portion of the face-engaging portion. The interface chassis being configured to extend along with the face-engaging portion around the periphery of the user's eyes in use, and including a forehead portion, pair of lateral portions, pair of cheek portions, and a nasal portion, wherein the interface chassis includes at least one relatively rigid portion and at least one relatively flexible portion to permit flexing of the interface chassis to accommodate anthropometric variation in users' faces, the at least one relatively rigid portion having increased rigidity as compared to the at least one relatively flexible portion, and wherein the at least one relatively rigid portion comprises a different material than the at least one relatively flexible portion.

In examples: a) the at least one relatively rigid portion includes the nasal portion and/or the pair of cheek portions of the interface chassis, and the at least one relatively flexible portion includes the forehead portion and/or the lateral portions; b) the nasal portion of the interface chassis has increased rigidity as compared to the forehead portion; c) the pair of cheek portions of the interface chassis has increased rigidity as compared to lateral portions; d) the interface chassis comprises a thermoplastic material; and/or e) the at least one relatively rigid portion comprises a first thermoplastic material and the at least one relatively flexible portion comprises 1) a second thermoplastic material that is less rigid that the first thermoplastic material, or 2) an elastomer material that is less rigid than the first thermoplastic material;

In further examples: f) the first thermoplastic material is a polyamide; and/or g) the second thermoplastic material is Hytrel®.

Another aspect of the present technology relates to a head-mounted display system. The head-mounted display system comprising: a head-mounted display unit comprising a display; a positioning and stabilising structure structured and arranged to hold the head-mounted display unit in an operational position in front of a user's face in use; and the user interface assembly according to any one of the aspects above.

Another aspect of the present technology relates to a head-mounted display support assembly for supporting a head-mounted display unit. The head-mounted display support assembly comprising 1) an interface assembly including a face-engaging portion configured to contact the user's face around a periphery of the user's eyes, in use, and 2) a frame assembly including an anterior portion adapted to connect to a head-mounted display unit and a posterior portion connected to the interface assembly.

Another aspect of the present technology relates to a head-mounted display support assembly for supporting a head-mounted display unit. The head-mounted display support assembly comprising 1) an interface assembly and 2) a frame assembly. The interface assembly including a face-engaging portion configured to contact the user's face around a periphery of the user's eyes, in use, the face-engaging portion including a user-contacting portion configured to contact the user and a non-user-contacting portion opposite the user-contacting portion. The frame assembly including an anterior portion adapted to connect to a head-mounted display unit and a posterior portion connected to the interface assembly, the frame assembly including a support structure bridging the anterior portion and the posterior portion, wherein the support structure is configured to flex relative to the posterior portion and/or anterior portion such that the posterior portion is movable relative to the anterior portion, in use, to accommodate anthropometric variation in users' faces.

In examples: a) the posterior portion of the frame assembly includes a forehead portion and a pair of lateral portions; b) the anterior portion of the frame assembly has increased rigidity as compared to at least the forehead portion of the frame assembly; c) the support structure includes at least one strut disposed between the posterior portion and the anterior portion of the frame assembly; d) the strut has increased rigidity as compared to the posterior portion of the frame assembly; e) the at least one strut includes a flexible portion and a rigidising portion that provides rigidity to the strut, the rigidizing portion having increased rigidity as compared to the flexible portion; f) the at least one strut has a first flexible connection with the posterior portion and a second inflexible connection with the anterior portion, the first flexible connection being relatively flexible as compared to the second inflexible connection; g) the at least one strut is disposed between the forehead portion and the anterior portion of the frame assembly; h) the interface assembly includes 1) a face-engaging portion configured to contact the user's face around a periphery of the user's eyes, in use, and 2) an interface chassis having increased rigidity as compared to the face-engaging portion and being configured to support the face-engaging portion in use; i) the posterior portion of the frame assembly is connected to the interface chassis; j) the posterior portion of the frame assembly is connected to the interface assembly only at a plurality of discrete attachment points; and/or k) the frame assembly comprises a thermoplastic material.

Another aspect of the present technology relates to a head-mounted display system. The head-mounted display system comprising: a head-mounted display unit comprising a display; a positioning and stabilising structure structured and arranged to hold the head-mounted display unit in an operational position in front of a user's face in use; and the head-mounted display support assembly according to any one of the aspects above.

Another aspect of the present technology relates to a head-mounted display support assembly for supporting a head-mounted display unit. The head-mounted display support assembly comprising 1) an interface assembly and 2) a frame assembly. The interface assembly including 1) a face-engaging portion configured to contact the user's face around a periphery of the user's eyes, in use, and 2) an interface chassis having increased rigidity as compared to the face-engaging portion and being configured to support the face-engaging portion in use. The face-engaging portion including a user-contacting portion configured to contact the user and a non-user-contacting portion opposite the user-contacting portion. The interface chassis being connected to the non-user-contacting portion of the face-engaging portion and including a forehead portion, pair of lateral portions, pair of cheek portions, and a nasal portion. The interface chassis being configured to extend along with the face-engaging portion around the periphery of the user's eyes in use. The frame assembly including an anterior portion adapted to connect to a head-mounted display unit and a posterior portion connected to the interface chassis, wherein the anterior portion of the frame assembly has increased rigidity as compared to the posterior portion of the frame assembly.

In examples: a) the frame assembly includes a support structure bridging the anterior portion and the posterior portion; b) the support structure is configured to flex relative to the posterior portion and/or anterior portion such that the posterior portion is movable relative to the anterior portion, in use, to accommodate anthropometric variation in users' faces; c) the interface chassis includes at least one relatively rigid portion and at least one relatively flexible portion to permit flexing of the interface chassis to accommodate anthropometric variation in users' faces, the at least one relatively rigid portion having increased rigidity as compared to the at least one relatively flexible portion; and/or d) at least one of the forehead portion, the pair of lateral portions, the pair of cheek portions, and the nasal portion of the interface chassis having increased rigidity as compared to another one of the forehead portion, the pair of lateral portions, the pair of cheek portions, and the nasal portion.

Another aspect of the present technology relates to a head-mounted display system. The head-mounted display system comprising: a head-mounted display unit comprising a display; a positioning and stabilising structure structured and arranged to hold the head-mounted display unit in an operational position in front of a user's face in use; and the head-mounted display support assembly according to any one of the aspects above.

An aspect of one form of the present technology is a method of manufacturing apparatus.

An aspect of certain forms of the present technology is a positioning and stabilizing structure that is easy to use, e.g. by a person who has limited dexterity, vision or by a person with limited experience in using a head-mounted display.

An aspect of certain forms of the present technology is an interfacing structure that is easy to use, e.g. by a person who has limited dexterity, vision or by a person with limited experience in using a head-mounted display.

The methods, systems, devices and apparatus described may be implemented so as to improve the functionality of a head-mounted display, such as an electronic display or computer. Moreover, the described methods, systems, devices and apparatus can provide improvements in the technological field of virtual reality, augmented reality, and/or mixed reality.

Of course, portions of the aspects may form sub-aspects of the present technology. Also, various ones of the sub-aspects and/or aspects may be combined in various manners and also constitute additional aspects or sub-aspects of the present technology.

Other features of the technology will be apparent from consideration of the information contained in the following detailed description, abstract, drawings and claims.

4 BRIEF DESCRIPTION OF THE DRAWINGS

The present technology is illustrated by way of example, and not by way of limitation, in the figures of the accompanying drawings, in which like reference numerals refer to similar elements including:

4.1 Head-Mounted Display Systems

4.2 Display System and Facial Anatomy

Figure 2A:
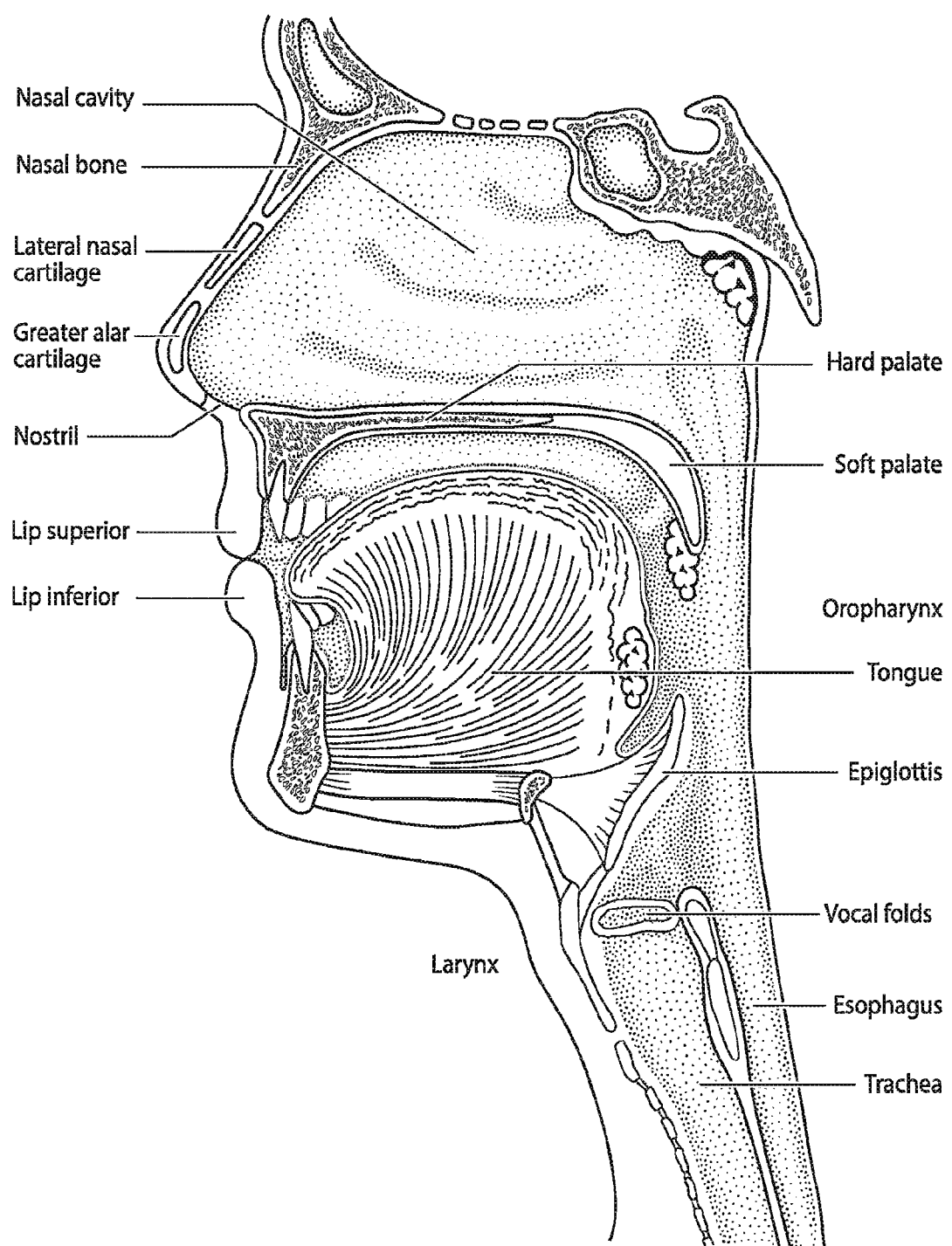

FIG. 2A shows a view of a human upper airway including the nasal cavity, nasal bone, lateral nasal cartilage, greater alar cartilage, nostril, lip superior, lip inferior, larynx, hard palate, soft palate, oropharynx, tongue, epiglottis, vocal folds, oesophagus and trachea.

Figure 2B:
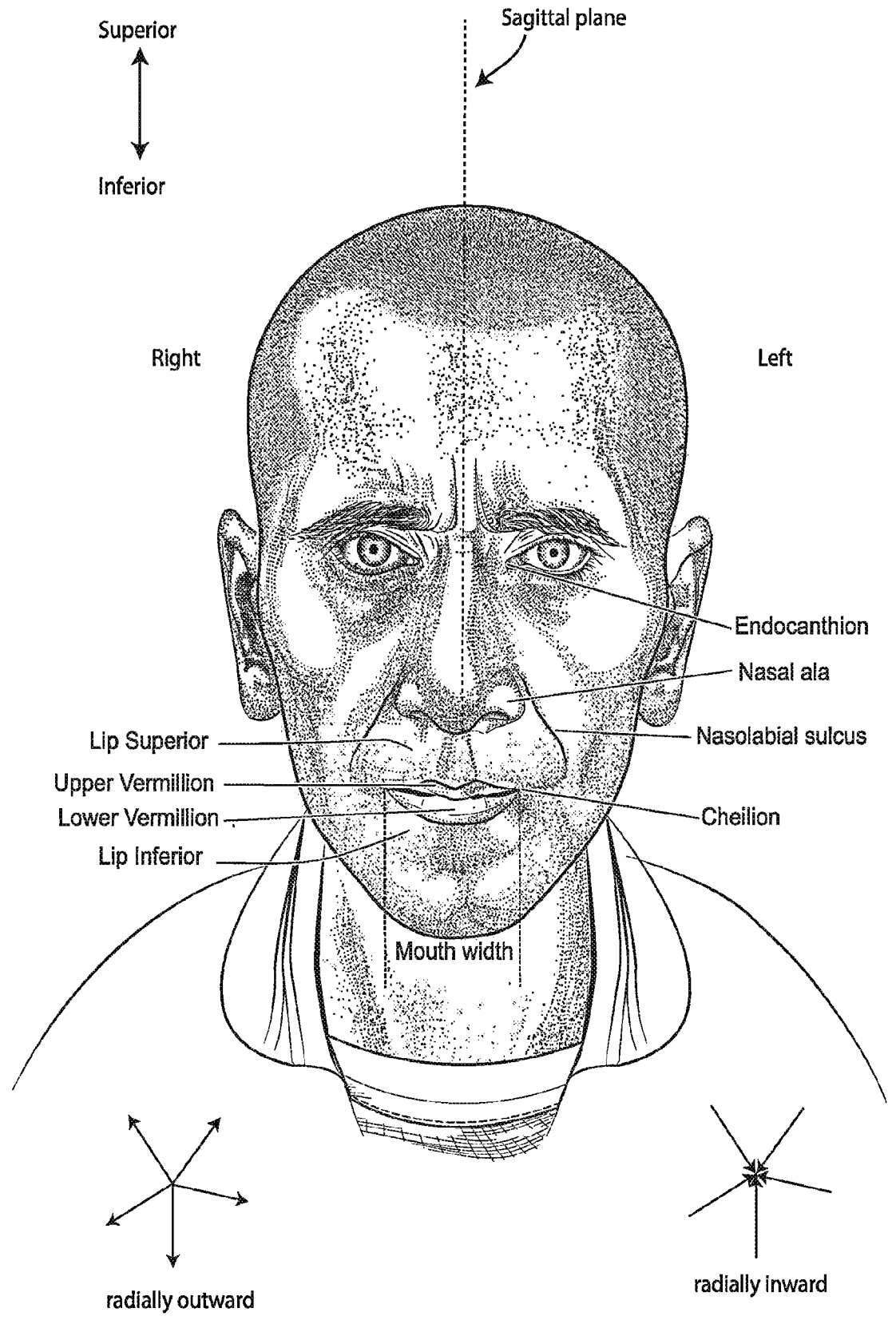

FIG. 2B is a front view of a face with several features of surface anatomy identified including the lip superior, upper vermilion, lower vermilion, lip inferior, mouth width, endocanthion, a nasal ala, nasolabial sulcus and cheilion. Also indicated are the directions superior, inferior, radially inward and radially outward.

Figure 2C:
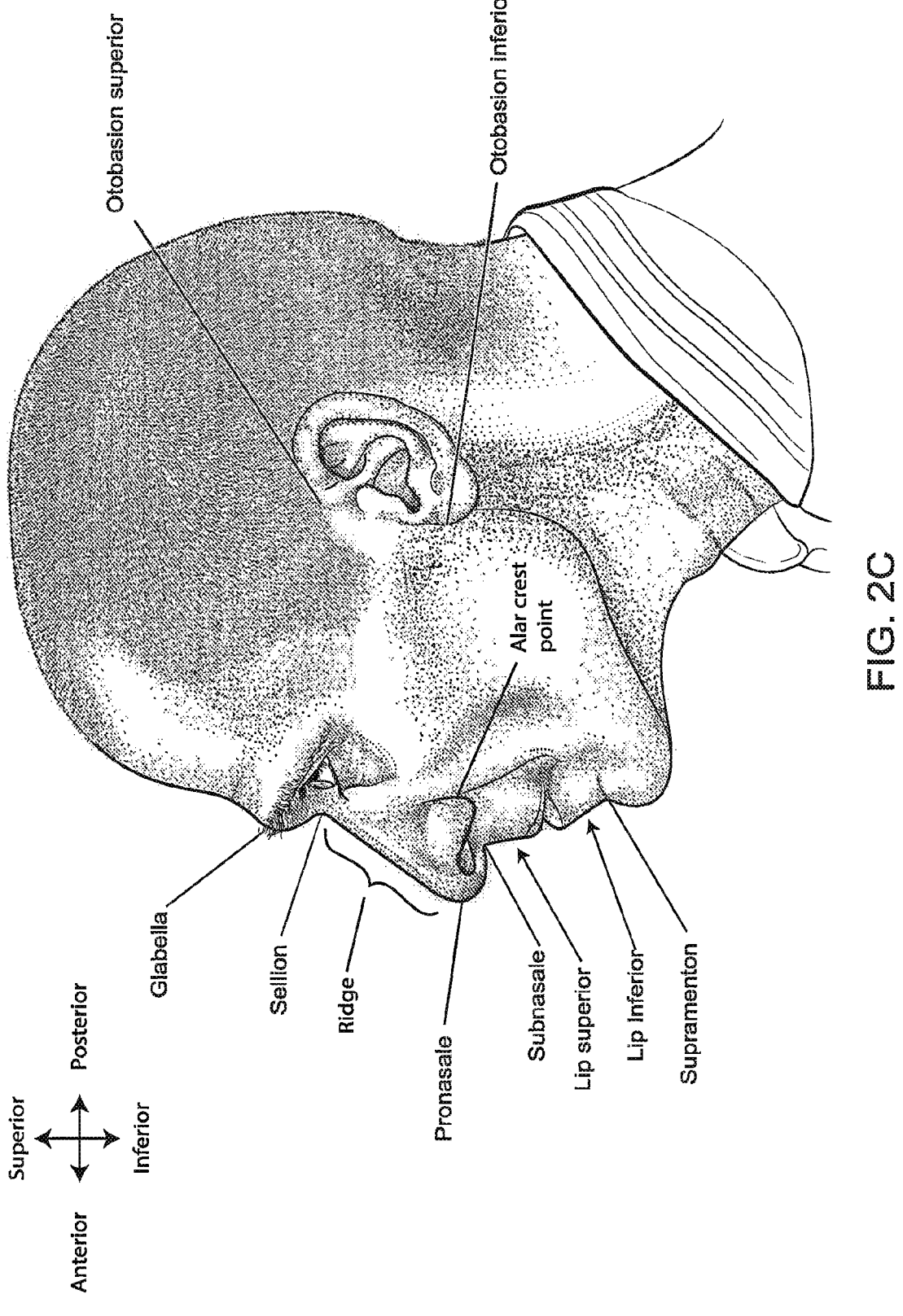

FIG. 2C is a side view of a head with several features of surface anatomy identified including glabella, sellion, pronasale, subnasale, lip superior, lip inferior, supramenton, nasal ridge, alar crest point, otobasion superior and otobasion inferior. Also indicated are the directions superior & inferior, and anterior & posterior.

Figure 2D:
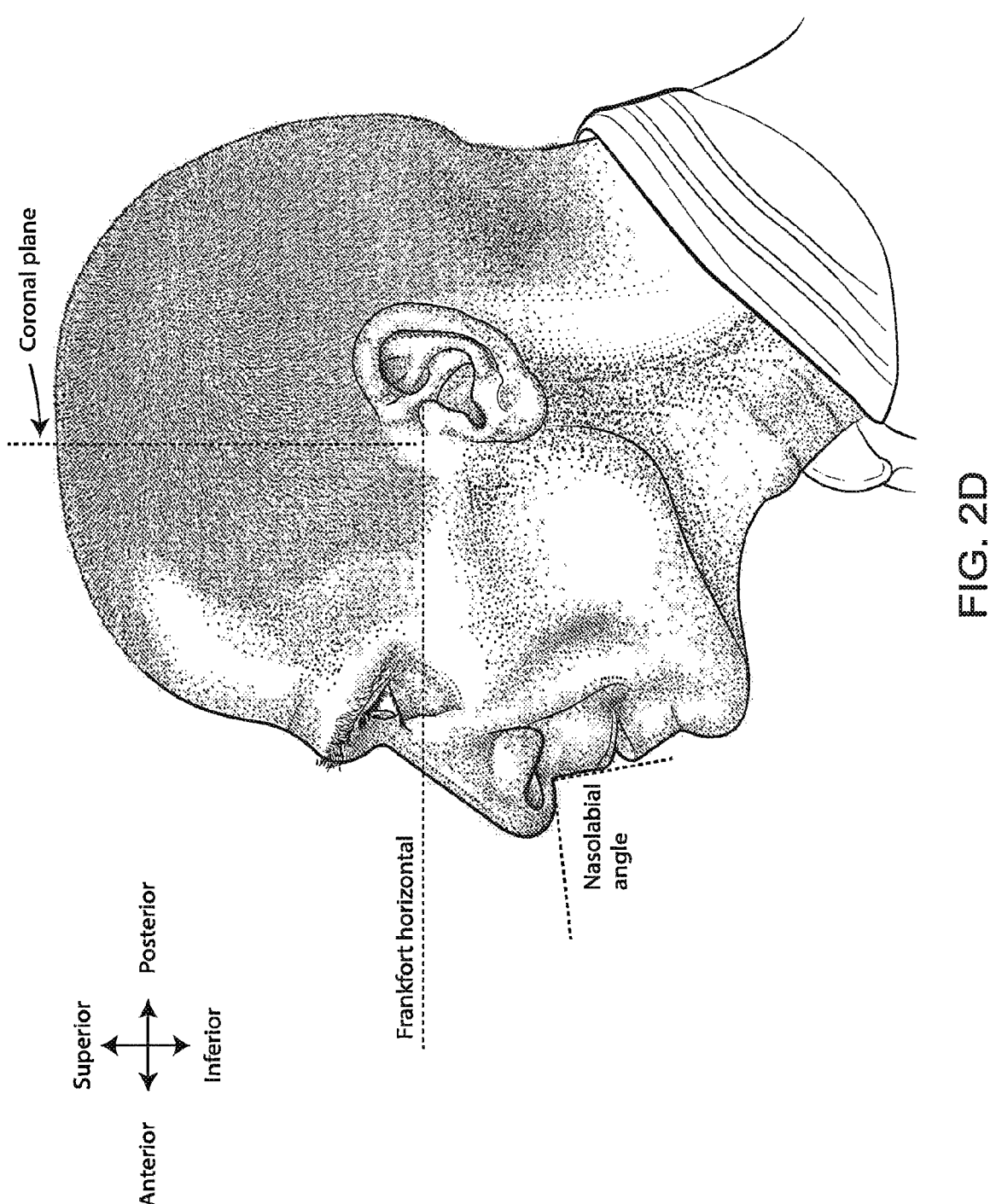

FIG. 2D is a further side view of a head. The approximate locations of the Frankfort horizontal and nasolabial angle are indicated. The coronal plane is also indicated.

Figure 2E:
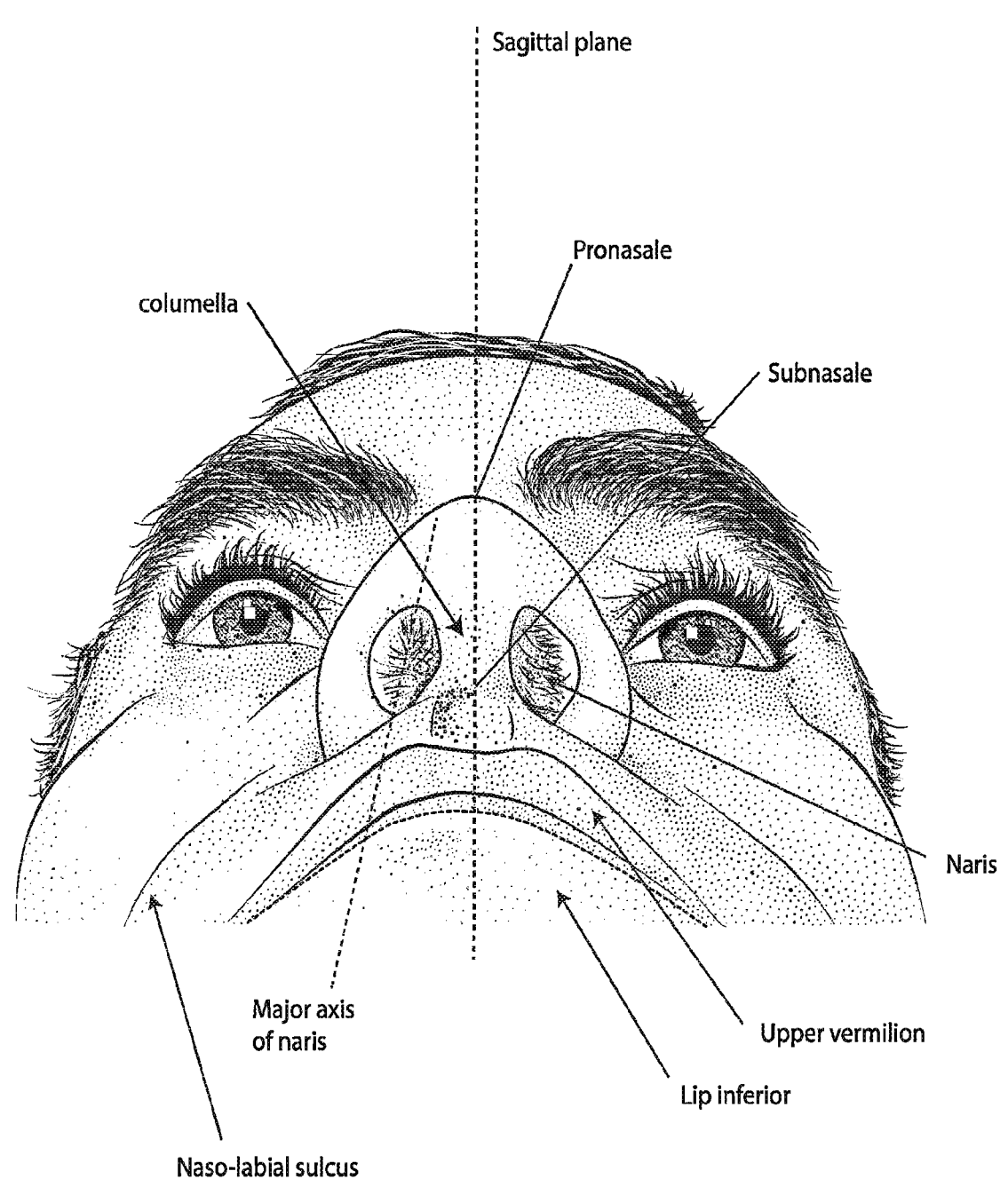

FIG. 2E shows a base view of a nose with several features identified including naso-labial sulcus, lip inferior, upper Vermilion, naris, subnasale, columella, pronasale, the major axis of a naris and the midsagittal plane.

Figures 2F, 2G, 2H:
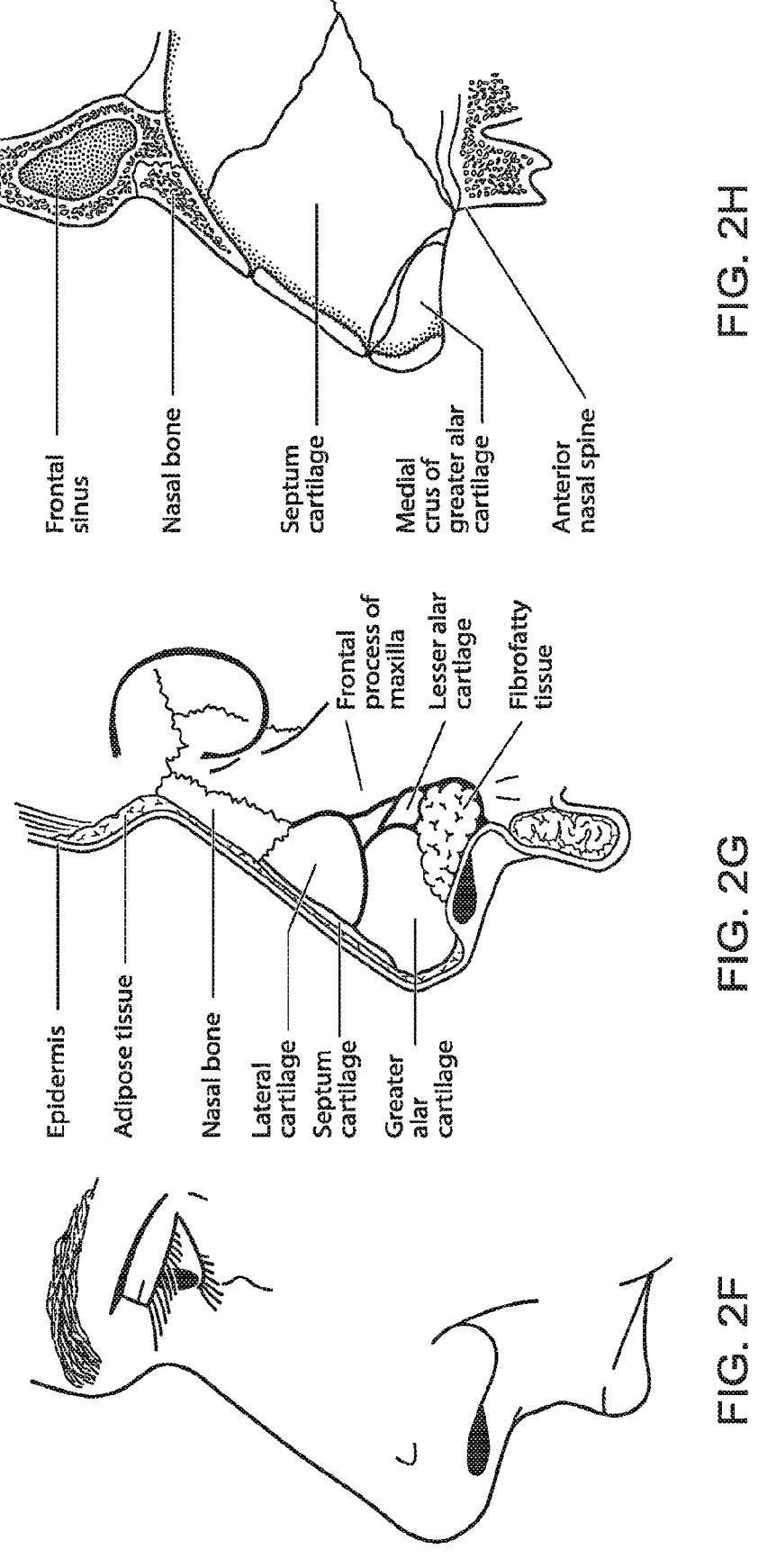

FIG. 2F shows a side view of the superficial features of a nose.

FIG. 2G shows subcutaneal structures of the nose, including lateral cartilage, septum cartilage, greater alar cartilage, lesser alar cartilage, sesamoid cartilage, nasal bone, epidermis, adipose tissue, frontal process of the maxilla and fibrofatty tissue.

FIG. 2H shows a medial dissection of a nose, approximately several millimeters from the midsagittal plane, amongst other things showing the septum cartilage and medial crus of greater alar cartilage.

Figures 2I, 2J:
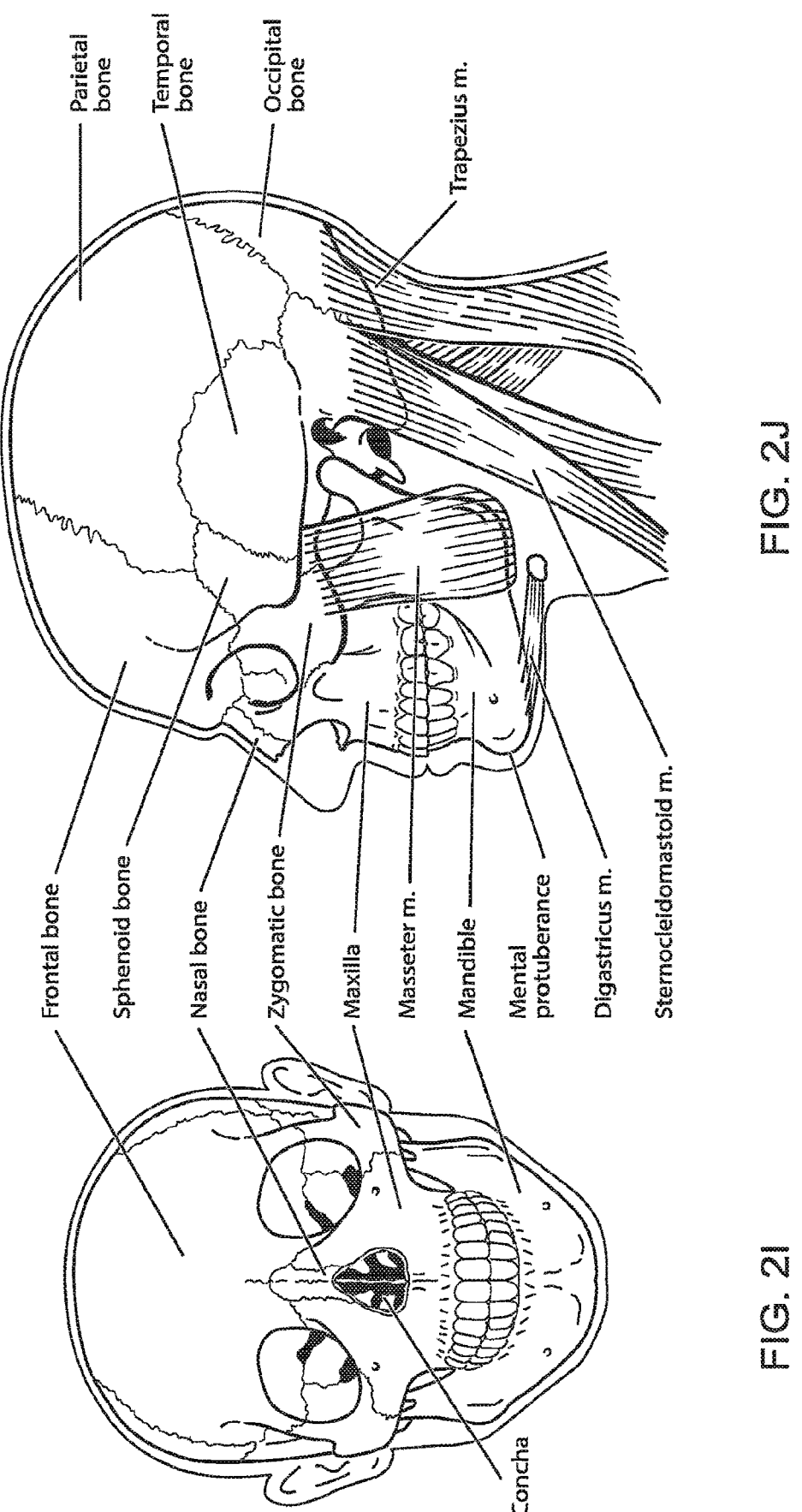

FIG. 2I shows a front view of the bones of a skull including the frontal, nasal and zygomatic bones. Nasal concha are indicated, as are the maxilla, and mandible.

FIG. 2J shows a lateral view of a skull with the outline of the surface of a head, as well as several muscles. The following bones are shown: frontal, sphenoid, nasal, zygomatic, maxilla, mandible, parietal, temporal and occipital. The mental protuberance is indicated. The following muscles are shown: digastricus, masseter, sternocleidomastoideo trapezius.

Figure 2K:
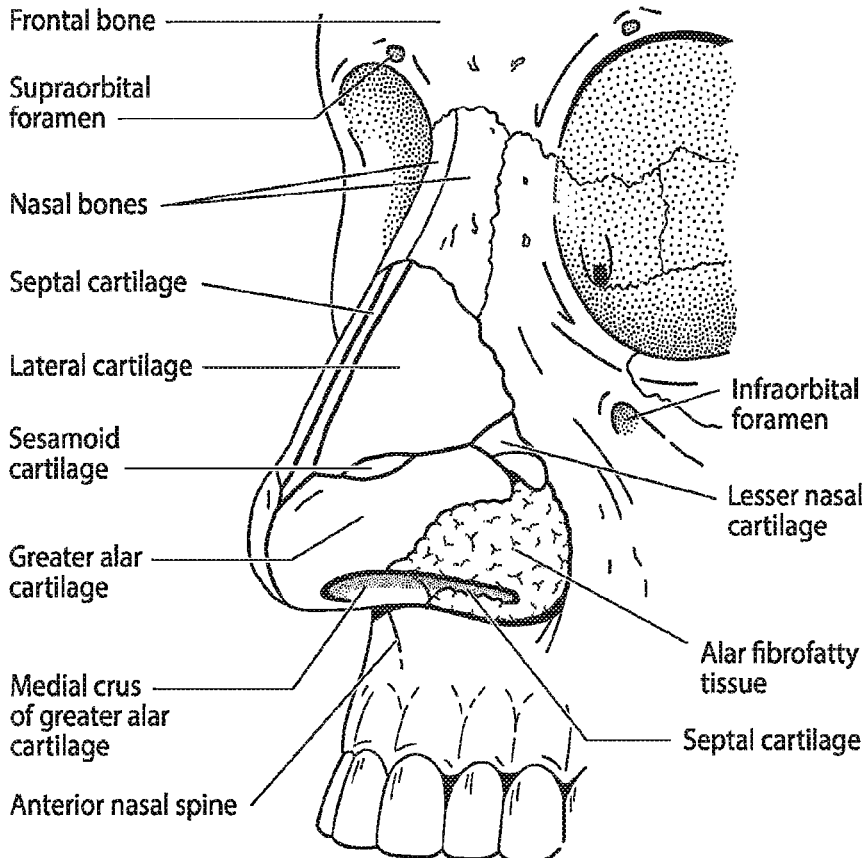

FIG. 2K shows an anterolateral view of a nose. The following bones are shown: frontal, supraorbital foramen, nasal, septal cartilage, lateral cartilage, orbit and infraorbital foramen.

Figure 2L:
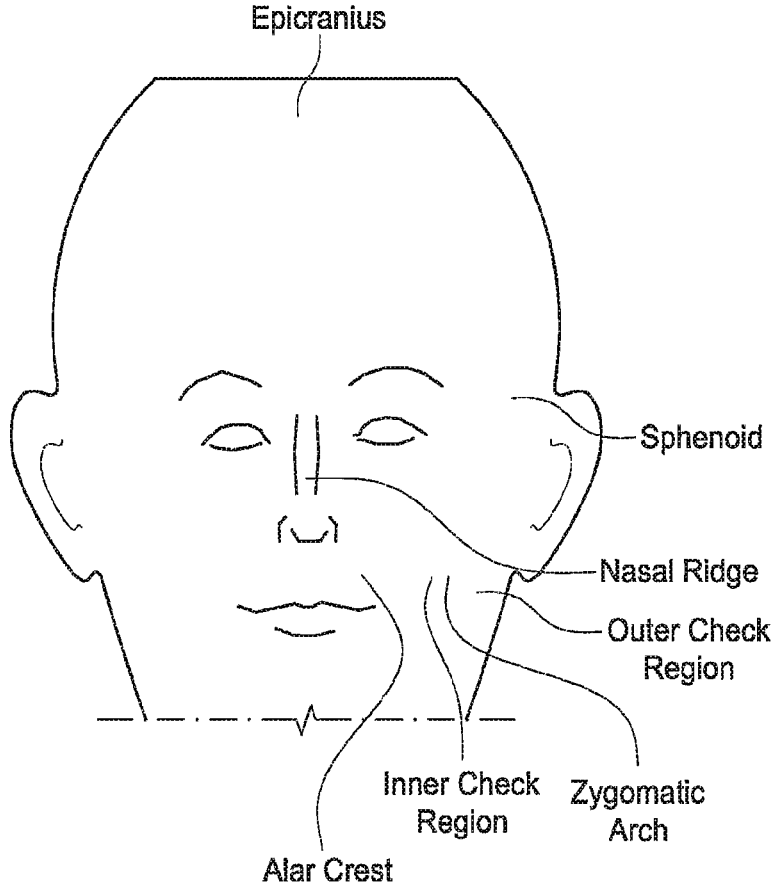

FIG. 2L shows another front view of the face with several features of surface anatomy identified including the epicranius, the sphenoid, the nasal ridge, the outer and inner cheek regions, the zygomatic arch, and the alar crest.

Figure 2M:
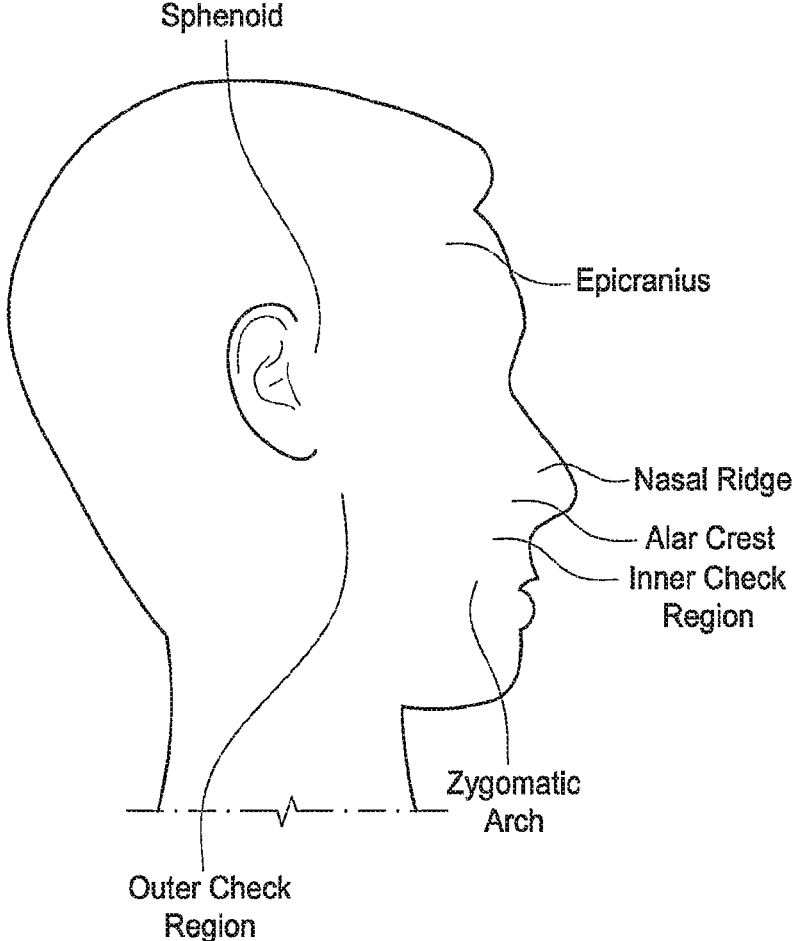

FIG. 2M shows another side view of the face with several features of surface anatomy identified including the epicranius, the sphenoid, the nasal ridge, the outer and inner cheek regions, the zygomatic arch, and the alar crest.

4.3 Shape of Structures

FIG. 3A shows a schematic of a cross-section through a structure at a point. An outward normal at the point is indicated. The curvature at the point has a positive sign, and a relatively large magnitude when compared to the magnitude of the curvature shown in FIG. 3B.

FIG. 3B shows a schematic of a cross-section through a structure at a point. An outward normal at the point is indicated. The curvature at the point has a positive sign, and a relatively small magnitude when compared to the magnitude of the curvature shown in FIG. 3A.

FIG. 3C shows a schematic of a cross-section through a structure at a point. An outward normal at the point is indicated. The curvature at the point has a value of zero.

FIG. 3D shows a schematic of a cross-section through a structure at a point. An outward normal at the point is indicated. The curvature at the point has a negative sign, and a relatively small magnitude when compared to the magnitude of the curvature shown in FIG. 3E.

FIG. 3E shows a schematic of a cross-section through a structure at a point. An outward normal at the point is indicated. The curvature at the point has a negative sign, and a relatively large magnitude when compared to the magnitude of the curvature shown in FIG. 3D.

Figure 3F:
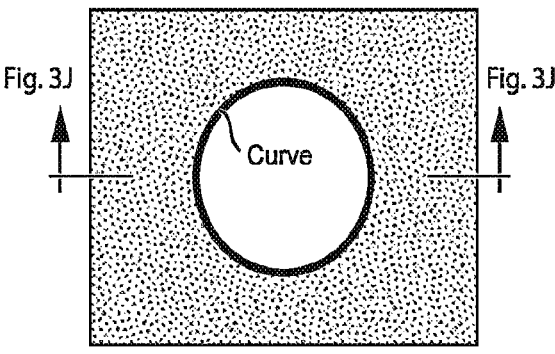

FIG. 3F shows the surface of a structure, with a one dimensional hole in the surface. The illustrated plane curve forms the boundary of a one dimensional hole.

Figure 3G:
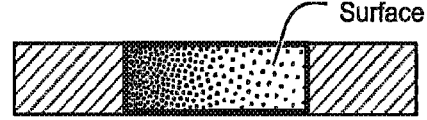

FIG. 3G shows a cross-section through the structure of FIG. 3F. The illustrated surface bounds a two dimensional hole in the structure of FIG. 3F.

Figure 3H:
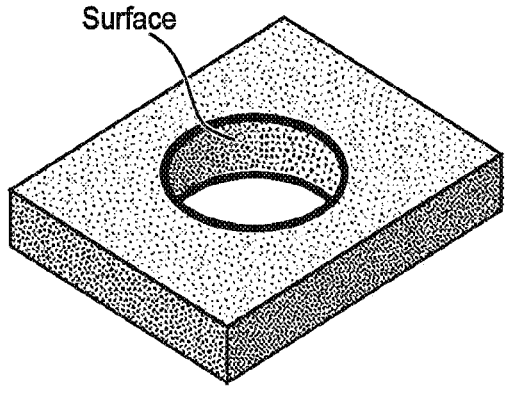

FIG. 3H shows a perspective view of the structure of FIG. 3F, including the two dimensional hole and the one dimensional hole. Also shown is the surface that bounds a two dimensional hole in the structure of FIG. 3F.

Figures 3I, 3J:
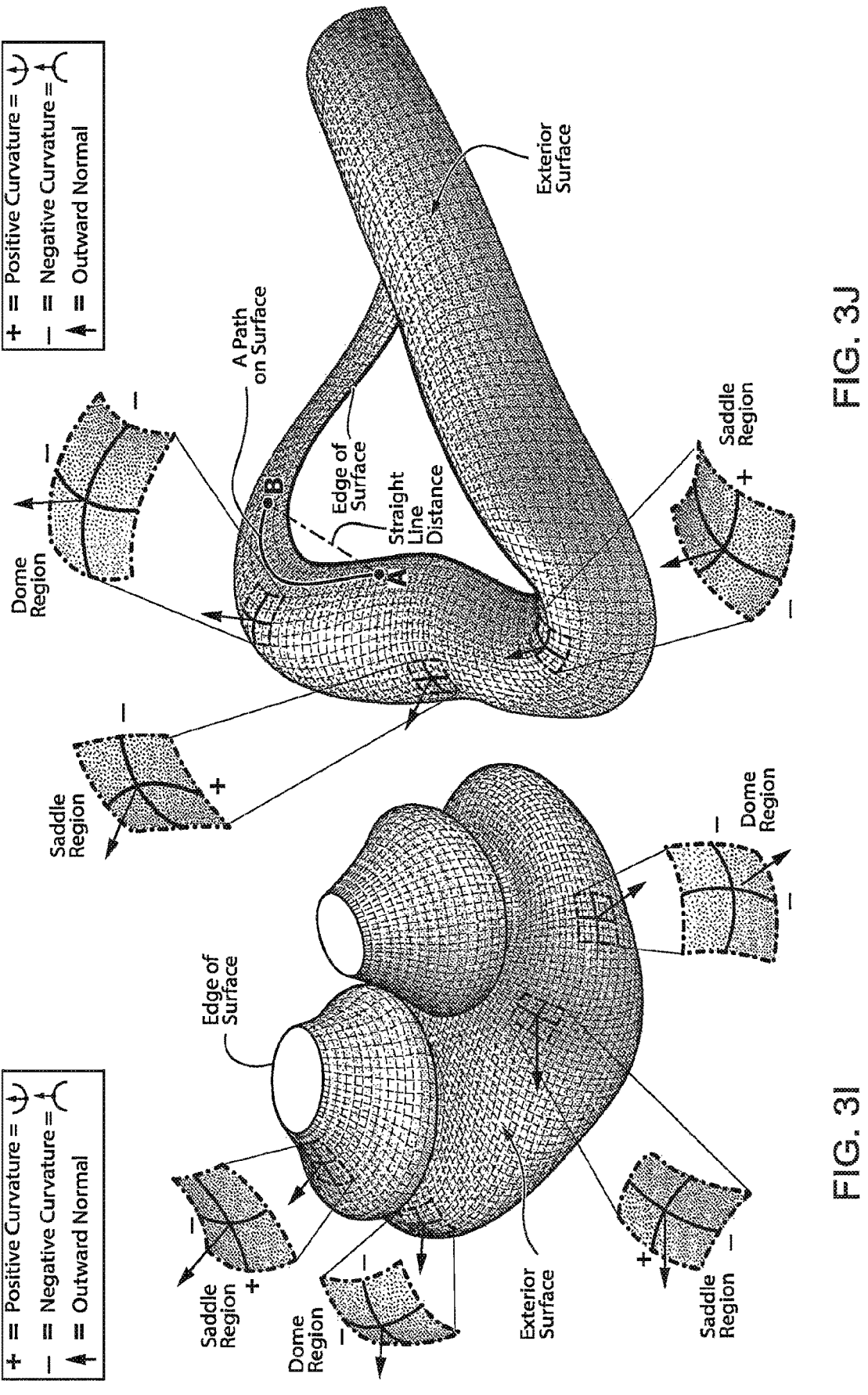

FIGS. 3I-3J shows a seal forming structure. An exterior surface of the cushion is indicated. An edge of the surface is indicated. A path on the surface between points A and B is indicated. A straight-line distance between A and B is indicated. Two saddle regions and a dome region are indicated.

FIG. 3K illustrates a left-hand rule.

FIG. 3L illustrates a right-hand rule.

FIG. 3M shows a left ear, including the left ear helix.

FIG. 3N shows a right ear, including the right ear helix.

FIG. 3O shows a right-hand helix.

4.4 Head-Mounted Virtual Reality Display

Figure 4A:
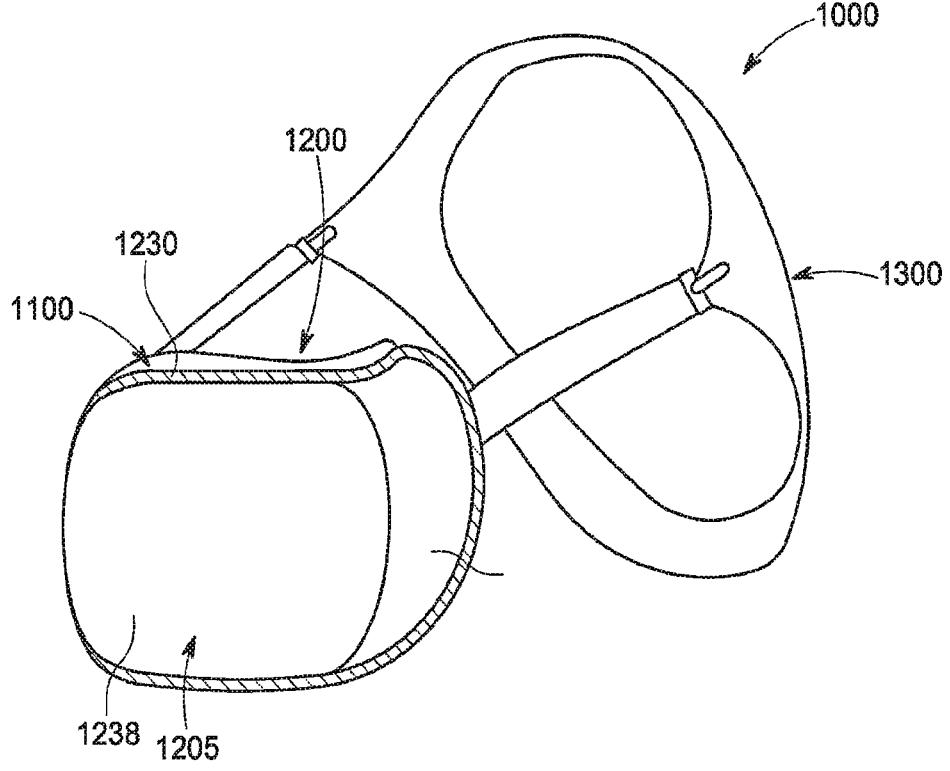

FIG. 4A shows a front perspective view of a head-mounted display interface in accordance with one form of the present technology.

Figure 4B:
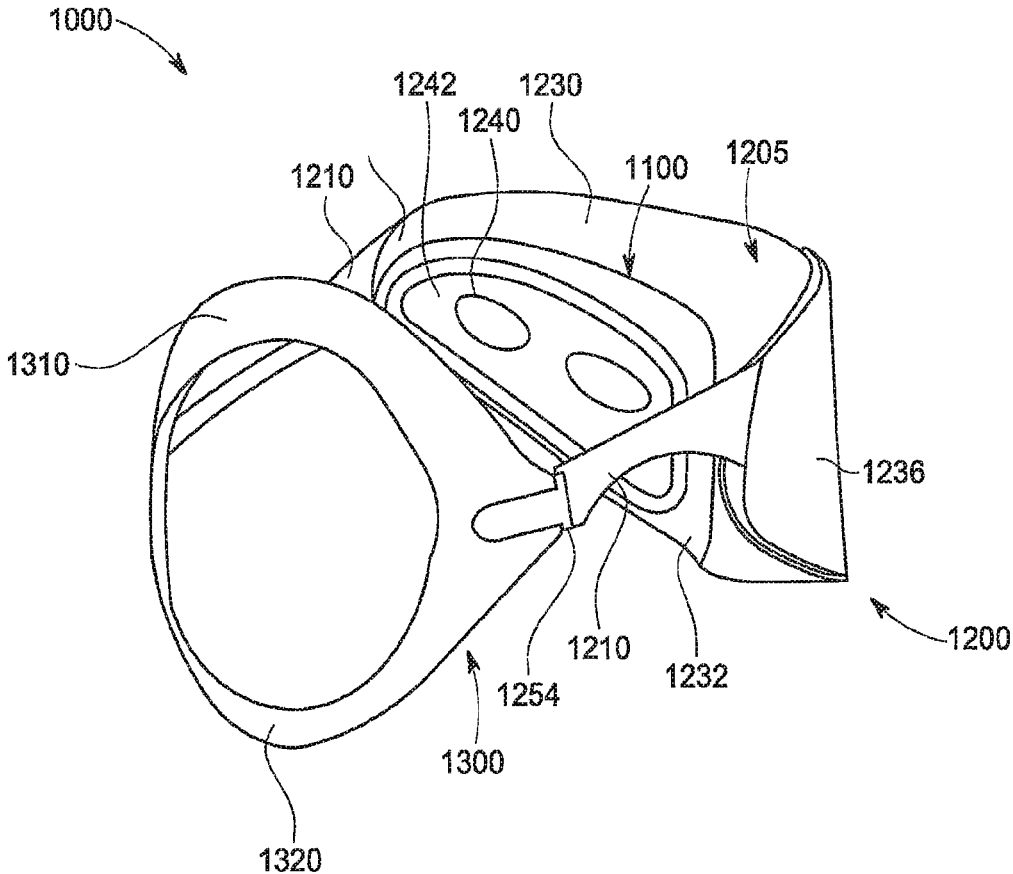

FIG. 4B shows a rear perspective view of the head-mounted display of FIG. 4A.

Figure 4C:
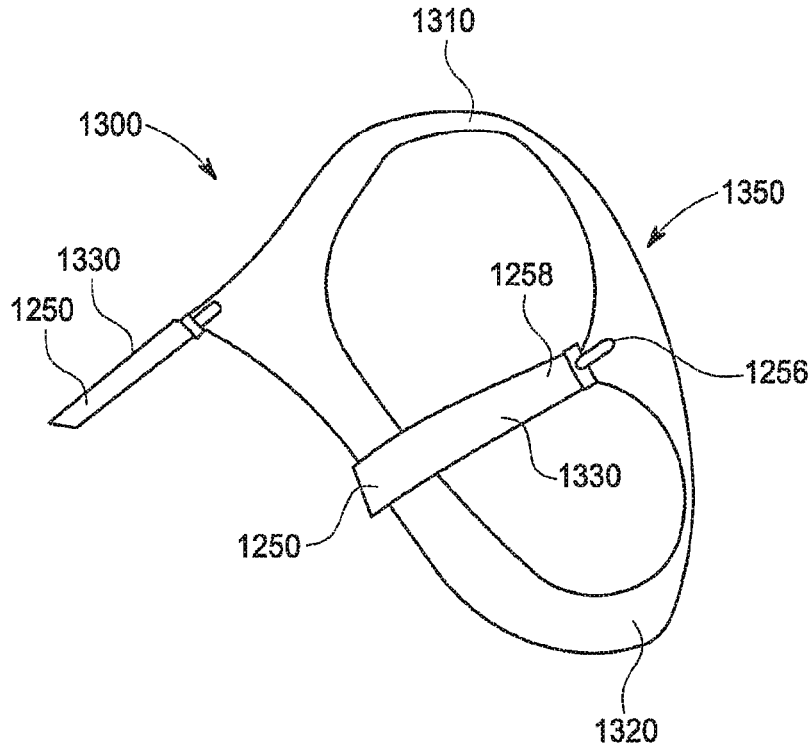

FIG. 4C shows a perspective view of a positioning and stabilizing structure used with the head-mounted display of FIG. 4A.

Figure 4D:
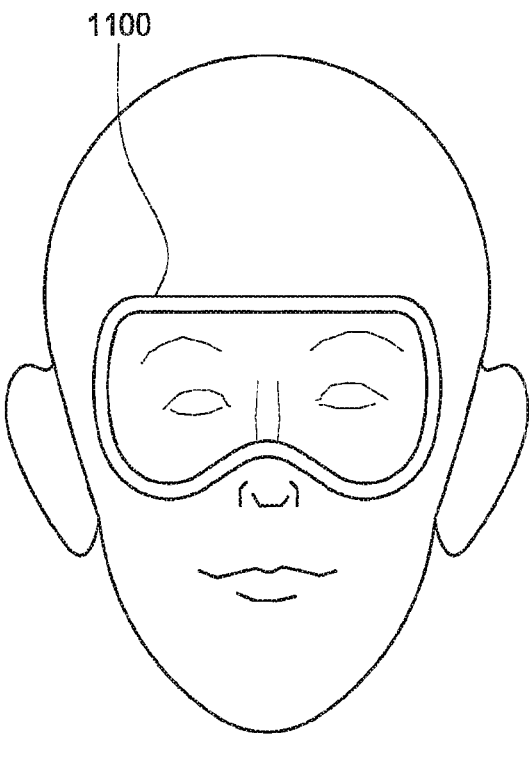

FIG. 4D shows a front view of a user's face, illustrating a location of an interfacing structure, in use.

4.5 Head-Mounted Augmented Reality Display

Figure 5A:
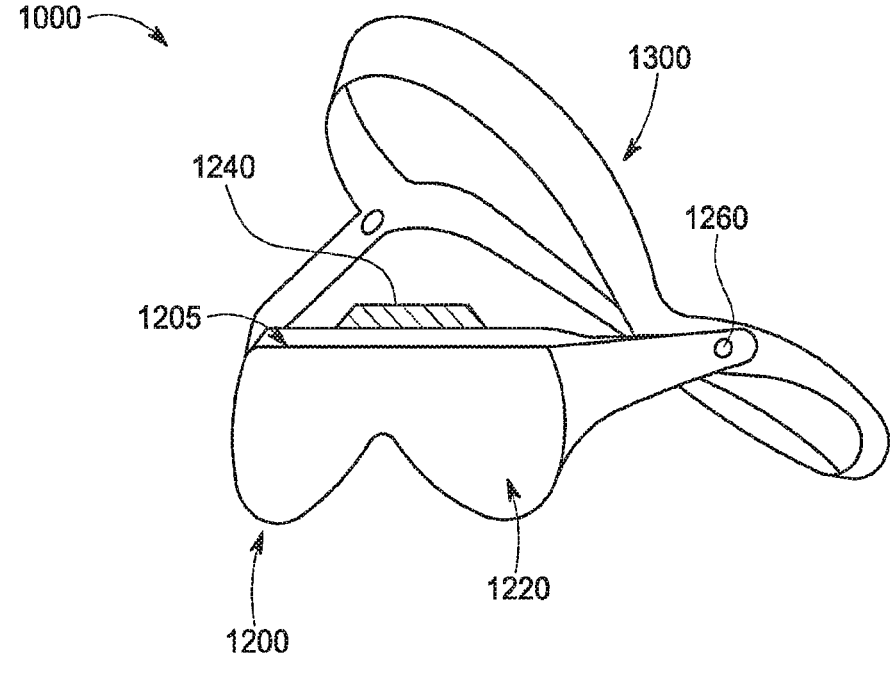

FIG. 5A shows a front perspective view of a head-mounted display interface in accordance with one form of the present technology.

Figure 5B:
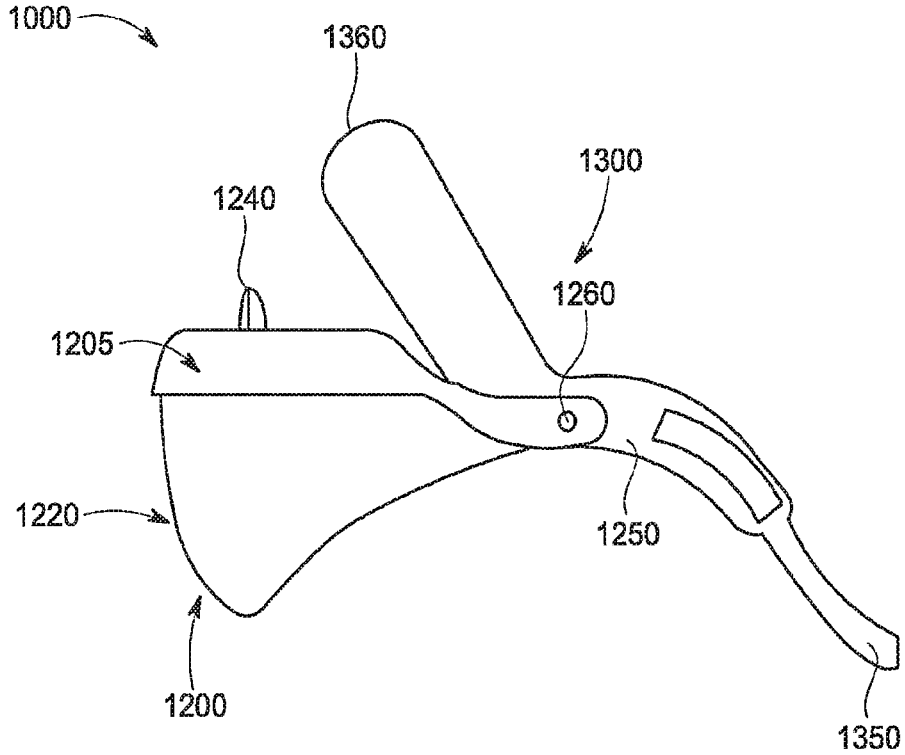

FIG. 5B shows a side view of the head-mounted display interface of FIG. 5A.

4.6 Controls

Figure 6:
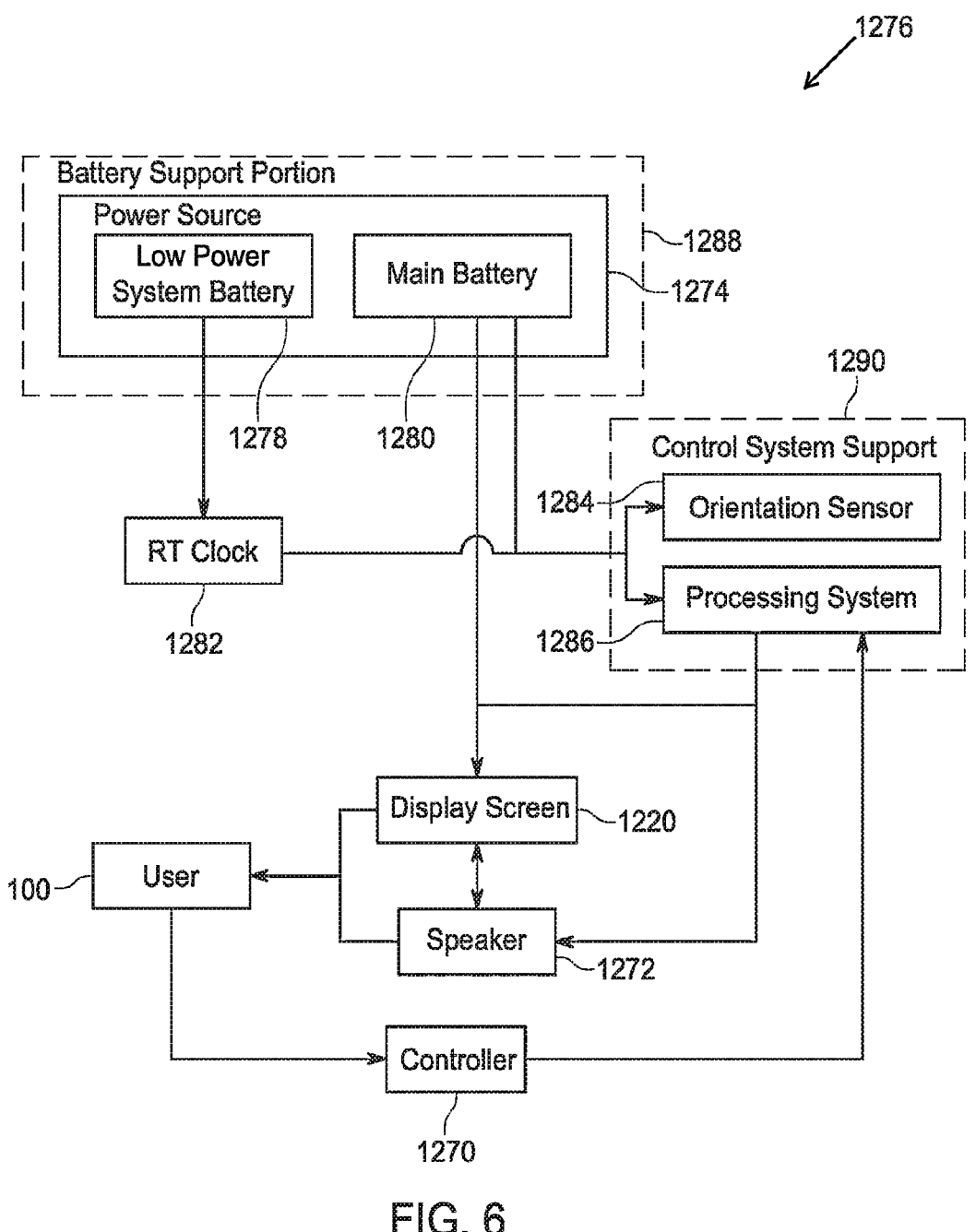

FIG. 6 shows a schematic view of a control system of one form of the present technology.

4.7 Additional Aspects of the Present Technology

Figure 7A:
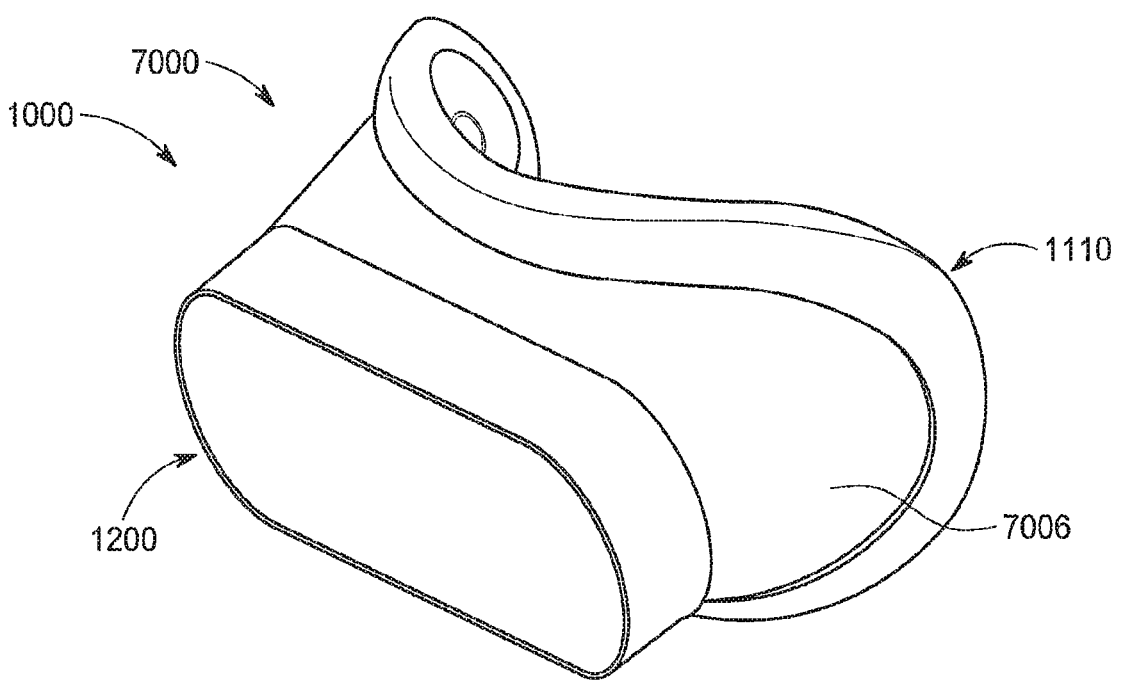

FIG. 7A is a perspective view of a head-mounted display according to an example of the present technology.

Figure 7B:
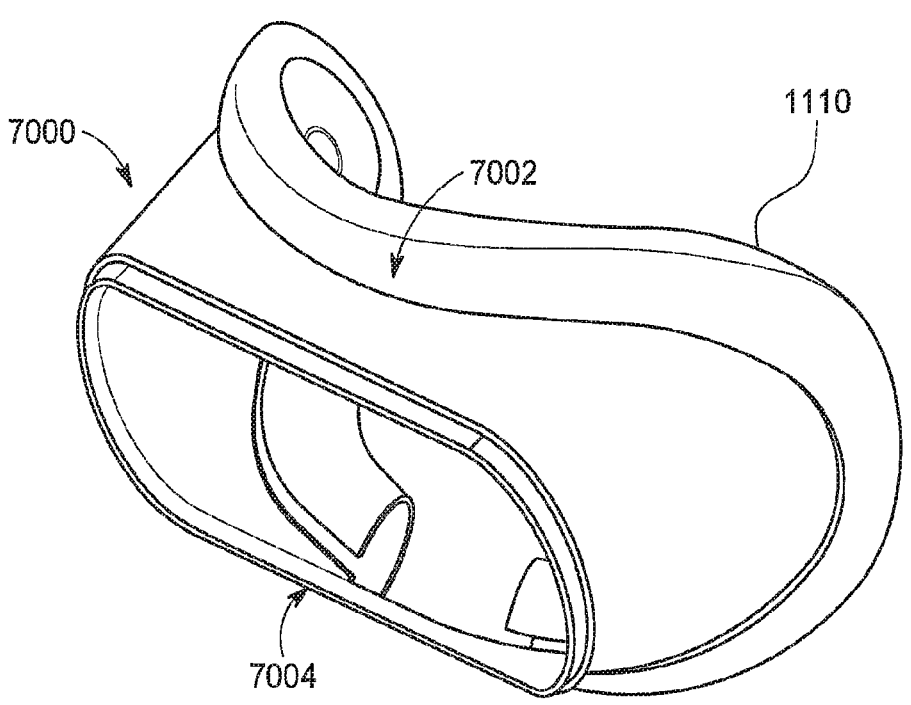

FIG. 7B is a perspective view of a shroud and interfacing structure of the head-mounted display of FIG. 7A.

Figure 7C:
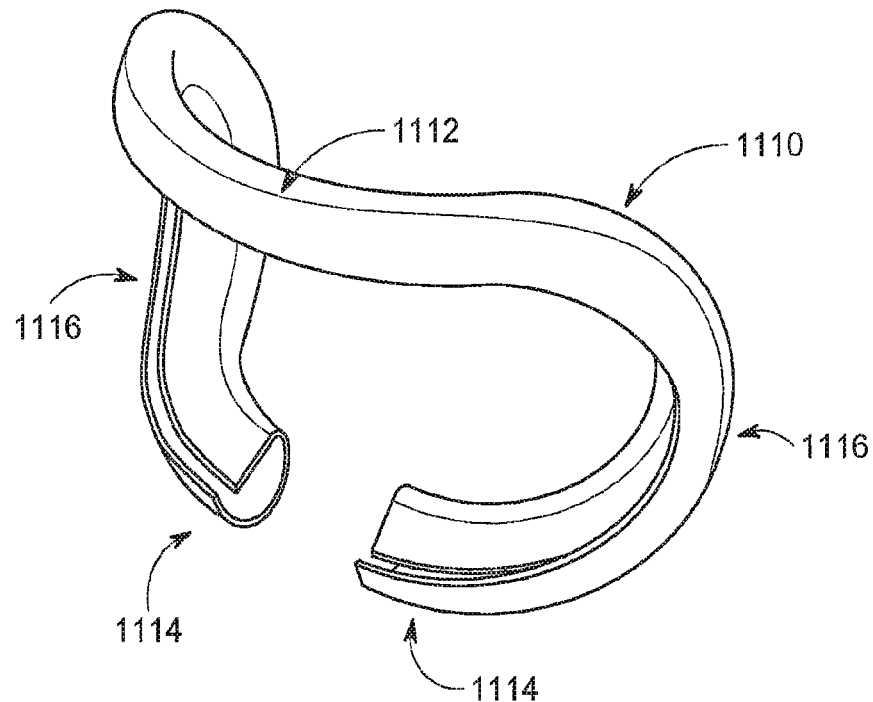

FIG. 7C is a perspective view of the interfacing structure of the head-mounted display of FIG. 7A.

Figure 7D:
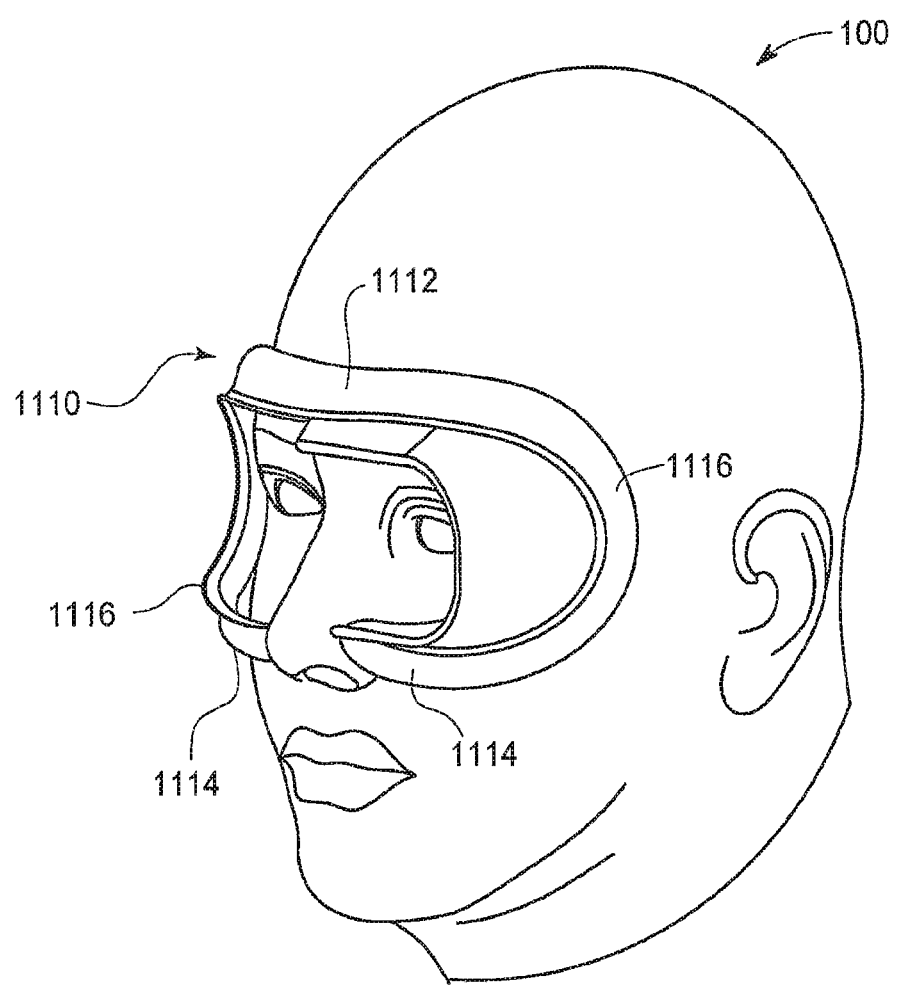

FIG. 7D is a perspective view of the shroud and interfacing structure of the head-mounted display of FIG. 7A positioned on a user's face.

Figure 8:
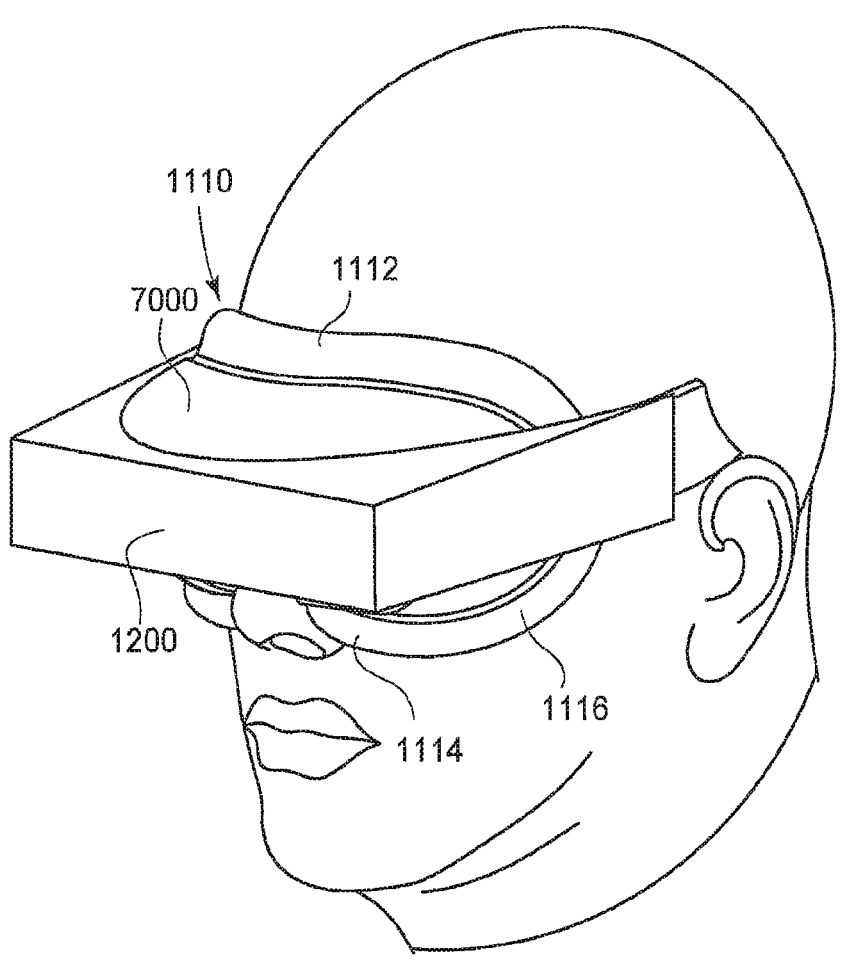

FIG. 8 is a perspective view of a head-mounted display according to an example of the present technology.

FIG. 9 shows an interfacing structure of one form of the present technology.

Figures 1, 2, 21:
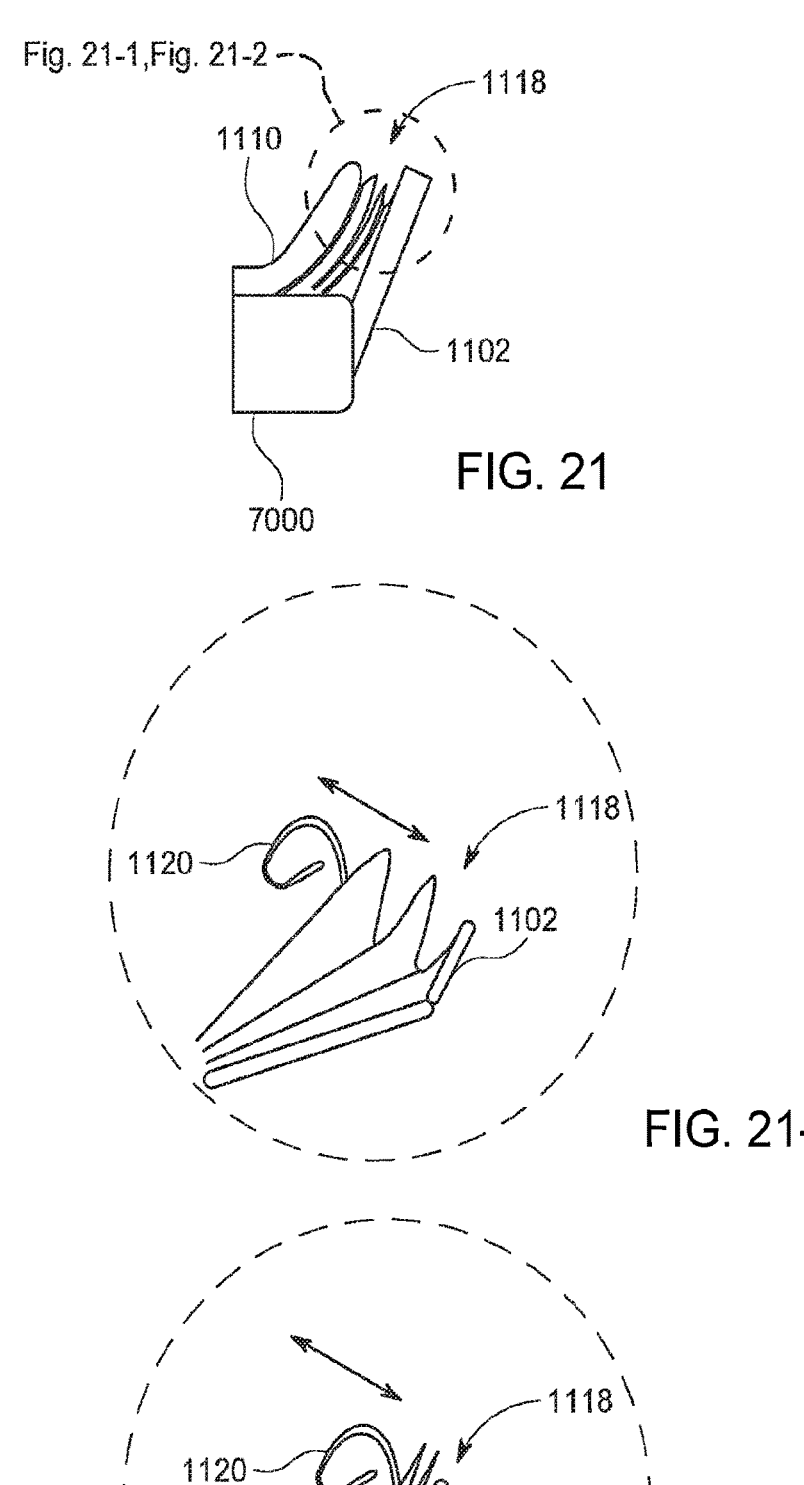

FIG. 9A-1 shows a cross-section of an exemplary structure of the interfacing structure.

Figures 2, 9B:
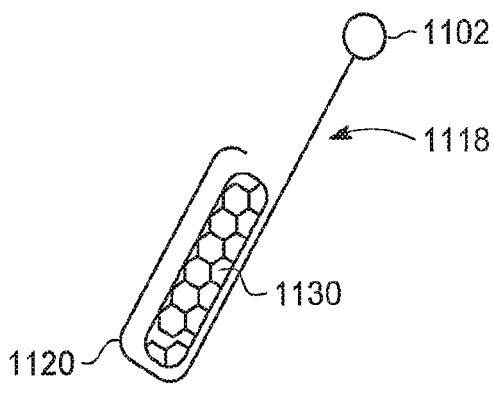
Figures 3, 9B:
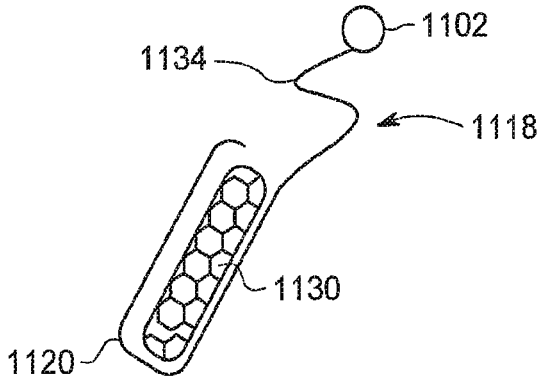
Figures 4, 9B:
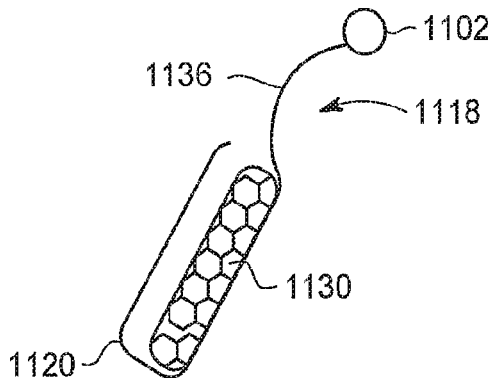

FIGS. 9B-1 to 9B-4 show several examples of a cross-section of exemplary structures of the interfacing structure.

Figure 10A:
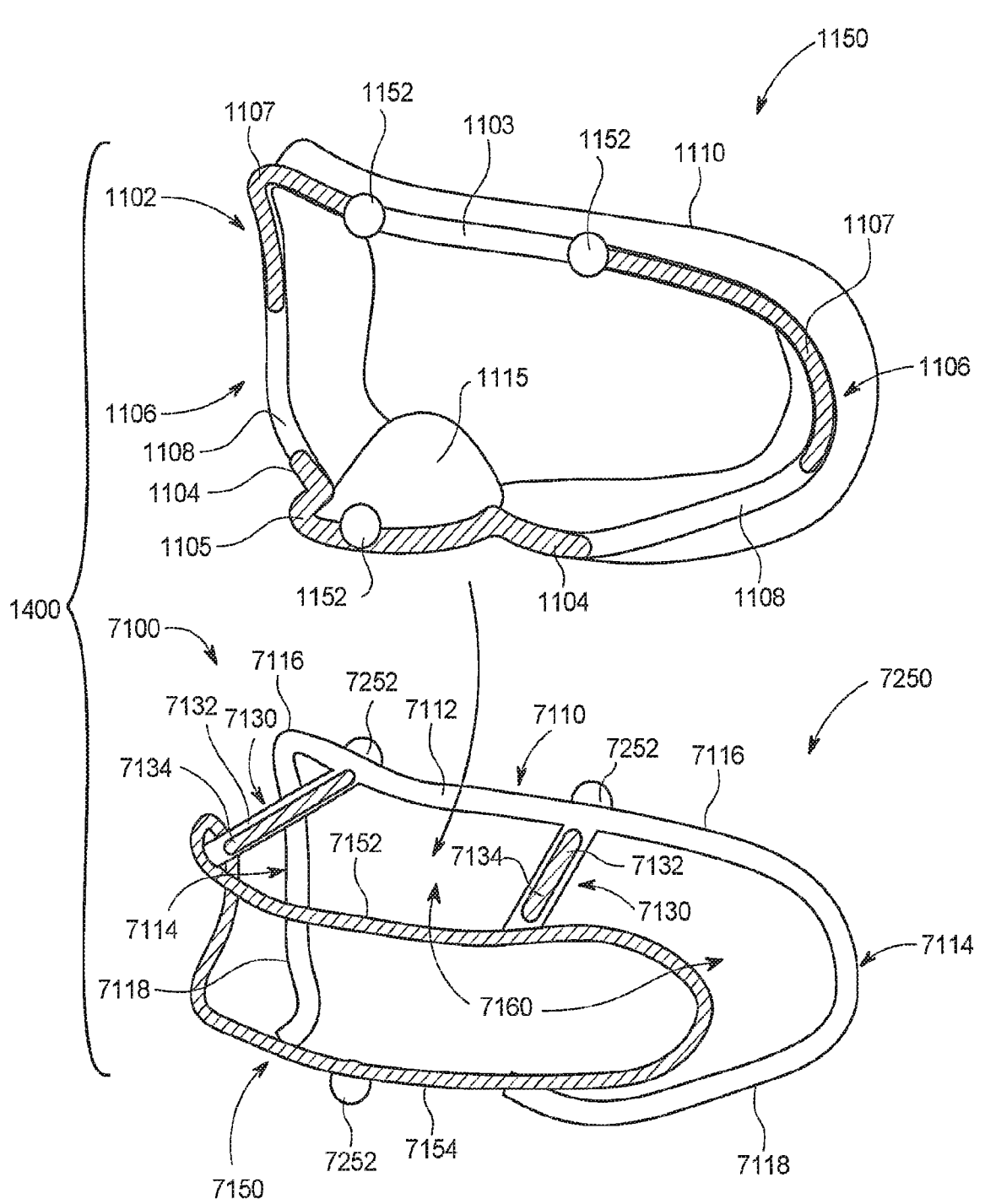

FIG. 10A is a perspective view of an exemplary skeletal frame and interface chassis according to one aspect of the present technology.

Figure 10B:
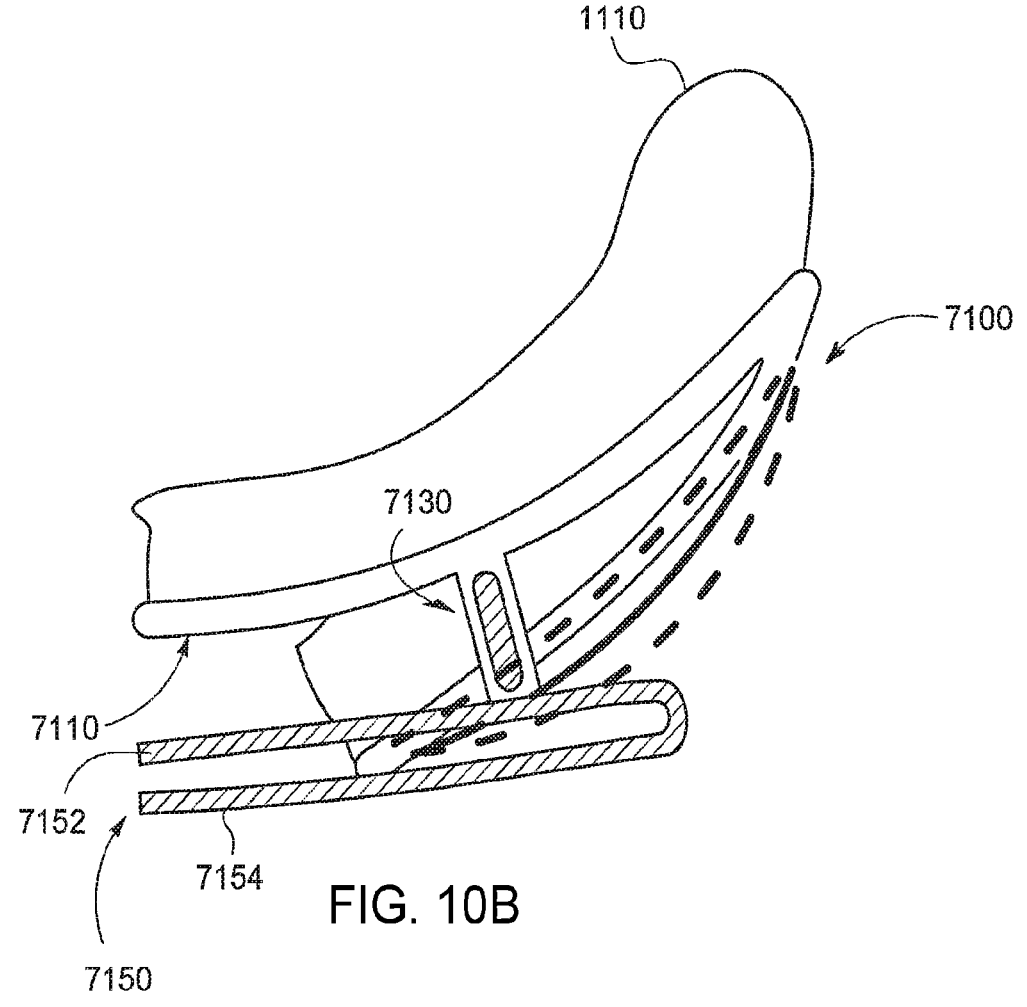

FIG. 10B is a partial top view of the exemplary skeletal frame and interface chassis of FIG. 10A.

Figure 11A:
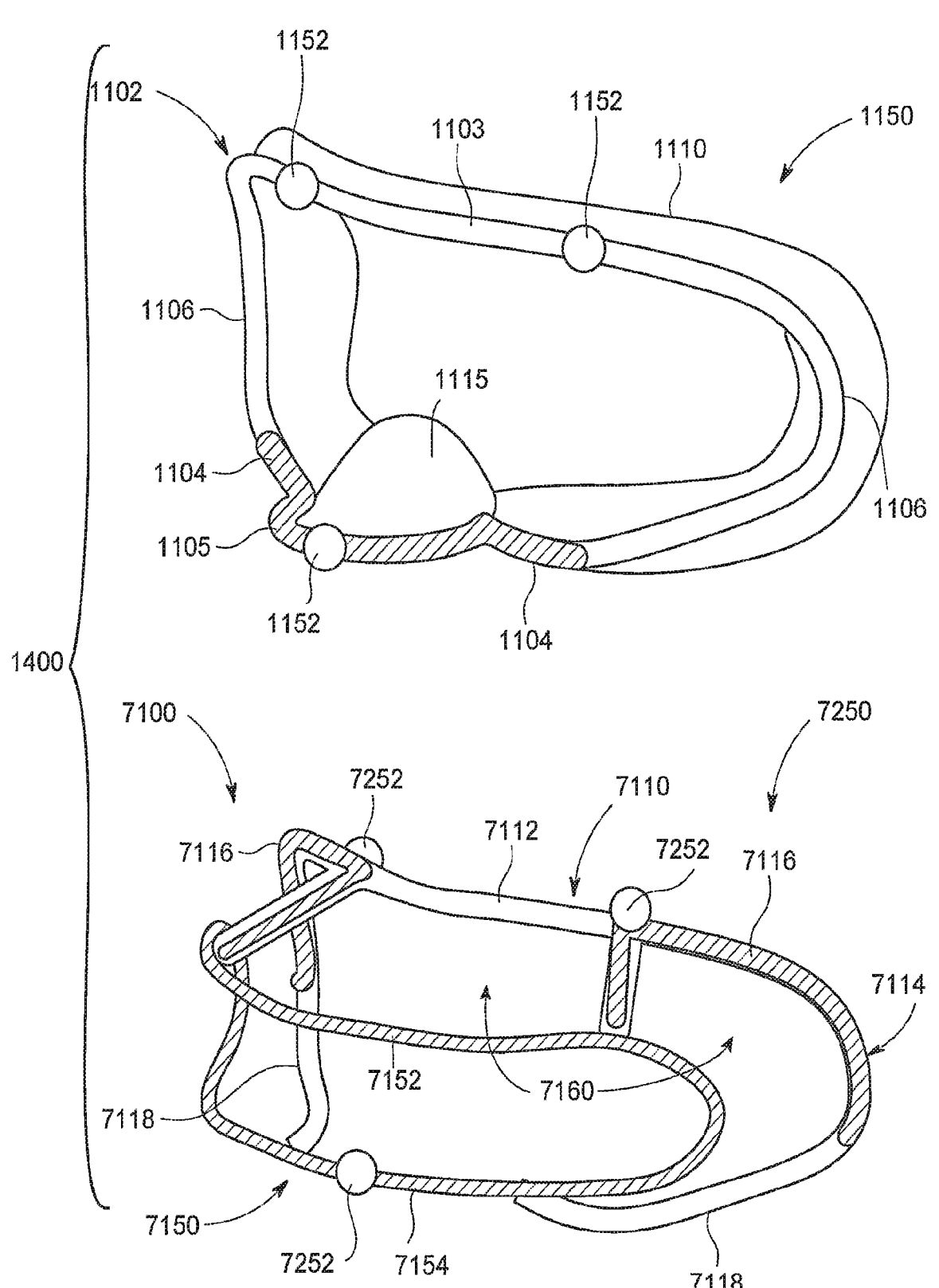

FIG. 11A is a perspective view of another exemplary skeletal frame and interface chassis.

Figure 11B:
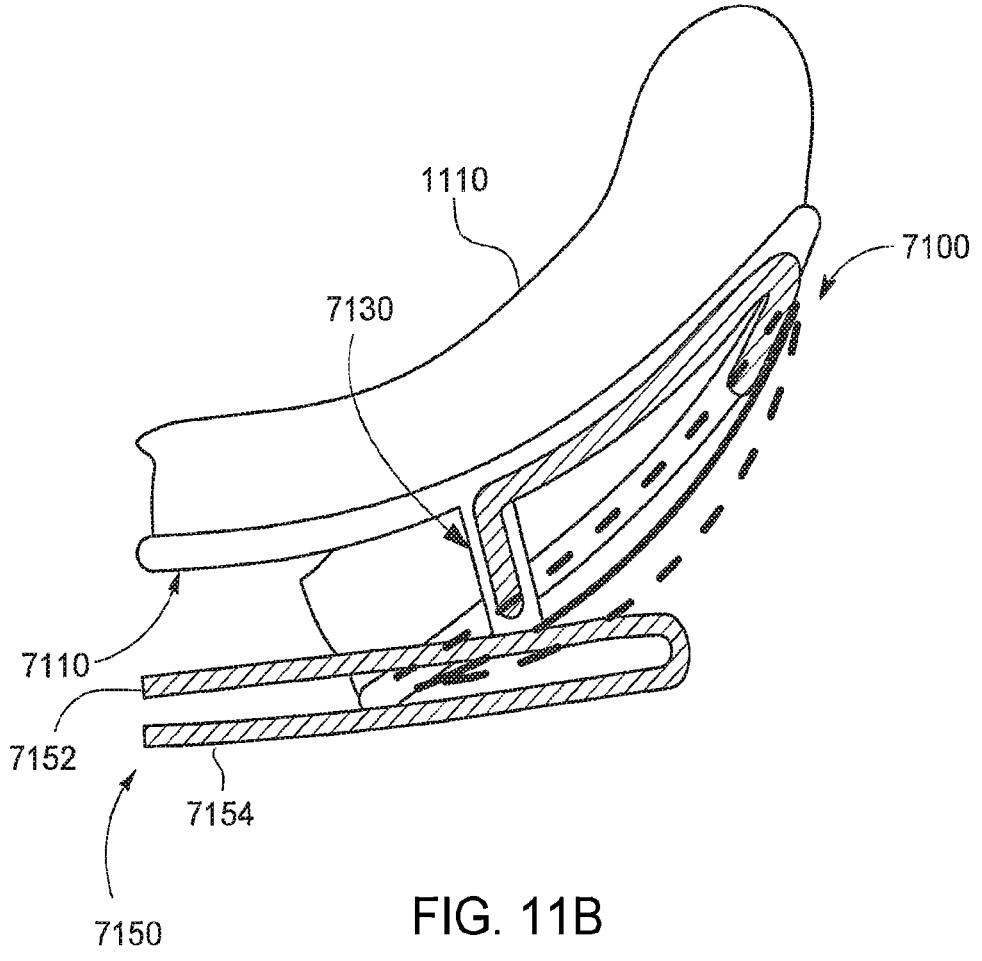

FIG. 11B is a partial top view of the exemplary skeletal frame and interface chassis of FIG. 11A.

Figure 12A:
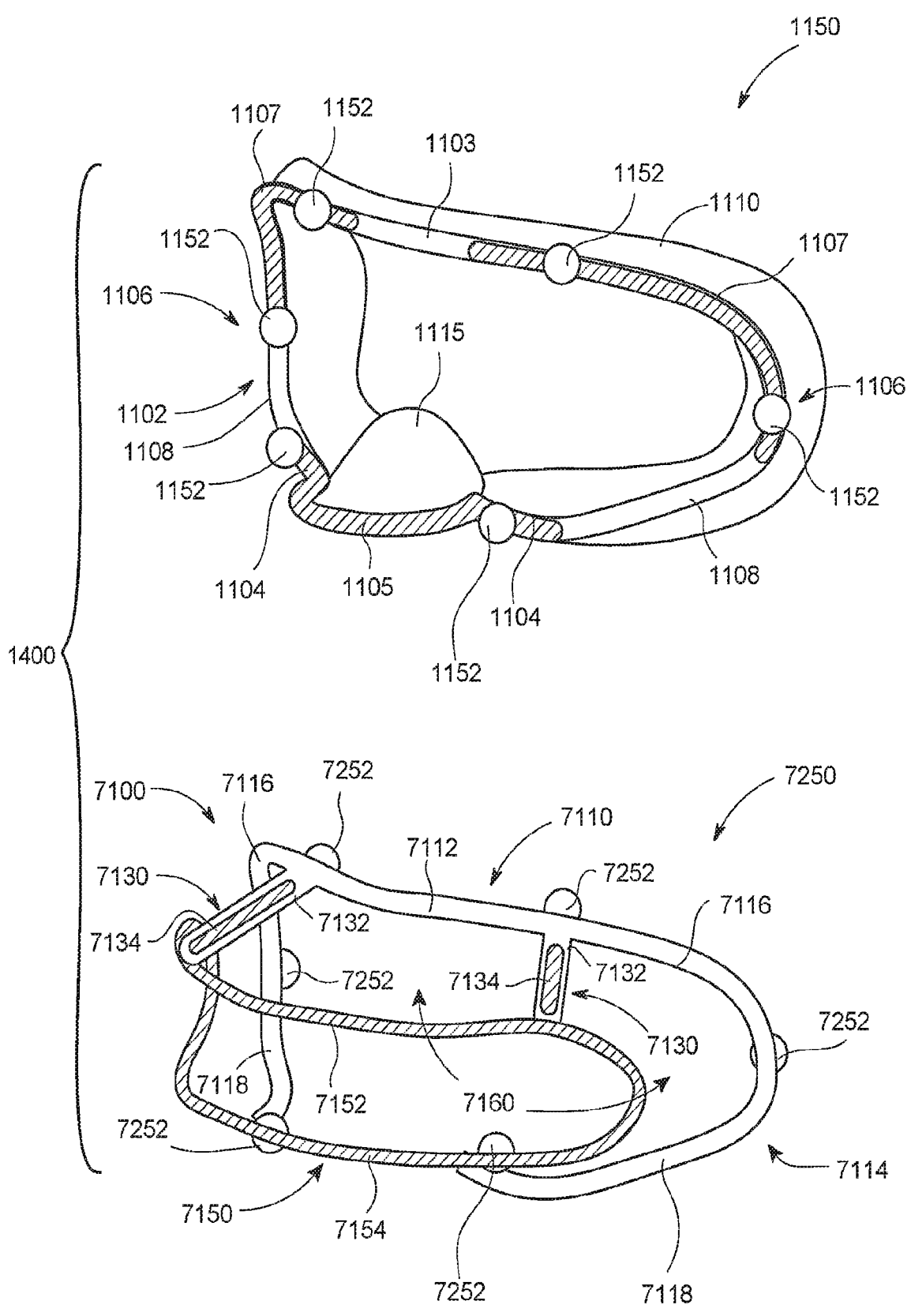

FIG. 12A is a perspective view of a further exemplary skeletal frame and interface chassis.

Figures 12B, 12C:
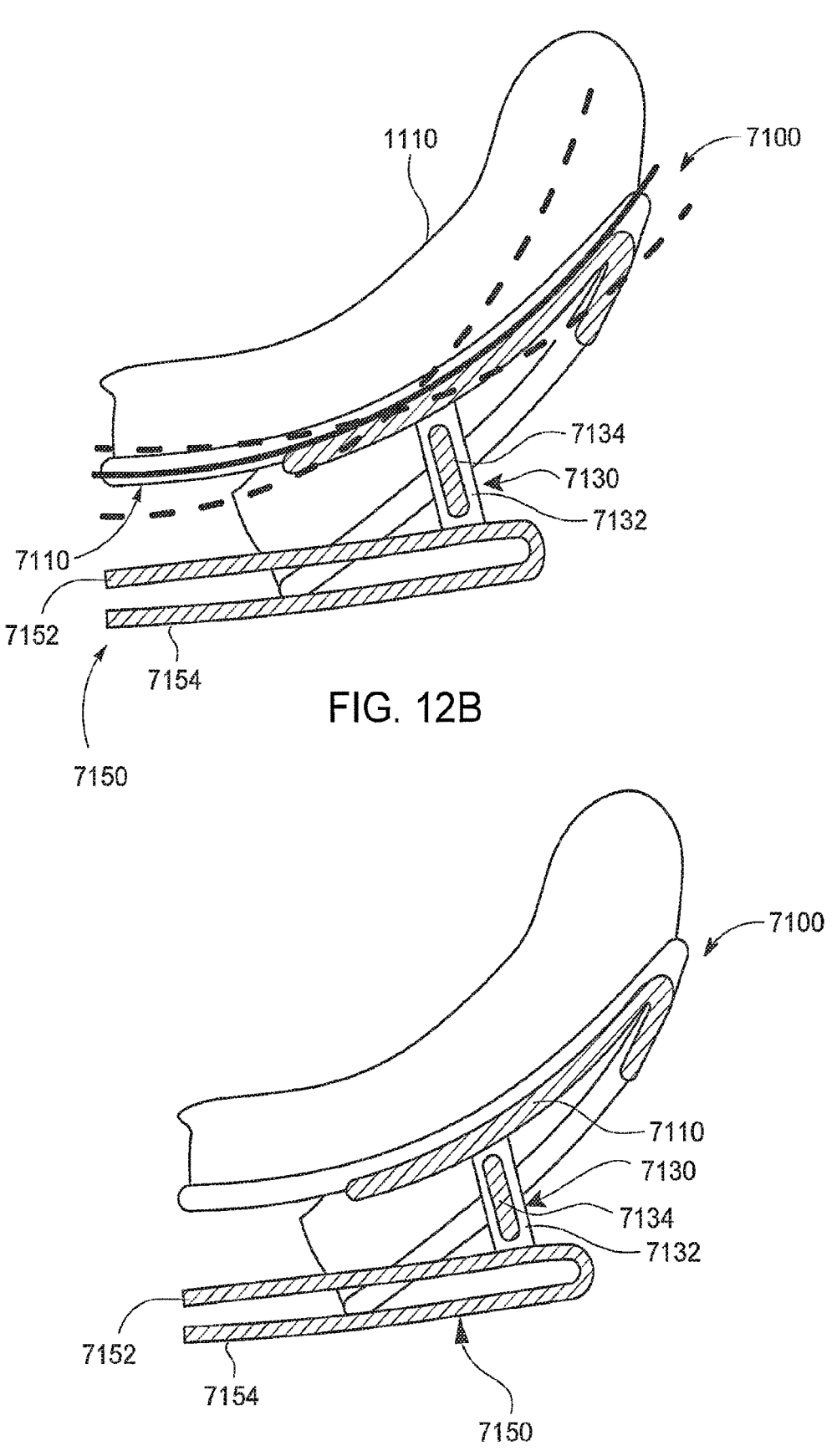

FIG. 12B is a partial top view of the exemplary skeletal frame and interface chassis of FIG. 12A.

Figure 12D:
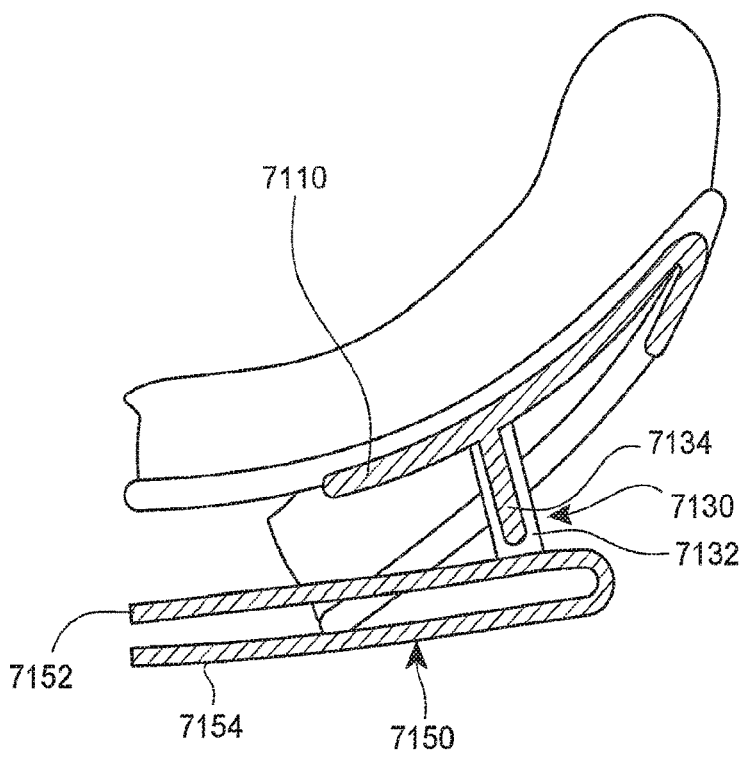
Figure 12E:
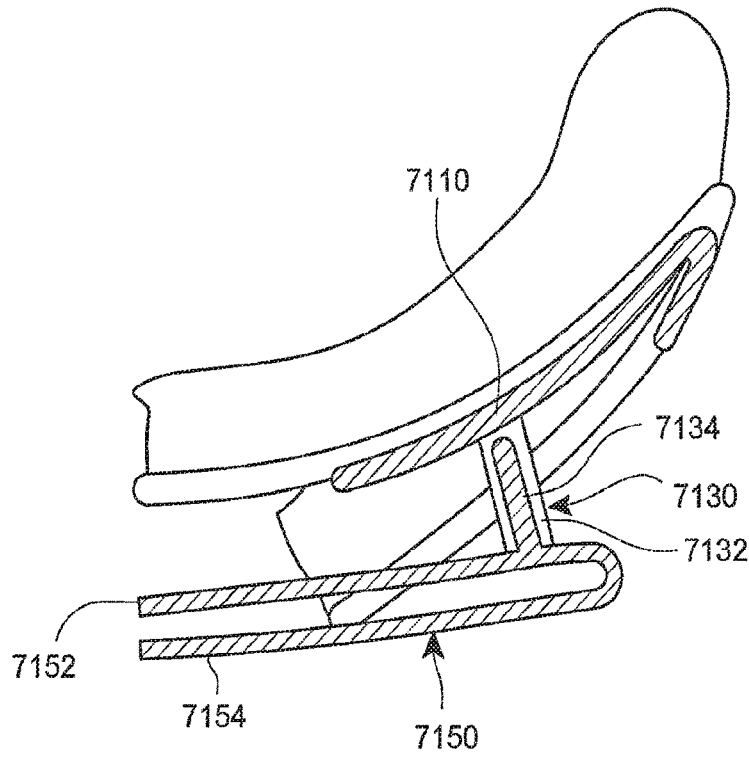

FIGS. 12C-12E are top views of exemplary configurations of a strut of the skeletal frame.

Figure 13A:
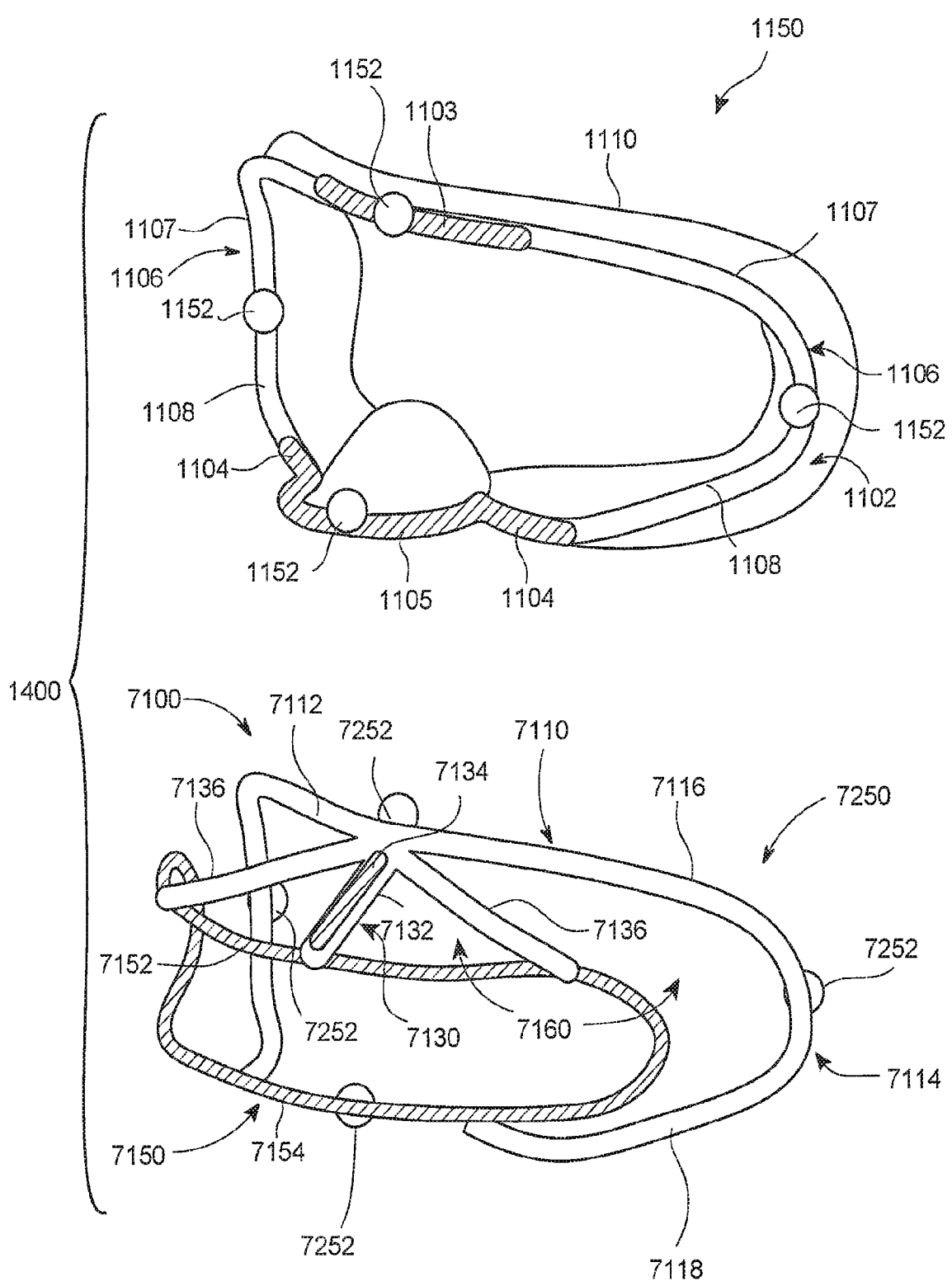

FIG. 13A is a perspective view of a further exemplary skeletal frame and interface chassis.

Figure 13B:
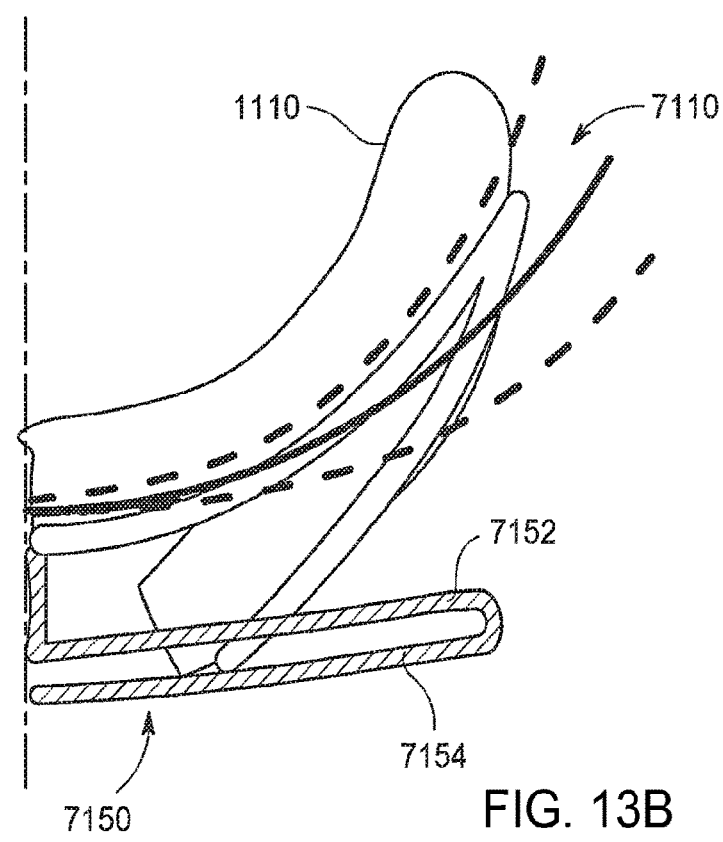

FIG. 13B is a partial top view of the exemplary skeletal frame and interface chassis of FIG. 13A.

Figure 14A:
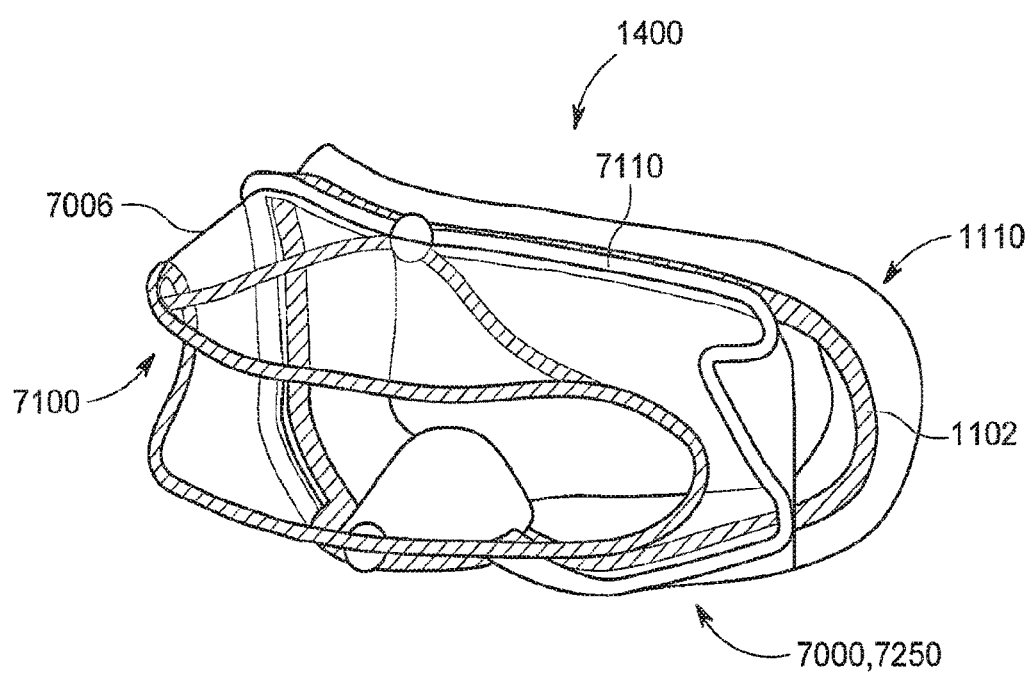

FIG. 14A is a perspective view of an exemplary shroud connected to an exemplary interface chassis and face engaging portion according to one aspect of the present technology.

Figure 14B:
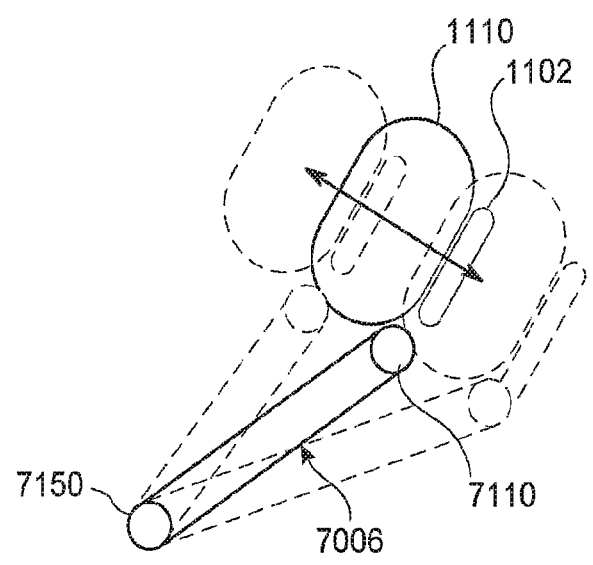

FIG. 14B is a schematic view demonstrating adaptive movement of the structure shown in FIG. 14A.

Figure 15:
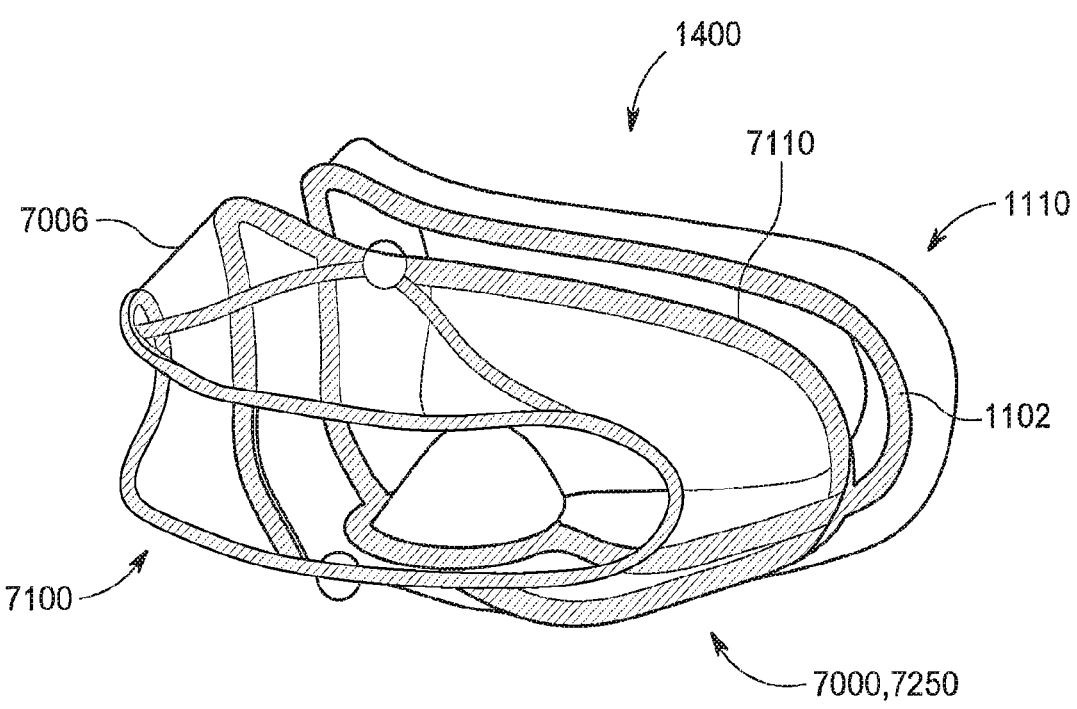

FIG. 15 is a perspective view of an exemplary shroud connected to an exemplary interface chassis and face engaging portion according to one aspect of the present technology.

Figure 16:
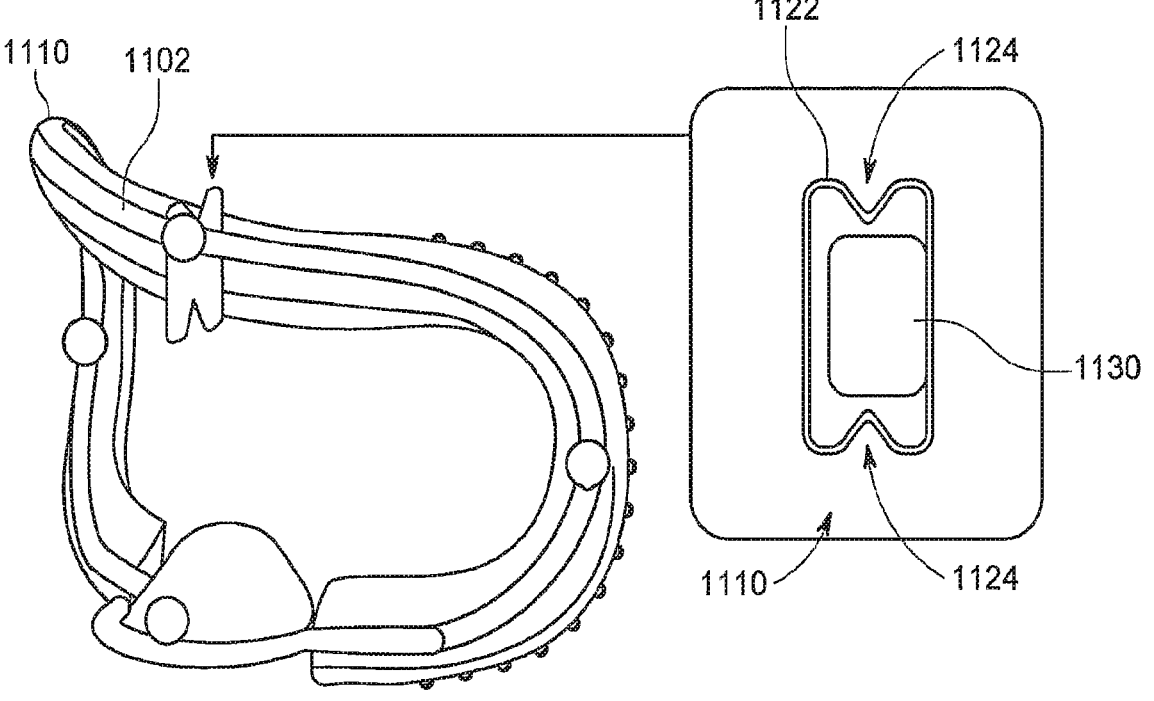

FIG. 16 is a perspective view of an exemplary face engaging portion according to one aspect of the present technology.

Figure 17A:
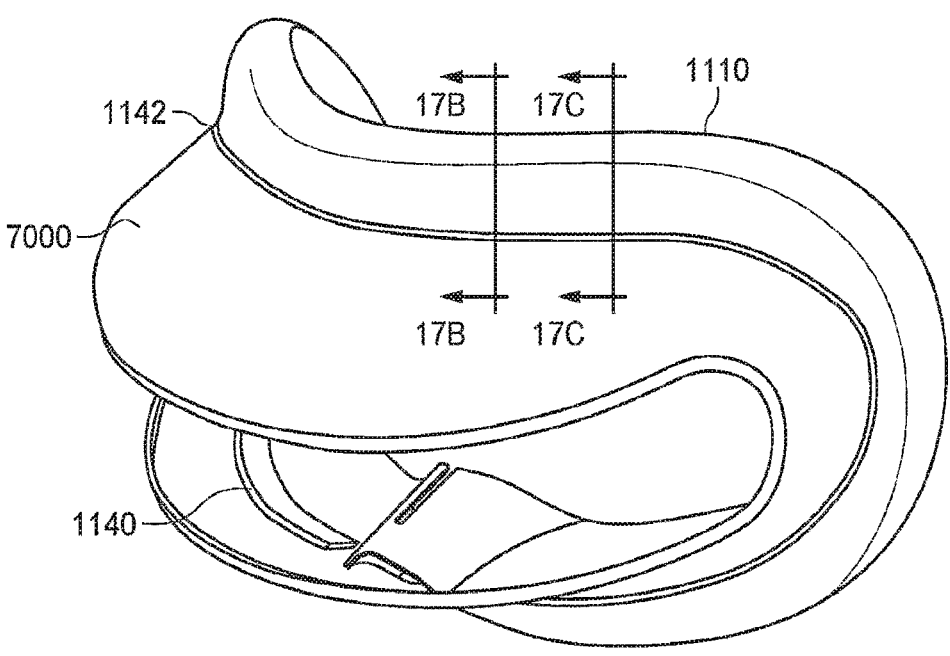

FIG. 17A is a perspective view of an exemplary shroud provided to an interfacing structure according to one aspect of the present technology.

Figure 17B:
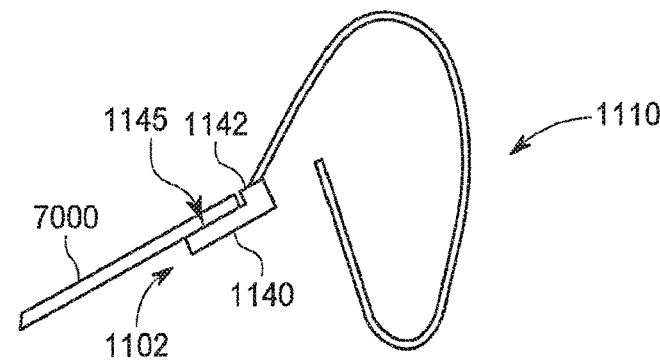
Figure 17C:
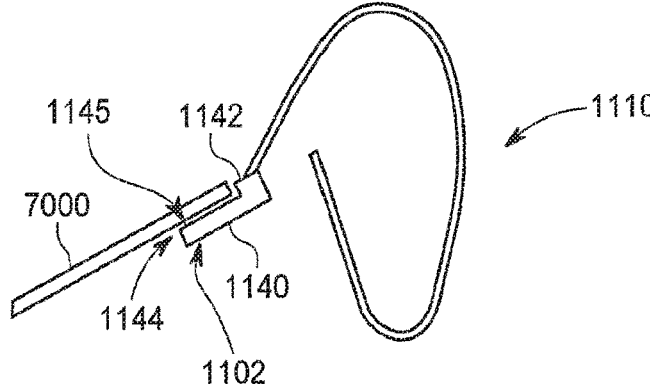

FIG. 17B and FIG. 17C are cross-sectional views of the arrangement shown in FIG. 17A according to examples of the present technology.

Figure 18A:
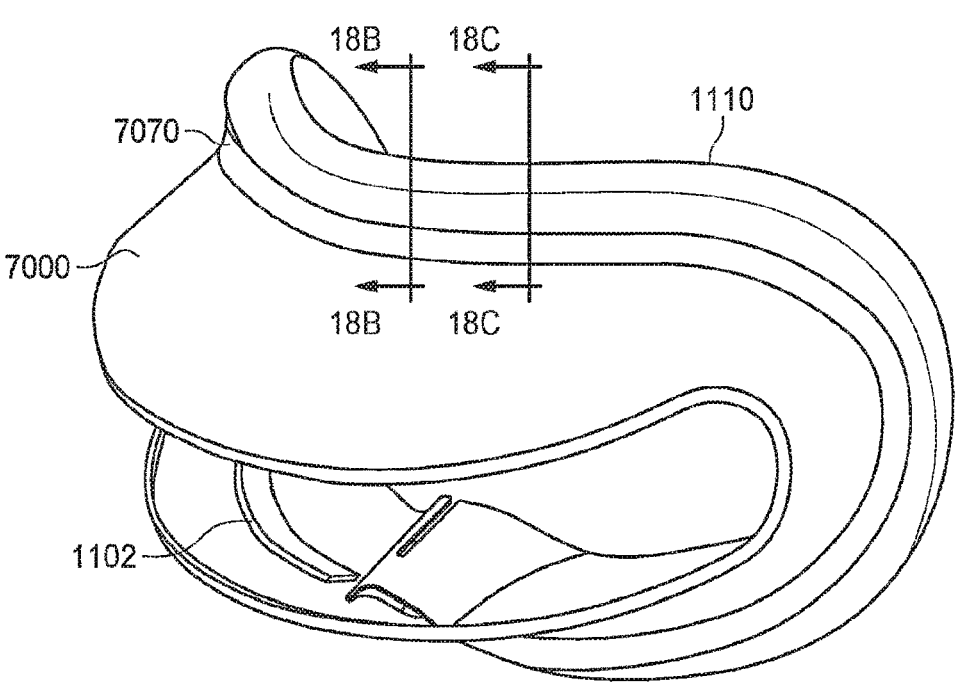

FIG. 18A is a perspective view of an exemplary shroud provided to an interfacing structure according to one aspect of the present technology.

Figure 18B:
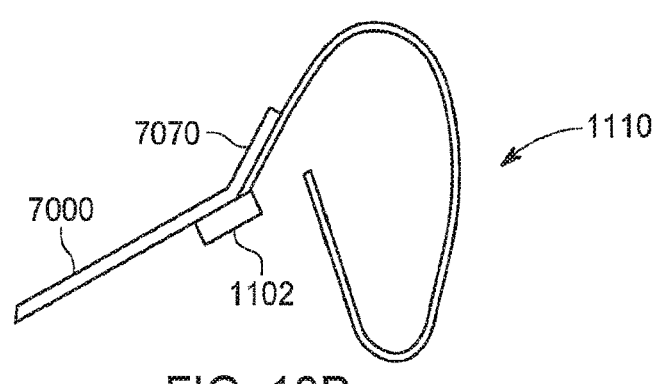
Figure 18C:
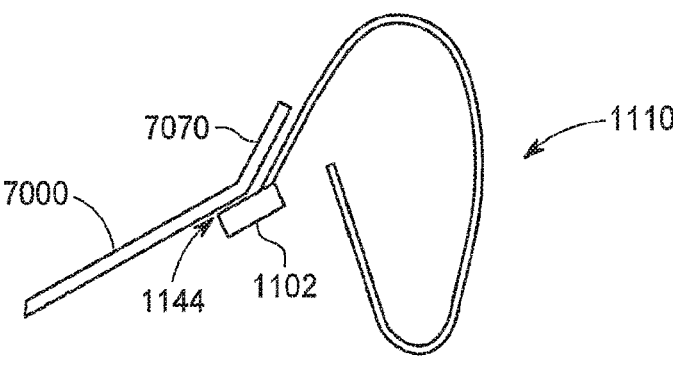

FIG. 18B and FIG. 18C are cross-sectional views of the arrangement shown in FIG. 18A according to examples of the present technology.

Figure 19A:
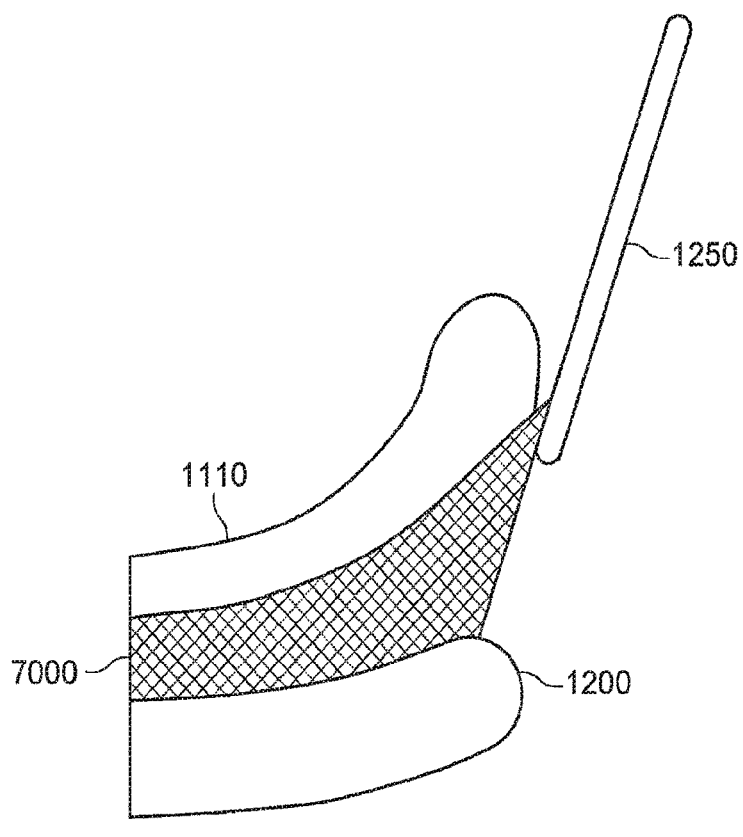

FIG. 19A shows a partial top view of a positioning and stabilizing structure according to one aspect of the present technology.

Figure 19B:
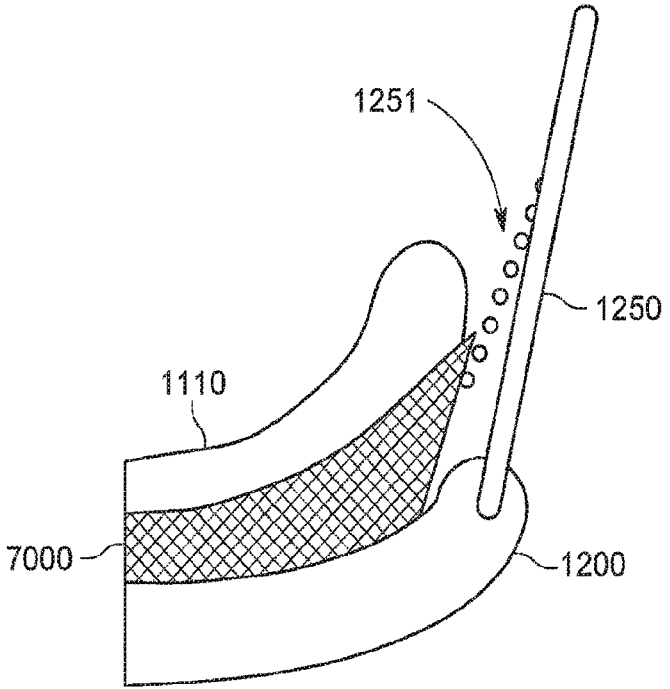

FIG. 19B shows a partial top view of a positioning and stabilizing structure according to another aspect of the present technology.

Figure 20:
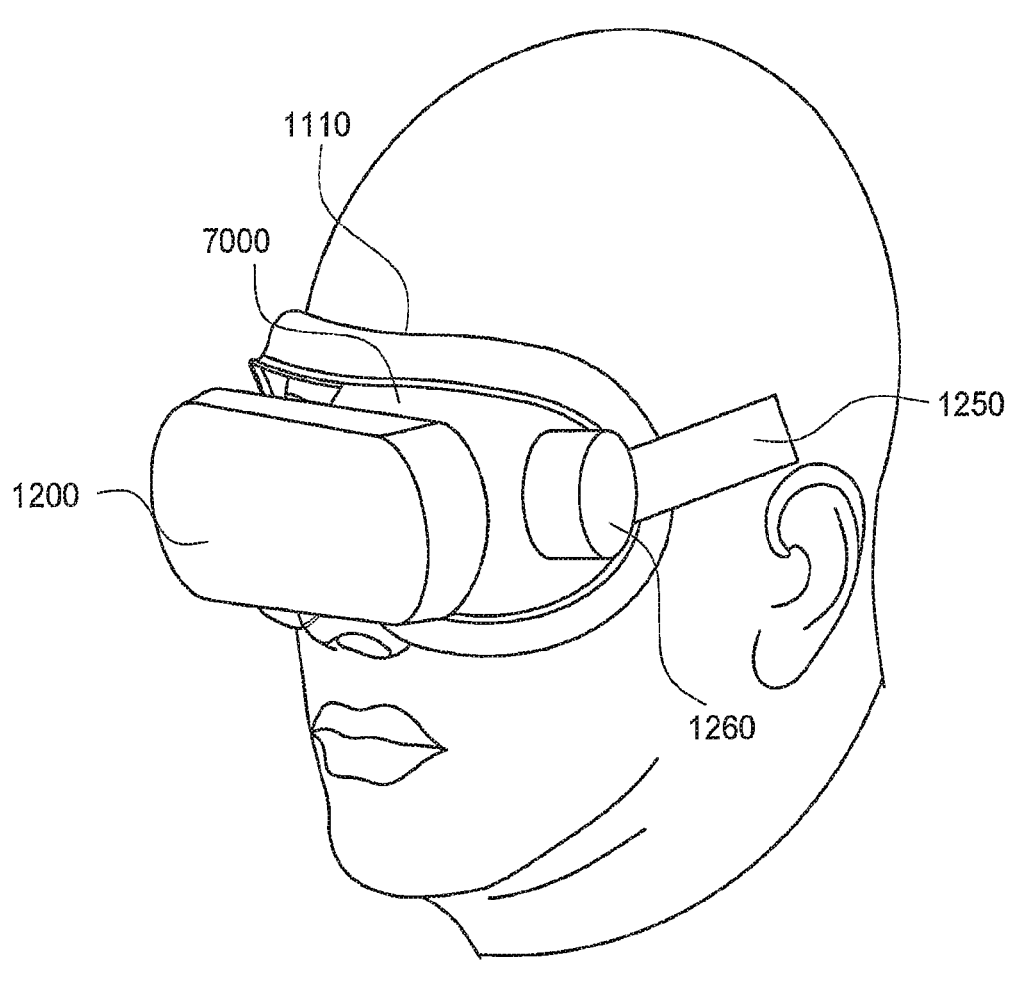

FIG. 20 shows a perspective view of a positioning and stabilizing structure according to one aspect of the present technology.

FIG. 21 shows a top view of an interfacing structure according to one aspect of the present technology.

FIGS. 21-1 and 21-2 are enlarged detail views of a portion of the interfacing structure of FIG. 21.

Figure 21A:
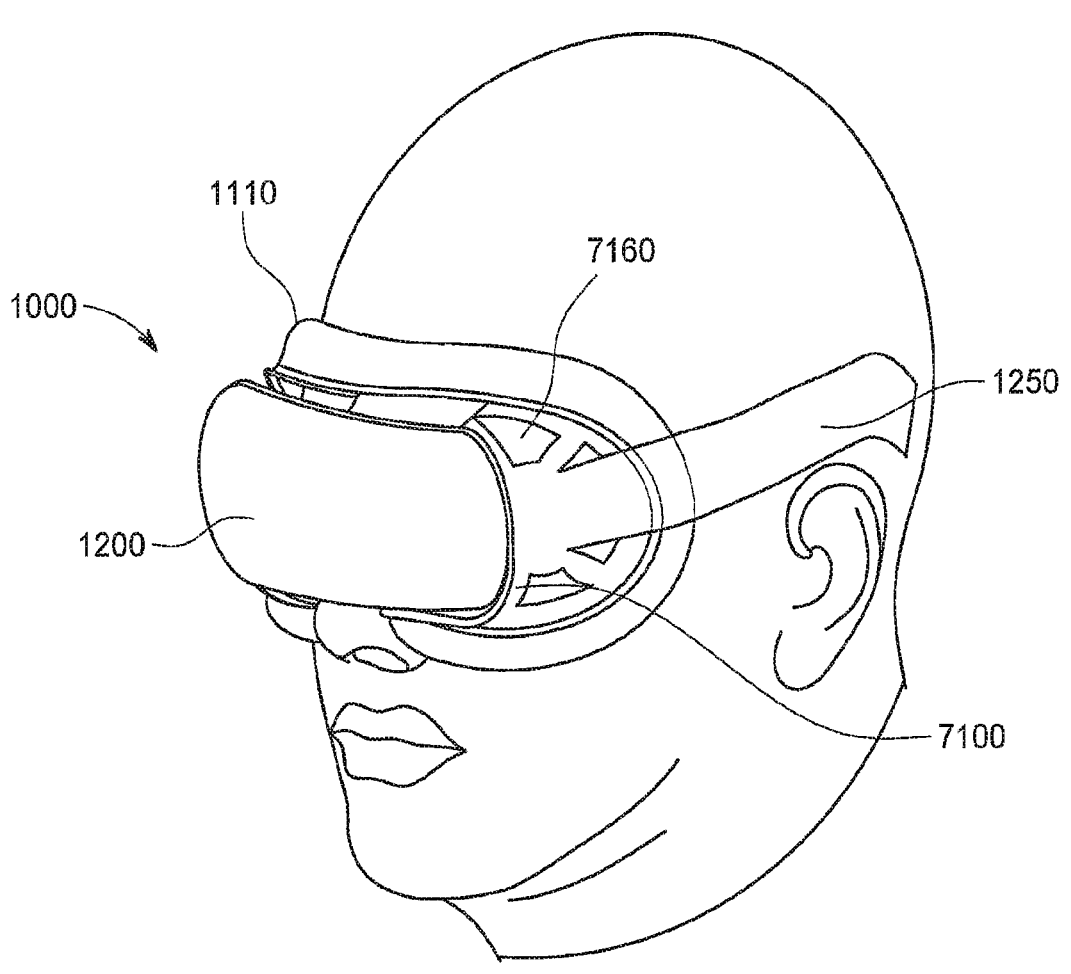

FIG. 21A shows a perspective view of a head-mounted display system according to one aspect of the present technology.

Figure 21B:
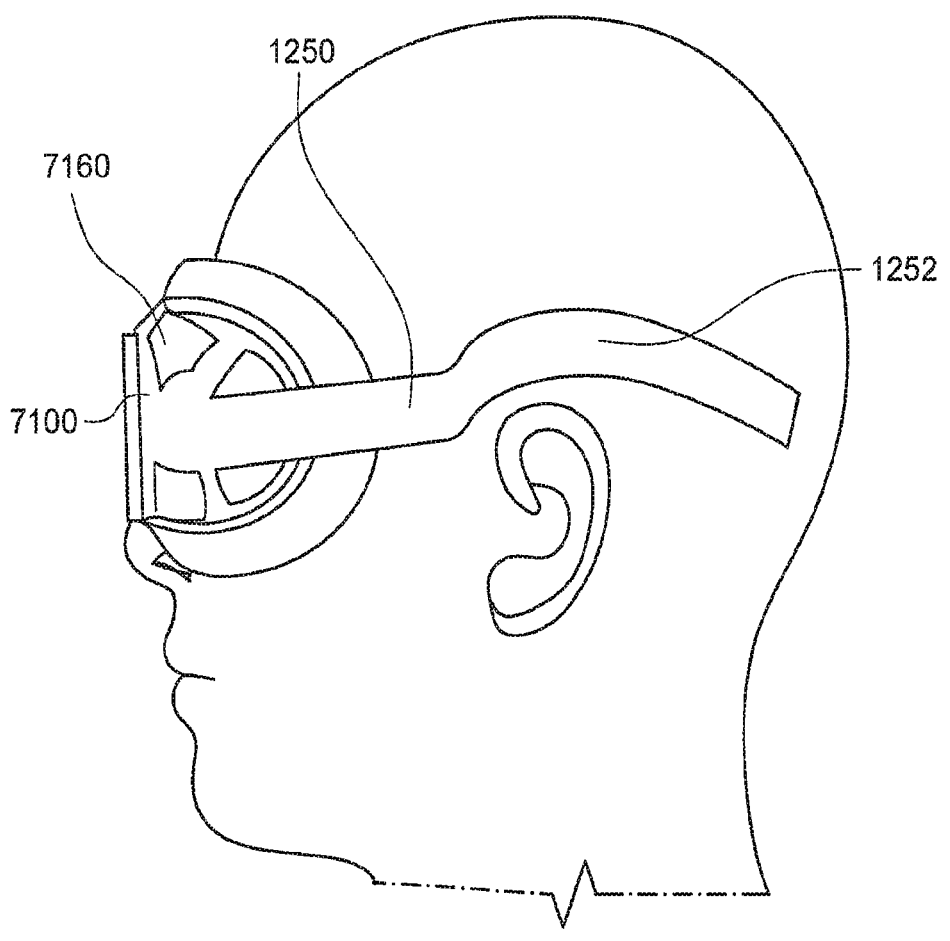

FIG. 21B shows a side view of a positioning and stabilizing structure of the head-mounted display system.

Figure 21C:
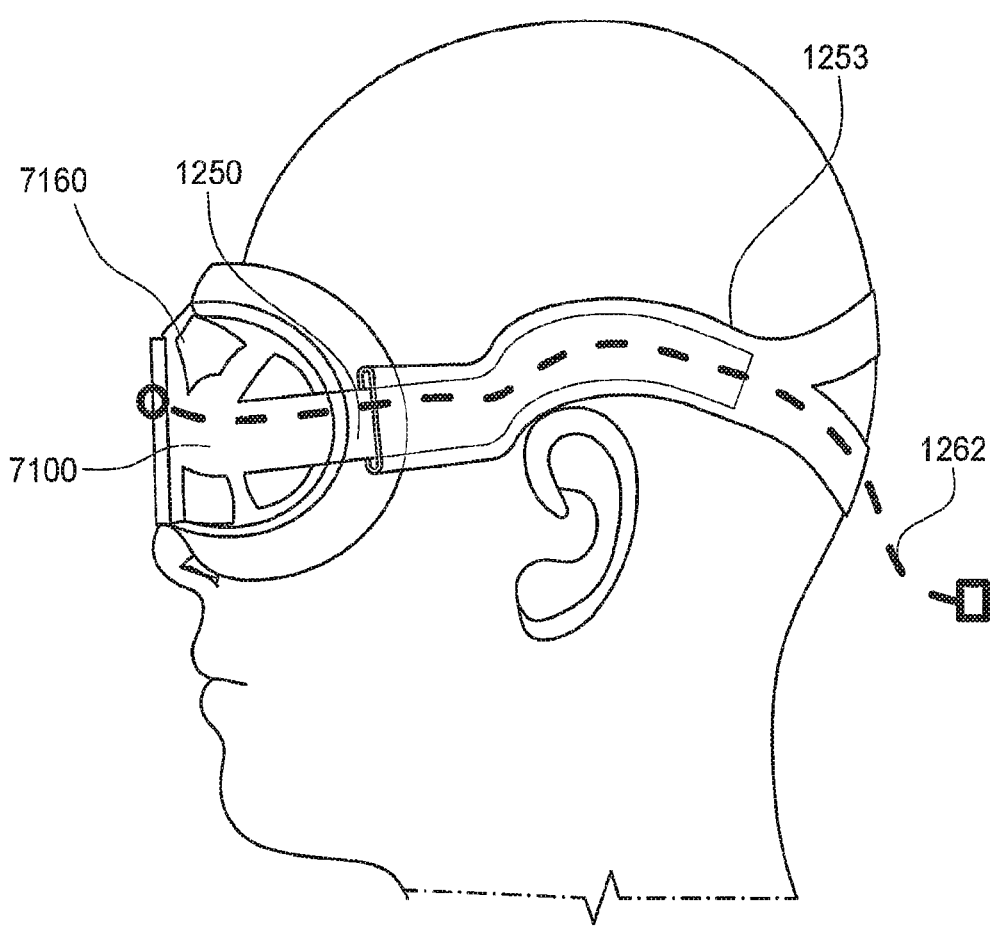

FIG. 21C shows a side view of another positioning and stabilizing structure of the head-mounted display system.

Figure 21D:
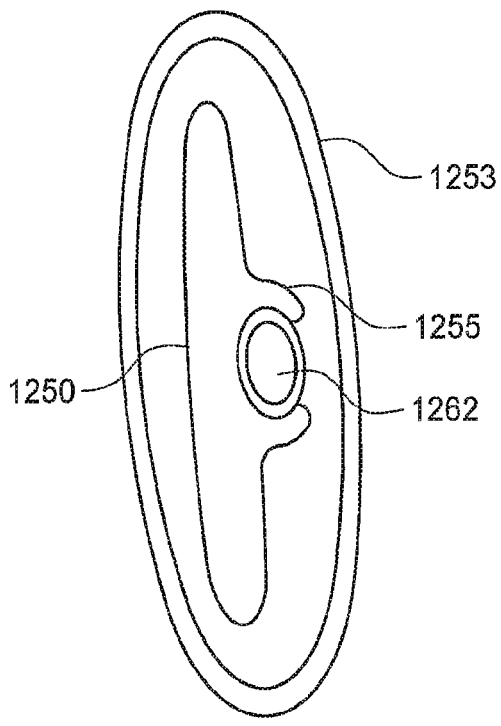

FIG. 21D shows a cross-sectional view of the positioning and stabilizing structure of FIG. 21C.

5 DETAILED DESCRIPTION OF EXAMPLES OF THE TECHNOLOGY

Before the present technology is described in further detail, it is to be understood that the technology is not limited to the particular examples described herein, which may vary. It is also to be understood that the terminology used in this disclosure is for the purpose of describing only the particular examples discussed herein, and is not intended to be limiting.

The following description is provided in relation to various examples which may share one or more common characteristics and/or features. It is to be understood that one or more features of any one example may be combinable with one or more features of another example or other examples. In addition, any single feature or combination of features in any of the examples may constitute a further example.

In the following detailed description, reference is made to accompanying drawings which form a part of the detailed description. The illustrative embodiments described in the detailed description, depicted in the drawings and defined in the claims, are not intended to be limiting. Other embodiments may be utilised and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

5.1 Immersive Technologies

Immersive technologies may present a user with a combination of a virtual environment and the user's physical environment, or the real world. The user may interact with the resulting immersive or combined reality.

The device immerses the user by augmenting or replacing stimuli associated with one of the user's five senses with a virtual stimuli. Typically this is a virtual stimuli, although there could be additional stimuli that augment or replace stimuli associated with one of the additional four senses.

In some forms, a particular immersive technology may present a user with a combination of a virtual environment and the user's environment. At least a portion of the resulting environment may include a virtual environment. In some examples, the entire resulting environment may be a virtual environment (e.g., meaning the user's environment may be block from view or otherwise obstructed). In other forms, at least a portion of the user's physical environment may still be visually observable.

In some forms, the user may use different types of immersive technologies, which may include, but are not limited to, virtual reality (VR), augmented reality (AR), or mixed reality (MR). Each type of immersive technology may present the user with a different environment and/or a different way to interact with the environment.

In some forms, a display system may be used with each type of immersive technology. A display screen of the display system may provide a virtual environment component to the combination environment (i.e., the combination of the virtual and user's environments). In certain forms, the display screen may be an electronic screen.

In at least some types of immersive technologies (e.g., VR, AR, MR, etc.), positioning and stabilizing the electronic screen may be useful in operating a respective device. For example, the user may desire the electronic screen to be positioned close enough to their eyes to allow for easy viewing, but far enough away so as not to cause discomfort. Additionally, the electronic screen may need to be spaced far enough away so that users may simultaneously wear corrective lenses, like glasses. In addition, users may seek to maintain the orientation of the electronic screen relative to their eyes. In other words, users who walk, or otherwise move, while using these devices may not want the device to bounce or otherwise move on their head (e.g., particularly relative to their eyes), as this may cause dizziness and/or discomfort to the user. Therefore, these devices may be supported snuggly against the user's head in order to limit relative movement between the user's eyes and the device.

In one form, the present technology comprises a method for using a VR device comprising supporting the device on the user's head proximate to at least one of the user's eyes, and within the user's line of sight.

In certain examples of the present technology, a head-mounted display unit is supported in front of both of the user's eyes in order to block, obstruct, and/or limit ambient light from reaching the user's eyes.

Any features disclosed below in the context of a device configured for VR are to be understood as being applicable to devices configured for AR, unless the context clearly requires otherwise. Likewise features disclosed below in the context of a device configured for AR are to be understood as being applicable to devices configured for VR, unless the context clearly requires otherwise. For the avoidance of doubt, a feature disclosed in the context of a device that does not have a transparent display, through which the user can view the real world, is to be understood as being applicable to a device having such a transparent display unless the context clearly requires otherwise. Likewise a feature disclosed in the context of a device that has a transparent display, through which the real-world can be viewed, is to be understood to be applicable to a device in which the display is electronic and through which the real-world cannot be viewed directly through a transparent material.

5.2 Virtual Reality Display System

As shown in FIGS. 4A and 4B, a display apparatus, display system, display interface or head-mounted display system 1000 in accordance with one aspect of the present technology comprises the following functional aspects: an interfacing structure 1100, a head-mounted display unit 1200, and a positioning and stabilizing structure 1300. In some forms, a functional aspect may provide one or more physical components. In some forms, one or more physical components may provide one or more functional aspects. The head-mounted display unit 1200 may comprise a display. In use, the head-mounted display unit 1200 is arranged to be positioned proximate and anterior to the user's eyes, so as to allow the user to view the display.

In other aspects, the head-mounted display system 1000 may also include a display unit housing 1205, an optical lens 1240, a controller 1270, a speaker 1272, a power source 1274, and/or a control system 1276. In some examples, these may be integral pieces of the head-mounted display system 1000, while in other examples, these may be modular and incorporated into the head-mounted display system 1000 as desired by the user.

5.2.1 Head-Mounted Display Unit

The head-mounted display unit 1200 may include a structure for providing an observable output to a user. Specifically, the head-mounted display unit 1200 is arranged to be held (e.g., manually, by a positioning and stabilizing structure, etc.) in an operational position in front of a user's face.

In some examples, the head-mounted display unit 1200 may include a display screen 1220, a display unit housing 1205, an interfacing structure 1100, and/or an optical lens 1240. These components may be permanently assembled in a single head-mounted display unit 1200, or they may be separable and selectively connected by the user to form the head-mounted display unit 1200. Additionally, the display screen 1220, the display unit housing 1205, the interfacing structure 1100, and/or the optical lens 1240 may be included in the head-mounted display system 1000, but may not be part of the head-mounted display unit 1200.

5.2.1.1 Display Screen

Some forms of the head-mounted display unit 1200 include a display, for example a display screen—not shown in FIG. 4B, but provided within the display housing 1205. The display screen may include electrical components that provide an observable output to the user.

In one form of the present technology, a display screen provides an optical output observable by the user. The optical output allows the user to observe a virtual environment and/or a virtual object.

The display screen may be positioned proximate to the user's eyes, in order to allow the user to view the display screen. For example, the display screen may be positioned anterior to the user's eyes. The display screen can output computer generated images and/or a virtual environment.

In some forms, the display screen is an electronic display. The display screen may be a liquid crystal display (LCD), or a light emitting diode (LED) screen.

In certain forms, the display screen may include a back-light, which may assist in illuminating the display screen. This may be particularly beneficial when the display screen is viewed in a dark environment.

In some forms, the display screen may extend wider a distance between the user's pupils. The display screen may also be wider than a distance between the user's cheeks.

In some forms, the display screen may display at least one image that is observable by the user. For example, the display screen may display images that change based on predetermined conditions (e.g., passage of time, movement of the user, input from the user, etc.).

In certain forms, portions of the display screen may be visible to only one of the user's eyes. In other words, a portion of the display screen may be positioned proximate and anterior to only one of the user's eyes (e.g., the right eye), and is blocked from view from the other eye (e.g., the left eye).

In one example, the display screen may be divided into two sides (e.g., a left side and a right side), and may display two images at a time (e.g., one image on either side).

Each side of the display screen may display a similar image. In some examples, the images may be identical, while in other examples, the images may be slightly different.

Together, the two images on the display screen may form a binocular display, which may provide the user with a more realistic VR experience. In other words, the user's brain may process the two images from the display screen 1220 together as a single image. Providing two (e.g., un-identical) images may allow the user to view virtual objects on their periphery, and expand their field of view in the virtual environment.

In certain forms, the display screen may be positioned in order to be visible by both of the user's eyes. The display screen may output a single image at a time, which is viewable by both eyes. This may simplify the processing as compared to the multi-image display screen.

5.2.1.2 Display Housing

In some forms of the present technology as shown in FIGS. 4A and 4B, a display unit housing 1205 provides a support structure for the display screen, in order to maintain a position of at least some of the components of the display screen relative to one another, and may additionally protect the display screen and/or other components of the head-mounted display unit 1200. The display unit housing 1205 may be constructed from a material suitable to provide protection from impact forces to the display screen. The display unit housing 1205 may also contact the user's face, and may be constructed from a biocompatible material suitable for limiting irritation to the user.

A display unit housing 1205 in accordance with some forms of the present technology may be constructed from a hard, rigid or semi-rigid material, such as plastic.

In certain forms, the rigid or semi-rigid material may be at least partially covered with a soft and/or flexible material (e.g., a textile, silicone, etc.). This may improve biocompatibility and/or user comfort because the at least a portion of the display unit housing 1205 that the user engages (e.g., grabs with their hands) includes the soft and/or flexible material.

A display unit housing 1205 in accordance with other forms of the present technology may be constructed from a soft, flexible, resilient material, such as silicone rubber.

In some forms, the display unit housing 1205 may have a substantially rectangular or substantially elliptical profile. The display unit housing 1205 may have a three-dimensional shape with the substantially rectangular or substantially elliptical profile.

In certain forms, the display unit housing 1205 may include a superior face 1230, an inferior face 1232, a lateral left face 1234, a lateral right face 1236, and an anterior face 1238. The display screen 1220 may be held within the faces in use.

In certain forms, the superior face 1230 and the inferior face 1232 may have substantially the same shape.

In one form, the superior face 1230 and the inferior face 1232 may be substantially flat, and extend along parallel planes (e.g., substantially parallel to the Frankfort horizontal in use).

In certain forms, the lateral left face 1234 and the lateral right face 1236 may have substantially the same shape.

In one form, the lateral left face 1234 and the lateral right face 1236 may be curved and/or rounded between the superior and inferior faces 1230, 1232. The rounded and/or curved faces 1234, 1236 may be more comfortable for a user to grab and hold while donning and/or doffing the head-mounted display system 1000.

In certain forms, the anterior face 1238 may extend between the superior and inferior faces 1230, 1232. The anterior face 1238 may form the anterior most portion of the head-mounted display system 1000.

In one form, the anterior face 1238 may be a substantially planar surface, and may be substantially parallel to the coronal plane, while the head-mounted display system 1000 is worn by the user.

In one form, the anterior face 1238 may not have a corresponding opposite face (e.g., a posterior face) with substantially the same shape as the anterior face 1238. The posterior portion of the display unit housing 1205 may be at least partially open (e.g., recessed in the anterior direction) in order to receive the user's face.

In some forms, the display screen is permanently integrated into the head-mounted display system 1000. The display screen may be a device usable only as a part of the head-mounted display system 1000.

In some forms, the display unit housing 1205 may enclose the display screen, which may protect the display screen and/or limit user interference (e.g., moving and/or breaking) with the components of the display screen.

In certain forms, the display screen may be substantially sealed within the display unit housing 1205, in order to limit the collection of dirt or other debris on the surface of the display screen, which could negatively affect the user's ability to view an image output by the display screen. The user may not be required to break the seal and access the display screen, since the display screen is not removable from the display unit housing 1205.

In some forms, the display screen is removably integrated into the head-mounted display system 1000. The display screen may be a device usable independently of the head-mounted display system 1000 as a whole. For example, the display screen may be provided on a smart phone, or other portable electronic device.

In some forms, the display unit housing 1205 may include a compartment. A portion of the display screen may be removably receivable within the compartment. For example, the user may removably position the display screen in the compartment. This may be useful if the display screen performs additional functions outside of the head-mounted display unit 1200 (e.g., is a portable electronic device like a cell phone). Additionally, removing the display screen from the display unit housing 1205 may assist the user in cleaning and/or replacing the display screen.

Certain forms of the display housing include an opening to the compartment, allowing the user to more easily insert and remove the display screen from the compartment. The display screen may be retained within the compartment via a frictional engagement.

In certain forms, a cover may selectively cover the compartment, and may provide additional protection and/or security to the display screen 1220 while positioned within the compartment.

In certain forms, the compartment may open on the superior face. The display screen may be inserted into the compartment in a substantially vertical direction while the display interface 3000 is worn by the user.

5.2.1.3 Interfacing Structure

As shown in FIGS. 4A and 4B, some forms of the present technology include an interfacing structure 1100 is positioned and/or arranged in order to conform to a shape of a user's face, and may provide the user with added comfort while wearing and/or using the head-mounted display system 1000.

In some forms, the interfacing structure 1100 is coupled to a surface of the display unit housing 1205.

In some forms, the interfacing structure 1100 may extent at least partially around the display unit housing 1205, and may form a viewing opening. The viewing opening may at least partially receive the user's face in use. Specifically, the user's eyes may be received within the viewing opening formed by the interfacing structure 1100.

In some forms, the interfacing structure 1100 in accordance with the present technology may be constructed from a biocompatible material.

In some forms, the interfacing structure 1100 in accordance with the present technology may be constructed from a soft, flexible, and/or resilient material.

In certain forms, the interfacing structure 1100 in accordance with the present technology may be constructed from silicone rubber and/or foam.

In some forms, the interfacing structure 1100 may contact sensitive regions of the user's face, which may be locations of discomfort. The material forming the interfacing structure 1100 may cushion these sensitive regions, and limit user discomfort while wearing the head-mounted display system 1000.

In certain forms, these sensitive regions may include the user's forehead. Specifically, this may include the region of the user's head that is proximate to the frontal bone, like the Epicranius and/or the glabella. This region may be sensitive because there is limited natural cushioning from muscle and/or fat between the user's skin and the bone. Similarly, the ridge of the user's nose may also include little to no natural cushioning.

In some forms, the interfacing structure 1100 may comprise a single element. In some embodiments the interfacing structure 1100 may be designed for mass manufacture. For example, the interfacing structure 1100 may be designed to comfortably fit a wide range of different face shapes and sizes.

In some forms, the interfacing structure 1100 may include different elements that overlay different regions of the user's face. The different portions of the interfacing structure 1100 may be constructed from different materials, and provide the user with different textures and/or cushioning at different regions.

5.2.1.3.1 Light Shield

Some forms of the head-mounted display system 1000 may include a light shield that may be constructed from an opaque material and can block ambient light from reaching the user's eyes. The light shield may be part of the interfacing structure 1100 or may be a separate element. In some examples the interfacing structure 1100 may form a light shield by shielding the user's eyes from ambient light, in addition to providing a comfortable contacting portion for contact between the head-mounted display 1200 and the user's face. In some examples a light shield may be formed from multiple components working together to block ambient light.

In certain forms, the light shield can obstruct ambient light from reaching an eye region, which may be formed on regions of the Epicranius, the user's sphenoid, across the outer cheek region between the sphenoid to the left or right zygomatic arch, over the zygomatic arch, across the inner cheek region from the zygomatic arches towards the alar crests, and on the users' nasal ridge inferior to the sellion to enclose a portion of the users' face therebetween.

In one form, the light shield may not contact the user's face around its entire perimeter. For example, the light shield may be spaced from the user's nasal rigid. The width of this spacing may be substantially small, so as to substantially limit the ingress of ambient light. However, the user's nasal ridge may be sensitive and easily irritated. Thus, avoiding direct contact with the user's nasal ridge may improve user comfort while wearing the head-mounted display system 1000.

In certain forms, the light shield may be a portion of the display unit housing 1205, and may be integrally or removably coupled to the display unit housing 1205. In one form, if the display unit housing 1205 is usable with a display screen outputting AR or MR, and VR, the light shield may be removable from the display unit housing 1205, and only coupled to the display unit housing 1205 while using VR.

5.2.1.3.1.1 Seal-Forming Structure

As shown in FIG. 4D, in one form of the present technology, the interfacing structure 1100 acts as a seal-forming structure, and provides a target seal-forming region. The target seal-forming region is a region on the seal-forming structure where sealing may occur. The region where sealing actually occurs—the actual sealing surface—may change within a given session, from day to day, and from user to user, depending on a range of factors including but not limited to, where the display unit housing 1205 is placed on the face, tension in the positioning and stabilizing structure 1300, and/or the shape of a user's face.

In one form the target seal-forming region is located on an outside surface of the interfacing structure 1100.

In some forms, the light shield may form the seal-forming structure and seal against the user's face.

In certain forms, the entire perimeter of the light shield or interfacing structure 1100 may seal against the user's skin, and can block ambient light from reaching an eye region. The eye region may be formed on regions of the Epicranius, the user's sphenoid, across the outer cheek region between the sphenoid to the left or right zygomatic arch, over the zygomatic arch, across the inner cheek region from the zygomatic arches towards the alar crests, and on the users' nasal ridge inferior to the sellion to enclose a portion of the users' face therebetween.

When acting as a seal-forming structure, the light shield or interfacing structure 1100 may contact sensitive areas the user's face, like the user's nasal ridge. This contact may entirely prevent the ingress of ambient light. Sealing around the entire perimeter of the display unit housing 1205 may improve performance of the head-mounted display system 1000. Additionally, biocompatible materials may be selected so that direct contact with the user's nasal ridge does not significantly reduce user comfort while wearing the head-mounted display system 1000.

In certain forms of the present technology, a system is provided comprising more than one interfacing structure 1100, each being configured to correspond to a different size and/or shape range. For example the system may comprise one form of interfacing structure 1100 suitable for a large sized head, but not a small sized head and another suitable for a small sized head, but not a large sized head. The different interfacing structures 1100 may be removable and replaceable so that different users with different sized heads may use the same head-mounted display system 1000.

In some forms, the seal-forming structure may be formed on regions of the Epicranius, the user's sphenoid, across the outer cheek region between the sphenoid to the left or right zygomatic arch, over the zygomatic arch, across the inner cheek region from the zygomatic arches towards the alar crests, and on the users' nasal ridge inferior to the sellion to enclose a portion of the users' face therebetween. This defined region may be an eye region.

In certain forms, this may seal around the user's eyes. The seal created by the seal-forming structure or interfacing structure 1100 may create a light seal, in order to limit ambient light from reaching the user's eyes.

5.2.1.3.2 Material Biocompatibility

Biocompatible materials are considered to be materials that undergo a full evaluation of their biological responses, relevant to their safety in use, according to ISO 10993-1 standard. The evaluation considers the nature and duration of anticipated contact with human tissues when in-use. In some forms of the present technology, the materials utilised in the positioning and stabilizing structure and interfacing structure may undergo at least some of the following biocompatibility tests: Cytotoxicity-Elution Test (MeM Extract): ANSI/AAMI/ISO 10993-5; Skin Sensitisation: ISO 10993-10; Irritation: ISO 10993-10; Genotoxicity-Bacterial Mutagenicity Test: ISO 10993-3; Implantation: ISO 10993-6.

5.2.1.4 Optical Lenses

As shown in FIG. 4B, at least one lens 1240 may be disposed between the user's eyes and the display screen 1220. The user may view an image provided by the display screen 1220 through the lens 1240. The at least one lens 1240 may assist in spacing the display screen 1220 away from the user's face to limit eye strain. The at least one lens 1240 may also assist in better observing the image being displayed by the display screen 1220.

In some forms, the lenses 1240 are Fresnel lenses.

In some forms, the lens 1240 may have a substantially frustoconical shape. A wider end of the lens 1240 may be disposed proximate to the display screen 1220, and a narrower end of the lens 1240 may be disposed proximate to the user's eyes, in use.

In some forms, the lens 1240 may have a substantially cylindrical shape, and may have substantially the same width proximate to the display screen 1220, and proximate to the user's eyes, in use.

In some forms, the at least one lens 1240 may also magnify the image of the display screen 1220, in order to assist the user in viewing the image.

In some forms, the head-mounted display system 1000 includes two lenses 1240 (e.g., binocular display), one for each of the user's eyes. In other words, each of the user's eyes may look through a separate lens positioned anterior to the respective pupil. Each of the lenses 1240 may be identical, although in some examples, one lens 1240 may be different than the other lens 1240 (e.g., have a different magnification).

In certain forms, the display screen 1220 may output two images simultaneously. Each of the user's eyes may be able to see only one of the two images. The images may be displayed side-by-side on the display screen 1220. Each lens 1240 permits each eye to observe only the image proximate to the respective eye. The user may observe these two images together as a single image.

In some forms, the posterior perimeter of each lens 1240 may be approximately the size of the user's orbit. The posterior perimeter may be slightly larger than the size of the user's orbit in order to ensure that the user's entire eye can see into the respective lens 1240. For example, the outer edge of the each lens 1240 may be aligned with the user's frontal bone in the superior direction (e.g., proximate the user's eyebrow), and may be aligned with the user's maxilla in the inferior direction (e.g., proximate the outer cheek region).

The positioning and/or sizing of the lenses 1240 may allow the user to have approximately 360° of peripheral vision in the virtual environment, in order to closely simulate the physical environment.

In some forms, the head-mounted display system 1000 includes a single lens 1240 (e.g., monocular display). The lens 1240 may be positioned anterior to both eyes (e.g., so that both eyes view the image from the display screen 1220 through the lens 1240), or may be positioned anterior to only one eye (e.g., when the image from the displace screen 1220 is viewable by only one eye).

5.2.1.4.1 Lens Mounting

The lenses 1240 may be coupled to a spacer positioned proximate to the display screen 1220 (e.g., between the display screen 1220 and the interfacing structure 1100), so that the lenses 1240 are not in direct contact with the display screen 1220 (e.g., in order to limit the lenses 1240 from scratching the display screen 1220).

For example, the lenses 1240 may be recessed relative to the interfacing structure 1100 so that the lenses 1240 are disposed within the viewing opening. In use, each of the user's eyes are aligned with the respective lens 1240 while the user's face is received within the viewing opening (e.g., an operational position).

In some forms, the anterior perimeter of each lens 1240 may encompass approximately half of the display screen 1220. A substantially small gap may exist between the two lenses 1240 along a center line of the display screen 1220. This may allow a user looking through both lenses 1240 to be able to view substantially the entire display screen 1220, and all of the images being output to the user.

In certain forms, the center of the display screen 1220 (e.g., along the center line between the two lenses 1240) may not output an image. For example, in a binocular display (e.g., where each side of the display screen 1220 outputs substantially the same image), each image may be spaced apart on the display screen 1220. This may allow two lenses 1240 to be positioned in close proximity to the display screen 1220, while allowing the user to view the entirety of the image displayed on the display screen 1220.

In some forms, a protective layer 1242 may be formed around at least a portion of the lenses 1240. In use, the protective layer 1242 may be positioned between the user's face and the display screen 1220.

In some forms, a portion of each lens 1240 may project through the protective layer 1242 in the posterior direction. For example, the narrow end of each lens 1240 may project more posterior than the protective layer 1242 in use.

In some forms, the protective layer 1242 may be opaque so that light from the display screen 1220 is unable to pass through. Additionally, the user may be unable to view the display screen 1220 without looking through the lenses 1240.

In some forms, the protective layer 1242 may be non-planar, and may include contours that substantially match contours of the user's face. For example, a portion of the protective layer 1242 may be recessed in the anterior direction in order to accommodate the user's nose.

In certain forms, the user may not contact the protective layer 1242 while wearing the head-mounted display system 1000. This may assist in reducing irritation from additional contact with the user's face (e.g., against the sensitive nasal ridge region).

5.2.1.4.2 Corrective Lenses

In some examples, additional lenses may be coupled to the lenses 1240 so that the user looks through both the lens 1240 and the additional lens in order to view the image output by the display screen 1220.

In some forms, the additional lenses are more posterior than the lenses 1240, in use. Thus, the additional lenses are positioned closer to the user's eyes, and the user looks through the additional lenses before looking through the lenses 1240.

In some forms, the additional lenses may have a different magnification than the lenses 1240.

In some forms, the additional lenses, may be prescription strength lenses. The additional lenses may allow a user to view the display screen 1220 without glasses, which may be uncomfortable to wear while using the head-mounted display system 1000. The additional lenses may be removable so that users that do not require the additional lenses may still clearly view the display screen 1220.

5.2.2 Positioning and Stabilizing Structure

As shown in FIGS. 4A and 4B, the display screen 1220 and/or the display unit housing 1205 of the head-mounted display system 1000 of the present technology may be held in position in use by the positioning and stabilizing structure 1300.

To hold the display screen 1220 and/or the display unit housing 1205 in its correct operational position, the positioning and stabilizing structure 1300 is ideally comfortable against the user's head in order to accommodate the induced loading from the weight of the display unit in a manner that minimise facial markings and/or pain from prolonged use. There is also need to allow for a universal fit without trading off comfort, usability and cost of manufacture. The design criteria may include adjustability over a predetermined range with low-touch simple set up solutions that have a low dexterity threshold. Further considerations include catering for the dynamic environment in which the head-mounted display system 1000 may be used. As part of the immersive experience of a virtual environment, users may communicate, i.e. speak, while using the head-mounted display system 1000. In this way, the jaw or mandible of the user may move relative to other bones of the skull. Additionally, the whole head may move during the course of a period of use of the head-mounted display system 1000. For example, movement of a user's upper body, and in some cases lower body, and in particular, movement of the head relative to the upper and lower body.

In one form the positioning and stabilizing structure 1300 provides a retention force to overcome the effect of the gravitational force on the display screen 1220 and/or the display unit housing 1205.

In one form of the present technology, a positioning and stabilizing structure 1300 is provided that is configured in a manner consistent with being comfortably worn by a user. In one example the positioning and stabilizing structure 1300 has a low profile, or cross-sectional thickness, to reduce the perceived or actual bulk of the apparatus. In one example, the positioning and stabilizing structure 1300 comprises at least one strap having a rectangular cross-section. In one example the positioning and stabilizing structure 1300 comprises at least one flat strap.

In one form of the present technology, a positioning and stabilizing structure 1300 is provided that is configured so as not to be too large and bulky to prevent the user from comfortably moving their head from side to side.

In one form of the present technology, a positioning and stabilizing structure 1300 comprises a strap constructed from a laminate of a textile user-contacting layer, a foam inner layer and a textile outer layer. In one form, the foam is porous to allow moisture, (e.g., sweat), to pass through the strap. In one form, a skin contacting layer of the strap is formed from a material that helps wick moisture away from the user's face. In one form, the textile outer layer comprises loop material to engage with a hook material portion.

In certain forms of the present technology, a positioning and stabilizing structure 1300 comprises a strap that is extensible, e.g. resiliently extensible. For example the strap may be configured in use to be in tension, and to direct a force to draw the display screen 1220 and/or the display unit housing 1205 toward a portion of a user's face, particularly proximate to the user's eyes and in line with their field of vision. In an example the strap may be configured as a tie.

In one form of the present technology, the positioning and stabilizing structure 1300 comprises a first tie, the first tie being constructed and arranged so that in use at least a portion of an inferior edge thereof passes superior to an otobasion superior of the user's head and overlays a portion of a parietal bone without overlaying the occipital bone.

In one form of the present technology, the positioning and stabilizing structure 1300 includes a second tie, the second tie being constructed and arranged so that in use at least a portion of a superior edge thereof passes inferior to an otobasion inferior of the user's head and overlays or lies inferior to the occipital bone of the user's head.

In one form of the present technology, the positioning and stabilizing structure 1300 includes a third tie that is constructed and arranged to interconnect the first tie and the second tie to reduce a tendency of the first tie and the second tie to move apart from one another.

In certain forms of the present technology, a positioning and stabilizing structure 1300 comprises a strap that is bendable and e.g. non-rigid. An advantage of this aspect is that the strap is more comfortable against a user's head.

In certain forms of the present technology, a positioning and stabilizing structure 1300 comprises a strap constructed to be breathable to allow moisture vapour to be transmitted through the strap, In certain forms of the present technology, a system is provided comprising more than one positioning and stabilizing structure 1300, each being configured to provide a retaining force to correspond to a different size and/or shape range. For example the system may comprise one form of positioning and stabilizing structure 1300 suitable for a large sized head, but not a small sized head, and another. suitable for a small sized head, but not a large sized head.

In some forms, the positioning and stabilizing structure 1300 may include cushioning material (e.g., a foam pad) for contacting the user's skin. The cushioning material may provide added wearability to the positioning and stabilizing structure 1300, particularly if positioning and stabilizing structure 1300 is constructed from a rigid or semi-rigid material.

5.2.2.1 Temporal Connectors

As shown in FIG. 4C, some forms of the head-mounted display system 1000 or positioning and stabilizing structure 1300 include temporal connectors 1250, each of which may overlay a respective one of the user's temporal bones in use. A portion of the temporal connectors 1250, in-use, are in contact with a region of the user's head proximal to the otobasion superior, i.e. above each of the user's ears. In some examples, temporal connectors are strap portions of a positioning and stabilising structure 1300. In other examples, temporal connectors are arms of a head-mounted display unit 1200. In some examples a temporal connector of a head-mounted display system 1000 may be formed partially by a strap portion (e.g. a lateral strap portion 1330) of a positioning and stabilising structure 1300 and partially by an arm 1210 of a head-mounted display unit 1200.

The temporal connectors 1250 may be lateral portions of the positioning and stabilizing structure 1300, as each temporal connector 1250 is positioned on either the left or the right side of the user's head.

In some forms, the temporal connectors 1250 may extend in an anterior-posterior direction, and may be substantially parallel to the sagittal plane.

In some forms, the temporal connectors 1250 may be coupled to the display unit housing 1205. For example, the temporal connectors 1250 may be connected to lateral sides of the display unit housing 1205. For example, each temporal connector 1250 may be coupled to a respective one of the lateral left face 1234 and the lateral right face 1236.

In certain forms, the temporal connectors 1250 may be pivotally connected to the display unit housing 1205, and may provide relative rotation between each temporal connector 1250, and the display unit housing 1205.

In certain forms, the temporal connectors 1250 may be removably connected to the display unit housing 1205 (e.g., via a magnet, a mechanical fastener, hook and loop material, etc.).

In some forms, the temporal connectors 1250 may be arranged in-use to run generally along or parallel to the Frankfort Horizontal plane of the head and superior to the zygomatic bone (e.g., above the user's cheek bone).

In some forms, the temporal connectors 1250 may be positioned against the user's head similar to arms of eye-glasses, and be positioned more superior than the anti-helix of each respective ear.

In some forms, the temporal connectors 1250 may have a generally elongate and flat configuration. In other words, each temporal connector 1250 is far longer and wider (direction from top to bottom in the paper plane) than thick (direction into the paper plane).

In some forms, the temporal connectors 1250 may each have a three-dimensional shape which has curvature in all three axes (X, Y and Z). Although the thickness of each temporal connector 1250 may be substantially uniform, its height varies throughout its length. The purpose of the shape and dimension of each temporal connector 1250 is to conform closely to the head of the user in order to remain unobtrusive and maintain a low profile (e.g., not appear overly bulky).

In some forms, the temporal connectors 1250 may be constructed from a rigid or semi-rigid material, which may include plastic, Hytrel® (thermoplastic polyester elastomer), or another similar material. The rigid or semi-rigid material may be self-supporting and/or able to hold its shape without being worn. This can make it more intuitive or obvious for users to understand how to use the positioning and stabilizing structure 1300 and may contrast with a positioning and stabilizing structure 1300 that is entirely floppy and does not retain a shape. Maintaining the temporal connectors 1250 in the in-use state prior to use may prevent or limit distortion whilst the user is donning the positioning and stabilizing structure 1300 and allow a user to quickly fit or wear the head-mounted display system 1000.

In certain forms, the temporal connectors 1250 may be rigidizers, which may allow for a more effective (e.g., direct) translation of tension through the temporal connectors 1250 because rigidizers limit the magnitude of elongation or deformation of the arm while in-use.

In certain forms, the positioning and stabilizing structure 1300 may be designed so that the positioning and stabilizing structure 1300 springs 'out of the box' and generally into its in-use configuration. In addition, the positioning and stabilizing structure 1300 may be arranged to hold its in-use shape once out of the box (e.g., because rigidizers may be formed to maintain the shape of some or part of the positioning and stabilizing structure 1300). Advantageously, the orientation of the positioning and stabilizing structure 1300 is made clear to the user as the shape of the positioning and stabilizing structure 1300 is generally curved much like the rear portion of the user's head. That is, the positioning and stabilizing structure 1300 is generally dome shaped.

In certain forms, a flexible and/or resilient material may be disposed around the rigid or semi-rigid material of the temporal connectors 1250. The flexible material may be more comfortable against the user's head, in order to improve wearability and provide soft contact with the user's face. In one form, the flexible material is a textile sleeve at is permanently or removably coupled to each temporal connector 1250.

In one form, a textile may be over-moulded onto at least one side of the rigidizer. In one form, the rigidizer may be formed separately to the resilient component and then a sock of user contacting material (e.g., Breath-O-Prene™) may be wrapped or slid over the rigidizer. In alternative forms, the user contacting material may be provided to the rigidizer by adhesive, ultrasonic welding, sewing, hook and loop material, and/or stud connectors.

In some forms, the user contacting material may be on both sides of the rigidizer, or alternatively may only be on the user contacting side (e.g., the user contacting side) of the rigidizer to reduce bulk and cost of materials.

In some forms, the temporal connectors 1250 are constructed from a flexible material (e.g., a textile), which may be comfortable against the user's skin, and may not require an added layer to increase comfort.

5.2.2.2 Posterior Support Portion

As shown in FIG. 4C, some forms of the positioning and stabilizing structure 1300 may include a posterior support portion 1350 for assisting in supporting the display screen 1220 and/or the display unit housing 1205 (shown in FIG. 4B) proximate to the user's eyes. The posterior support portion 1350 may assist in anchoring the display screen and/or the display unit housing 1205 to the user's head in order to appropriately orient the display screen proximate to the user's eyes.

In some forms, the posterior support portion 1350 may be coupled to the display unit housing 1205 via the temporal connectors 1250.

In certain forms, the temporal connectors 1250 may be directly coupled to the display unit housing 1205 and to the posterior support portion 1350.

In some forms, the posterior support portion 1350 may have a three-dimensional contour curve to fit to the shape of a user's head. For example, the three-dimensional shape of the posterior support portion 1350 may have a generally round three-dimensional shape adapted to overlay a portion of the parietal bone and the occipital bone of the user's head, in use.

In some forms, the posterior support portion 1350 may be a posterior portion of the positioning and stabilizing structure 1300. The posterior support portion 1350 may provide an anchoring force directed at least partially in the anterior direction.

In certain forms, the posterior support portion 1350 is the inferior-most portion of the positioning and stabilizing structure 1300. For example, the posterior support portion 1350 may contact a region of the user's head between the occipital bone and the trapezius muscle. The posterior support portion 1350 may hook against an inferior edge of the occipital bone (e.g., the occiput). The posterior support portion 1350 may provide a force directed in the superior direction and/or the anterior direction in order to maintain contact with the user's occiput.

In certain forms, the posterior support portion 1350 is the inferior-most portion of the entire head-mounted display system 1000. For example, the posterior support portion 1350 may be positioned at the base of the user's neck (e.g., overlaying the occipital bone and the trapezius muscle more inferior than the user's eyes) so that the posterior support portion 1350 is more inferior than the display screen 1220 and/or the display unit housing 1205.

In some forms, the posterior support portion 1350 may include a padded material, which may contact the user's head (e.g., overlaying the region between the occipital bone and the trapezius muscle). The padded material may provide additional comfort to the user, and limit marks caused by the posterior support portion 1350 pulling against the user's head.

5.2.2.3 Forehead Support

Some forms of the positioning and stabilizing structure 1300 may include a forehead support or frontal support portion 1360 configured to contact the user's head superior to the user's eyes, while in use. The positioning and stabilising structure 1300 shown in FIG. 5B includes a forehead support 1360. In some examples the positioning and stabilising structure 1300 shown in FIG. 4A may include a forehead support 1360. The forehead support 1360 may overlay the frontal bone of the user's head. In certain forms, the forehead support 1360 may also be more superior than the sphenoid bones and/or the temporal bones. This may also position the forehead support 1360 more superior than the user's eyebrows.

In some forms, the forehead support 1360 may be an anterior portion of the positioning and stabilizing structure 1300, and may be disposed more anterior on the user's head than any other portion of the positioning and stabilizing structure 1300. The posterior support portion 1350 may provide a force directed at least partially in the posterior direction.

In some forms, the forehead support 1360 may include a cushioning material (e.g., textile, foam, silicone, etc.) that may contact the user, and may help to limit marks caused by the straps of the positioning and stabilizing structure 1300. The forehead support 1360 and the interfacing structure 1100 may work together in order to provide comfort to the user.

In some forms, the forehead support 1360 may be separate from the display unit housing 1205, and may contact the user's head at a different location (e.g., more superior) than the display unit housing 1205.

In some forms, the forehead support 1360 can be adjusted to allow the positioning and stabilizing structure 3000 to accommodate the shape and/or configuration of a user's face.

In some forms, the temporal connectors 1250 may be coupled to the forehead support 1360 (e.g., on lateral sides of the forehead support 1360). The temporal connectors 1250 may extend at least partially in the inferior direction in order to couple to the posterior support portion 1350.

In certain forms, the positioning and stabilizing structure 1300 may include multiple pairs of temporal connectors 1250. For example, one pair of temporal connectors 1250 may be coupled to the forehead support 1360, and one pair of temporal connectors 1250 may be coupled to the display unit housing 1205.

In some forms, the forehead support 1360 can be presented at an angle which is generally parallel to the user's forehead to provide improved comfort to the user. For example, the forehead support 1360 may position the user in an orientation that overlays the frontal bone, and is substantially parallel to the coronal plane. Positioning the forehead support substantially parallel to the coronal plane can reduce the likelihood of pressure sores which may result from an uneven presentation.

In some forms, the forehead support 1360 may be offset from a rear support or posterior support portion that contacts a posterior region of the user's head (e.g., an area overlaying the occipital bone and the trapezius muscle). In other words, an axis along a rear strap would not intersect the forehead support 1360, which may be disposed more inferior and anterior than the axis along the rear strap. The resulting offset between the forehead support 1360 and the rear strap may create moments that oppose the weight force of the display screen 1220 and/or the display unit housing 1205. A larger offset may create a larger moment, and therefore more assistance in maintaining a proper position of the display screen 1220 and/or the display unit housing 1205. The offset may be increased by moving the forehead support 1360 closer to the user's eyes (e.g., more anterior and inferior along the user's head), and/or increasing the angle of the rear strap so that it is more vertical.

5.2.2.4 Adjustable Straps

As shown in FIG. 4C, portions of the positioning and stabilizing structure 1300 may be adjustable, in order to impart a selective tensile force on the display screen 1220 and/or the display unit housing 1205 in order to secure a position of the display screen 1220 and/or the display unit housing 1205.

In some forms, the display unit housing 1205 may include at least one loop or eyelet 1254 (as shown in FIG. 4B), and at least one of the temporal connectors 1250 may be threaded through that loop, and doubled back on itself. The length of the temporal connector 1250 threaded through the respective eyelet 1254 may be selected by the user in order to adjust the tensile force provided by the positioning and stabilizing structure 1300. For example, threading a greater length of the temporal connector 1250 through the eyelet 1254 may supply a greater tensile force.

In some forms, at least one of the temporal connectors 1250 may include an adjustment portion 1256 and a receiving portion 1258 (as shown in FIG. 4C). The adjustment portion 1256 may be positioned through the eyelet 1254 on the display unit housing 1205, and may be coupled to the receiving portion 1258 (e.g., by doubling back on itself). The adjustment portion 1256 may include a hook material, and the receiving portion 1258 may include a loop material (or vice versa), so that the adjustment portion 1256 may be removably held in the desired position. In some examples, the hook material and the loop material may be Velcro.

In certain forms, adjusting the position of the adjustment portion 1256 relative to the receiving portion 1258 may apply a posterior force to the display screen 1220 and/or the display unit housing 1205, and increase or decrease a sealing force of the light shield against the user's head (e.g., when the light shield acts as a seal-forming structure).

In certain forms, the adjustment portion 1256 may be constructed from a flexible and/or resilient material, which may conform to a shape of the user's head and/or may allow the adjustment portion to be threaded through the eyelet 1254. For example, the adjustment portion(s) 1256 may be constructed from an elastic textile, which may provide an elastic, tensile force. The remainder of the temporal connectors 1250 may be constructed from the rigid or semi-rigid material described above (although it is contemplated that additional sections of the temporal connectors 1250 may also be constructed from a flexible material).

5.2.2.4.1 Top Strap

Figure 1A:
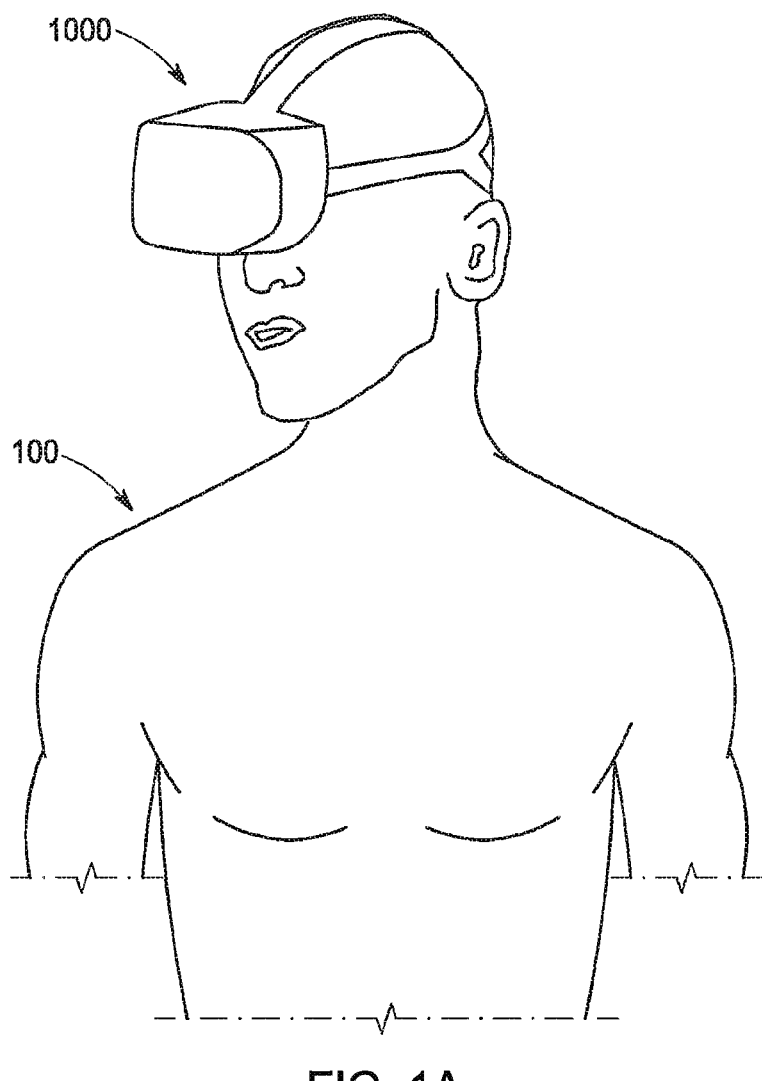
FIG. 1A shows a system including a user 100 wearing a head-mounted display system 1000, in the form of a face-mounted, virtual reality (VR) headset, displaying various images to the user 100. The user is standing while wearing the head-mounted display system 1000.
Figure 1B:
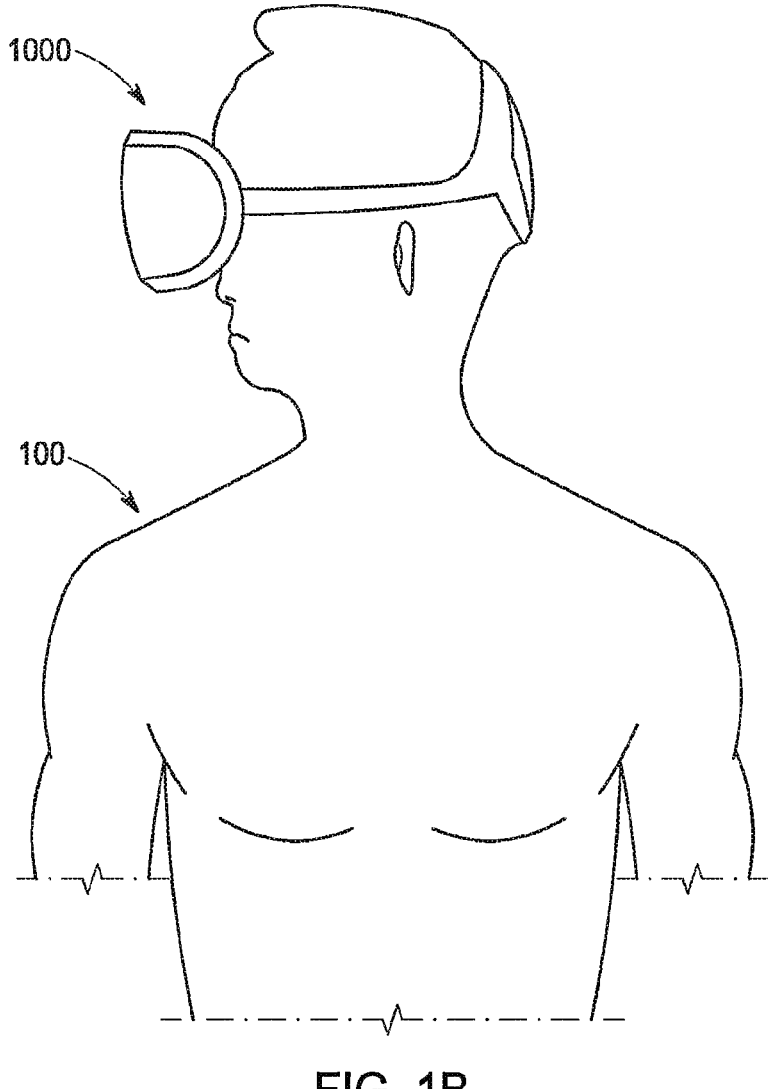
FIG. 1B shows a system including a user 100 wearing a head-mounted display system 1000, in the form of a floating virtual reality (VR) headset, displaying various images to the user. The user is sitting while wearing the display interface 100.
Figure 1C:
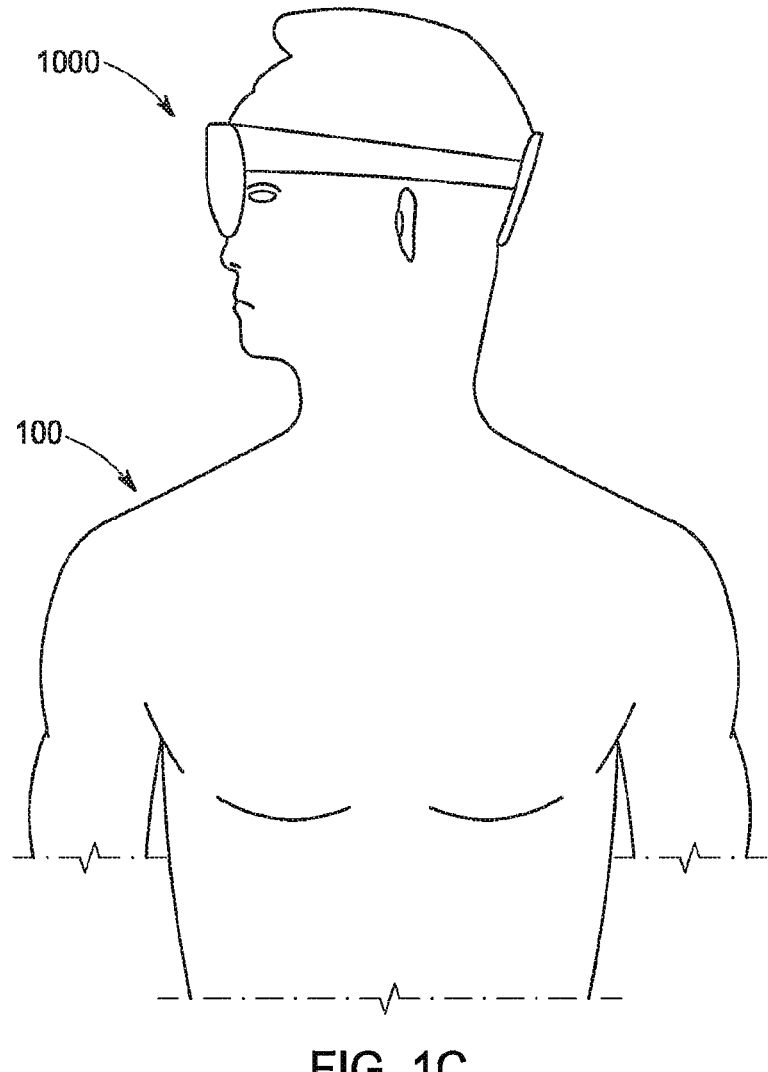
FIG. 1C shows a system including a user 100 wearing a head-mounted display system 1000, in the form of a floating augmented reality (AR) headset, displaying various images to the user. The user is standing while wearing the head-mounted display system 1000.

In some forms, the positioning and stabilizing structure 3000 may include a top strap portion, which may overlay a superior region of the user's head. The head-mounted display system 1000 shown in FIG. 1A has a top strap portion, for example.

In some forms, the top strap portion may extend between an anterior portion of the head-mounted display system 1000 and a posterior region of the head-mounted display system 1000.

In some forms, the top strap portion may be constructed from a flexible material, and may be configured to compliment the shape of the user's head.

In certain forms, the top strap portion may be connected to the display unit housing 1205. For example, the top strap portion may be coupled to the superior face 1230. The top strap portion may also be coupled to the display unit housing 1205 proximate to a posterior end of the display unit housing 1205.

In certain forms, the top strap portion may be coupled to the forehead support 1360. For example, the top strap portion may be coupled to the forehead support 1360 proximate to a superior edge. The top strap portion may be connected to the display unit housing 1205 through the forehead support 1360.

In some forms, the top strap portion may be connected to the posterior support portion 1350. For example, the top strap portion may be connected proximate to a superior edge of the posterior support portion 1350.

In some forms, the top strap portion may overlay the frontal bone and the parietal bone of the user's head.

In certain forms, the top strap portion may extend along the sagittal plane as it extends between the anterior and posterior portions of the head-mounted display system 1000.

In certain forms, the top strap portion may apply a tensile force oriented at least partially in the superior direction, which may oppose the force of gravity.

In certain forms, the top strap portion may apply a tensile force oriented at least partially in the posterior direction, which may pull the interfacing structure 1100 toward the user's face (and supply a portion of the sealing force when the light shield acts as a seal-forming structure).

In some forms, the top strap portion may be adjustable in order to impart a selective tensile force on the display screen 1220 and/or the display unit housing 1205 in order to secure a position of the display screen 1220 and/or the display unit housing 1205.

In certain forms, the display unit housing 1205 and/or the forehead support 1360 (as the case may be) may include at least one loop or eyelet 1254, and the top strap portion may be threaded through that eyelet 1254, and doubled back on itself. The length of the top strap portion threaded through the eyelet 1254 may be selected by the user in order to adjust the tensile force provided by the positioning and stabilizing structure 1300. For example, threading a greater length of the top strap portion through the eyelet 1254 may supply a greater tensile force.

In some forms, the top strap portion may include an adjustment portion and a receiving portion. The adjustment portion may be positioned through the eyelet 1254, and may be coupled to the receiving portion (e.g., by doubling back on itself). The adjustment portion may include a hook material, and the receiving portion may include a loop material (or vice versa), so that the adjustment portion may be removably held in the desired position. In some examples, the hook material and the loop material may be Velcro.

5.2.2.5 Rotational Control

In some forms, the display unit housing 1205 and/or the display screen 1220 may pivot relative to the user's face while the user has donned the positioning and stabilizing structure. This may allow the user to see the physical environment while still wearing the user interface 3000. This may be useful for users who want to take a break for viewing the virtual environment, but do not wish to doff the positioning and stabilizing structure 1300.

In some forms, a pivot connection 1260 may be formed between a superior portion of the display unit housing 1205 and the positioning and stabilizing structure 1300. For example, the pivot connection 1260 may be formed on the superior face 1230 of the display unit housing 1205.

In certain forms, the pivot connection 1260 may be coupled to the forehead support 1360. The display unit housing 1205 may be able to pivot about an inferior edge of the forehead support 1360.

In one form, the temporal connectors 1250 may be coupled to the forehead support 1360 in order to allow the display unit housing 1205 to pivot.

In some forms, the pivot connection 1260 may be a ratchet connection, and may maintain the display unit housing 1205 in a raised position without additional user intervention.

5.2.3 Controller

As shown in FIG. 6, some forms of the head-mounted display system 1000 include a controller 1270 that can be engageable by the user in order to provide user input to the virtual environment and/or to control the operation of the head-mounted display system 1000. The controller 1270 can be connected to the head-mounted display unit 1200, and provide the user the ability to interact with virtual objects output to the user from the head-mounted display unit 1200.

5.2.3.1 Handheld Controller

In some forms, the controller 1270 may include a handheld device, and may be easily grasped by a user with a single hand.

In certain forms, the head-mounted display system 1000 may include two handheld controllers. The handheld controllers may be substantially identical to one another, and each handheld controller may be actuatable by a respective one of the user's hands.

In some forms, the user may interact with the handheld controller(s) in order to control and/or interact with virtual objects in the virtual environment.

In some forms, the handheld controller includes a button that may be actuatable by the user. For example, the user's fingers may be able to press the button while grasping the handheld controller.

In some forms, the handheld controller may include a directional control (e.g., a joystick, a control pad, etc.). The user's thumb may be able to engage the directional control while grasping the handheld controller.

In certain forms, the controller 1270 may be wirelessly connected to the head-mounted display unit 1200. For example, the controller 1270 and the head-mounted display unit 1200 may be connected via Bluetooth, Wi-Fi, or any similar means.

In certain forms, the controller 1270 and the head-mounted display unit 1200 may be connected with a wired connection.

5.2.3.2 Fixed Controller

In some forms, at least a portion of the controller 1270 may be integrally formed on the display unit housing 1205.

In some forms, the controller 1270 may include control buttons that are integrally formed on the display unit housing 1205. For example, the control buttons may be formed on the superior face 1230 and/or the inferior face 1232, so as to be engageable by the user's fingers when holding the user's palm rests against the lateral left or right face 1234, 1236 of the display unit housing 1205. Control buttons may also be disposed on other faces of the display unit housing 1205.

In some forms, the user may interact with the control buttons in order to control at least one operation of the head-mounted display system 1000. For example, the control button may be an On/Off button, which may selectively control whether the display screen 1220 is outputting an image to the user.

In certain forms, the control buttons and the head-mounted display unit 1200 may be connected with a wired connection.

In some forms, the head-mounted display system 1000 may include both the handheld controller and the control buttons.

5.2.4 Speaker

With reference to FIG. 6, in some forms the head-mounted display system 1000 includes a sound system or speakers 1272 that may be connected to the head-mounted display unit 1200 and positionable proximate to the user's ears in order to provide the user with an auditory output.

In some forms, the speakers 1272 may be positionable around the user's ears, and may block or limit the user from hearing ambient noise.

In certain forms, the speakers 1272 may be wirelessly connected to the head-mounted display unit 1200. For example, the speakers 1272 and the head-mounted display unit 1200 may be connected via Bluetooth, Wi-Fi, or any similar means.

In some forms, the speaker 1272 includes a left ear transducer and a right ear transducer. In some forms, the left and right ear transducers may output different signals, so that the volume and or noise heard by the user in one ear (e.g., the left ear) may be different than the volume and or noise heard by the user in the other ear (e.g., the right ear).

In some forms, the speaker 1272 (e.g., the volume of the speaker 1272) may be controlled using the controller 1270.

5.2.5 Power Source

With reference to FIG. 6, some forms of the head-mounted display system 1000 may include an electrical power source 1274 can provide electrical power to the head-mounted display unit 1200 and any other electrical components of the head-mounted display system 1000.

In certain forms, the power source 1274 may include a wired electrical connection that may be coupled to an external power source, which may be fixed to a particular location.

In certain forms, the power source 1274 may include a portable battery that may provide power to the head-mounted display unit 1200. The portable battery may allow the user greater mobility than compared to a wired electrical connection.

In certain forms, the head-mounted display system 1000 and/or other electronic components of the head-mounted display system 1000 may include internal batteries, and may be usable without the power source 1274.

In some forms, the head-mounted display system 1000 may include the power source 1274 in a position remote from the head-mounted display unit 1200. Electrical wires may extend from the distal location to the display unit housing 1205 in order to electrically connect the power source 1274 to the head-mounted display unit 1200.

In certain forms, the power source 1274 may be coupled to the positioning and stabilizing structure 1300. For example, the power source 1274 may be coupled to a strap of the positioning and stabilizing structure 1300, either permanently or removably. The power supply 1274 may be coupled to a posterior portion of the positioning and stabilizing structure 1300, so that it may be generally opposite the display unit housing 1205 and/or the head-mounted display unit 1200. The weight of the power source 1274, and the weight of the head-mounted display unit 1200 and the display unit housing 1205 may therefore be spread throughout the head-mounted display system 1000, instead of concentrated at the anterior portion of the head-mounted display system 1000. Shifting weight to the posterior portion of the head-mounted display system 1000 may limit the moment created at the user's face, which may improve comfort and allow the user to wear the head-mounted display system 1000 for longer periods of time.

In certain forms, the power source 1274 may be supported by a user distal to the user's head. For example, the power source 1274 may connected to the head-mounted display unit 1200 and/or the display unit housing 1205 only through an electrical connector (e.g., a wire). The power source 1274 may be stored in the user's pants pocket, on a belt clip, or a similar way which supports the weight of the power source 1274. This removes weight that the user's head is required to support, and may make wearing the head-mounted display system 1000 more comfortable for the user.

In some forms, the head-mounted display unit 1200 may include the power source 1274. For example, the display unit 1220 may be a cell phone, or other similar electronic device, which includes an internal power source 1274.

5.2.6 Control System

With reference to FIG. 6, some forms of the head-mounted display system 1000 include a control system 1276 that assists in controlling the output received by the user. Specifically, the control system 1276 can control visual output from the display screen 1220 and/or auditory output from the speakers 1272.

In some forms, the control system 1276 may include sensors that monitor different parameters (e.g., in the physical environment), and communicates measured parameters to a processor. The output received by the user may be affected by the measured parameters.

In some forms, the control system 1276 is integrated into the head-mounted display unit 1200. In other forms, the control system 1276 is housed in a control system support

1290 that is separate from, but connected to (e.g., electrically connected to) the head-mounted display unit 1200.

5.2.6.1 Power Source

In some forms, the control system 1276 may be powered by the power source 1274, which may be at least one battery used for powering components of the control system 1276. For example, sensors of the control system 1276 may be powered by the power source 1274.

In some forms, the at least one battery of the power source 1274 may be a low power system battery 1278 and a main battery 1280.

In certain forms, the low power system battery 1278 may be used to power a real time (RT) clock 1282 of the control system 1276.

5.2.6.1.1 Integrated Power Support Portion

In some forms, a battery support portion 1288 may support the low power system battery 1278 and/or the main battery 1280. The battery support portion 1288 may be directly supported on the head-mounted display system 1000.

In some forms, the battery support portion 1288 may be disposed within the display unit housing 1205.

In some forms, the battery support portion 1288 may be disposed on the positioning and stabilizing structure 1300. For example, the battery support portion 1288 may be coupled to the posterior support portion 1350. The weight of the head-mounted display system 1000 may be better balanced around the user's head. One form of a battery support portion 1288 is a battery pack housing, which will be described in more detail herein.

5.2.6.1.2 Remote Power Support Portion

In some forms, a battery support portion 1288 may support the low power system battery 1278 and/or the main battery 1280. The battery support portion 1288 may be coupled to the user independently of the positioning and stabilizing structure 1300 and/or the display unit housing 1205 (e.g., it may be coupled via a belt clip). The battery support portion 1288 also may be supported remote from the user's body (e.g., if the head-mounted display system 1000 receives power from a computer or video game console). A tether may couple the battery support portion 1288 to the control system 1276 and/or other electronics. The positioning of the battery support portion may improve comfort for the user, since the weight of the low power system battery 1278 and/or the main battery 1280 are not supported by the user's head.

5.2.6.2 Orientation Sensor

In some forms, the control system 1276 includes an orientation sensor 1284 that can sense the orientation of the user's body. For example, the orientation sensor 1284 may sense when the user rotates their body as a whole, and/or their head individually. In other words, the orientation sensor 1284 may measure an angular position (or any similar parameter) of the user's body. By sensing the rotation, the sensor 1284 may communicate to the display screen 1220 to output a different image.

In some examples, an external orientation sensor may be positioned in the physical environment where the user is wearing the head-mounted display system 1000. The external position sensor may track the user's movements similar to the orientation sensor 1284 described above. Using an external orientation sensor may reduce the weight required to be supported by the user.

5.2.6.2.1 Camera

In some forms, the control system 1276 may include at least one camera, which may be positioned to view the physical environment of the user.

In some forms, the orientation sensor 1284 is a camera, which may be configured to observe the user's physical environment in order to determine the orientation of the user's head (e.g., in what direction the user's head has tilted).

In some forms, the orientation sensor 1284 includes multiple cameras positioned throughout the head-mounted display system 1000 in order to provide a more complete view of the user's physical environment, and more accurately measure the orientation of the user's head.

In some forms, the cameras 1284 are coupled to the anterior face 1238 of the display unit housing 1205. The cameras 1284 may be positioned in order to in order to provide a "first-person" view.

In certain forms, the display screen 1220 may display the user's physical environment by using the cameras 1284, so that the user may feel as though they are viewing their physical environment without assistance from the head-mounted display system 1000 (i.e., the first person view). This may allow the user to move around their physical environment without removing the head-mounted display system 1000.

In one form, virtual objects may be displayed while the display screen 1220 is displaying the user's physical environment. The cameras 1284 may allow the head-mounted display system 1000 to operate as an MR device. The control system 1276 may include a control to switch operation between a VR device and an MR device.

5.2.6.3 Eye Sensor

In some forms, the control system 1276 may include an eye sensor that can track movement of the user's eyes. For example, the eye sensor may be able to measure a position of at least one of the user's eyes, and determine which direction at least one of the user's eyes are looking.

In some forms, the control system 1276 may include two eye sensors. Each sensor may correspond to one of the user's eyes.

In some forms, the eye sensors may be disposed in or proximate to the lenses 1240.

In some forms, the eye sensors may measure an angular position of the user's ears in order to determine the visual output from the display screen 1220.

5.2.6.4 Processing System

In some forms, the control system 1276 includes a processing system that may receive the measurements from the various sensors of the control system 1276.

In some forms, the processing system may receive measurements recorded by the orientation sensor 1284 and/or the eye sensors. Based on these measured values, the processor can communicate with the display screen 1220 in order to change the image being output. For example, if the user's eyes and/or the user's head pivots in the superior direction, the display screen 1220 may display a more superior portion of the virtual environment (e.g., in response to direction from the processing system).

5.3 Augmented Reality Display Interface

As shown in FIGS. 5A and 5B, a display apparatus or head-mounted display system 1000 in accordance with one aspect of the present technology comprises the following functional aspects: a display screen 1220, a display unit housing 1205, and a positioning and stabilizing structure 1300. In some forms, a functional aspect may provide one or more physical components. In some forms, one or more physical components may provide one or more functional aspects. In use, the display screen 1220 is arranged to be positioned proximate and anterior to the user's eyes, so as to allow the user to view the display screen 1220.

In other aspects, the head-mounted display system 1000 may also include an interfacing structure 1100, a controller 1270, a speaker 1272, a power source 1274, and/or a control system 1276. In some examples, these may be integral pieces of the head-mounted display system 1000, while in other examples, these may be modular and incorporated into the head-mounted display system 1000 as desired by the user.

5.3.1 Display Unit

The head-mounted display unit 1200 may include a structure for providing an observable output to a user. Specifically, the head-mounted display unit 1200 is arranged to be held (e.g., manually, by a positioning and stabilizing structure, etc.) in an operational position in front of a user's face.

In some examples, the head-mounted display unit 1200 may include a display screen 1220, a display unit housing 1205, and/or an interfacing structure 1100. These components may be integrally formed in a single head-mounted display unit 1200, or they may be separable and selectively connected by the user to form the head-mounted display unit 1200. Additionally, the display screen 1220, the display unit housing 1205, and/or the interfacing structure 1100 may be included in the head-mounted display system 1000, but may not be part of the head-mounted display unit 1200.

5.3.1.1 Display Screen

As shown in FIG. 5A, some forms of the head-mounted display unit 1200 include a display screen 1220. The display screen 1220 may include electrical components that provide an observable output to the user.

In one form of the present technology shown in FIG. 5A and FIG. 5B, a display screen 1220 provides an optical output observable by the user. The optical output allows the user to observe a virtual environment and/or a virtual object.

The display screen 1220 may be positioned proximate to the user's eyes, in order to allow the user to view the display screen 1220. For example, the display screen 1220 maybe positioned anterior to the user's eyes. The display screen 1220 can display computer generated images that can be view by the user in order to augment the user's physical environment (e.g., the computer generated images may appear as though they are present in the user's physical environment).

In some forms, the display screen 1220 is an electronic display. The display screen 1220 may be a liquid crystal display (LCD), or a light emitting diode (LED) screen.

In some forms, the computer generated image may be projected onto the display screen 1220.

In some forms, the display screen 1220 may extend wider a distance between the user's pupils. The display screen 1220 may also be wider than a distance between the user's cheeks.

In some forms, the display screen 1220 may display at least one image that is observable by the user. For example, the display screen 1220 may display images that change based on predetermined conditions (e.g., passage of time, movement of the user, input from the user, etc.).

In certain forms, portions of the display screen 1220 may be visible to only one of the user's eyes. In other words, a portion of the display screen 1220 may be positioned proximate and anterior to only one of the user's eyes (e.g., the right eye), and is blocked from view from the other eye (e.g., the left eye).

In one example, the display screen 1220 may be divided into two sides (e.g., a left side and a right side), and may display two images at a time (e.g., one image on either side).

Each side of the display screen 1220 may display a similar image. In some examples, the images may be identical, while in other examples, the images may be slightly different.

Together, the two images on the display screen 1220 may form a binocular display, which may provide the user with a more realistic AR or MR experience. In other words, the user's brain may process the two images from the display screen 1220 together as a single image. Providing two (e.g., un-identical) images may allow the user to view virtual objects on their periphery, and expand their field of view in the virtual environment.

In certain forms, the display screen 1220 may be positioned in order to be visible by both of the user's eyes. The display screen 1220 may output a single image at a time, which is viewable by both eyes. This may simplify the processing as compared to the multi-image display screen 1220.

In some forms, the head-mounted display system 1000 includes a single lens 1240 (e.g., monocular display). The lens 1240 may be positioned anterior to both eyes (e.g., so that both eyes view the image from the display screen 1220 through the lens 1240), or may be positioned anterior to only one eye (e.g., when the image from the displace screen 1220 is viewable by only one eye). This may be particularly useful in AR or MR, where the user may want limited virtual stimulation, and may wish to observe the physical environment without an overlayed virtual object.

In certain forms, particularly when using the display screen 1220 in an AR or MR environment, the display screen 1220 may be turned off while the user continues to wear the display screen 1220 and interact with the physical environment. This may allow the user to selectively choose when to receive the virtual stimulation, and when to observe only the physical environment.

In certain forms, the display screen 1220 may be transparent (or translucent). For example, the display screen 1220 may be glass, so the user can see through the display screen 1220. This may be particularly beneficial in AR or MR applications, so that the user can continue to see the physical environment.

5.3.1.1.1 Optical Lenses

As shown in FIG. 5A, the display screen 1220 may be disposed within a lens 1240. The user may view an image provided by the display screen 1220 through the lens 1240.

The lens 1240 may be transparent and/or translucent along with the display screen 1220 so that the user may observe their physical environment while looking through the lens 1240. In some examples, the user may be able to observe (e.g., visually observe) their physical environment regardless of the presence or absence of a computer generated image output by the display screen 1220.

In some forms, the head-mounted display system 1000 includes two lenses 1240, one for each of the user's eyes. In other words, each of the user's eyes may look through a separate lens positioned anterior to the respective pupil. Each of the lenses 1240 may be identical, although in some examples, one lens 1240 may be different than the other lens 1240 (e.g., have a different magnification). For example, the lenses 1240 may be prescription lenses 1240, and each of the user's eyes may have a different prescription.

In certain forms, the display screen 1220 may output two images simultaneously. Each of the user's eyes may be able to see only one of the two images. The images may be displayed side-by-side on the display screen 1220. Each lens 1240 permits each eye to observe only the image proximate to the respective eye. The user may observe these two images together as a single image.

In certain forms, each lens 1240 may include a separate display screen 1220 that outputs different images. For example, different computer generated images may be displayed to the user's eyes.

In one form, the user may control whether both, one, or none of the display screens 1220 are outputting simultaneously. This may be beneficial to a user if they wish to switch which eye is observing the computer generated images.

In some forms, the head-mounted display system 1000 includes a single lens 1240 (e.g., monocular display). The lens 1240 may be positioned anterior to both eyes (e.g., so that both eyes view the image from the display screen 1220 through the lens 1240), or may be positioned anterior to only one eye (e.g., when the image from the displace screen 1220 is viewable by only one eye).

5.3.1.2 Display Housing

In some forms of the present technology as shown in FIGS. 5A and 5B, a display unit housing 1205 provides a support structure for the display screen 1220, in order to maintain a position of at least some of the components of the display screen 1220 relative to one another, and may additionally protect the display screen 1220 and/or other components of the head-mounted display unit 1200. The display unit housing 1205 may be constructed from a material suitable to provide protection from impact forces to the display screen 1220. The display unit housing 1205 may also contact the user's face, and may be constructed from a biocompatible material suitable for limiting irritation to the user.

A display unit housing 1205 in accordance with some forms of the present technology may be constructed from a hard, rigid or semi-rigid material, such as plastic.

In certain forms, the rigid or semi-rigid material may be at least partially covered with a soft and/or flexible material (e.g., a textile, silicone, etc.). This may improve biocompatibility and/or user comfort because the at least a portion of the display unit housing 1205 that the user engages (e.g., grabs with their hands) includes the soft and/or flexible material.

A display unit housing 1205 in accordance with other forms of the present technology may be constructed from a soft, flexible, resilient material, such as silicone rubber.

In some forms, the display screen 1220 may project at least partially out of the display unit housing 1205. For example, unlike in a VR head-mounted display system 1000, the display screen 1220 in an AR (or MR) head-mounted display system 1000 may not be completely enclosed by the by the display unit housing 1205. The user may be able to directly view the display screen 1220, and may be able to look through the display screen 1220 (e.g., if the display screen 1220 is transparent or translucent).

In certain forms, the display unit housing 1205 may support sensors or other electronics described below. The display unit housing 1205 may provide protection to the electronics without substantially obstructing the user's view of the display screen 1220.

5.3.1.3 Interface Structure

As shown in FIGS. 5A and 5B, some forms of the present technology include an interfacing structure 1100 is positioned and/or arranged in order to conform to a shape of a user's face, and may provide the user with added comfort while wearing and/or using the head-mounted display system 1000.

In some forms, the interfacing structure 1100 is coupled to a surface of the display unit housing 1205.

In some forms, the interfacing structure 1100 in accordance with the present technology may be constructed from a biocompatible material.

In some forms, the interfacing structure 1100 in accordance with the present technology may be constructed from a soft, flexible, and/or resilient material.

In certain forms, the interfacing structure 1100 in accordance with the present technology may be constructed from silicone rubber and/or foam.

In some forms, the interfacing structure 1100 may contact sensitive regions of the user's face, which may be locations of discomfort. The material forming the interfacing structure 1100 may cushion these sensitive regions, and limit user discomfort while wearing the head-mounted display system 1000.

In certain forms, these sensitive regions may include the user's forehead. Specifically, this may include the region of the user's head that is proximate to the frontal bone, like the Epicranius and/or the glabella. This region may be sensitive because there is limited natural cushioning from muscle and/or fat between the user's skin and the bone. Similarly, the ridge of the user's nose may also include little to no natural cushioning.

In some forms, the interfacing structure 1100 can comprise a single element. In some embodiments the interfacing structure 1100 may be designed for mass manufacture. For example, the interfacing structure 1100 can be designed to comfortably fit a wide range of different face shapes and sizes.

In some forms, the interfacing structure 1100 may include different elements that overlay different regions of the user's face. The different portions of the interfacing structure 1100 may be constructed from different materials, and provide the user with different textures and/or cushioning at different regions.

In some forms, the interface structure 1100 may include nasal pads (e.g., as used in eye-glasses) that may contact the lateral sides of the user's nose. The nasal pads may apply light pressure to the user's nose to maintain the position of the head-mounted display system 1000, but may not apply a force that causes significant discomfort (e.g., the nasal pads may not receive a posterior directed tensile force).

5.3.2 Positioning and Stabilizing Structure

As shown in FIGS. 5A to 5B, the display screen 1220 and/or the display unit housing 1205 of the head-mounted display system 1000 of the present technology may be held in position in use by the positioning and stabilizing structure 1300.

To hold the display screen 1220 and/or the display unit housing 1205 in its correct operational position, the positioning and stabilizing structure 1300 is ideally comfortable against the user's head in order to accommodate the induced loading from the weight of the display unit in a manner that minimise facial markings and/or pain from prolonged use. There is also need to allow for a universal fit without trading off comfort, usability and cost of manufacture. The design criteria may include adjustability over a predetermined range with low-touch simple set up solutions that have a low dexterity threshold. Further considerations include catering for the dynamic environment in which the head-mounted display system 1000 may be used. As part of the immersive experience of a virtual environment, users may communicate, i.e. speak, while using the head-mounted display system 1000. In this way, the jaw or mandible of the user may move relative to other bones of the skull. Additionally, the whole head may move during the course of a period of use of the head-mounted display system 1000. For example, movement of a user's upper body, and in some cases lower body, and in particular, movement of the head relative to the upper and lower body.

In one form the positioning and stabilizing structure 1300 provides a retention force to overcome the effect of the gravitational force on the display screen 1220 and/or the display unit housing 1205.

In one form of the present technology, a positioning and stabilizing structure 1300 is provided that is configured in a manner consistent with being comfortably worn by a user. In one example the positioning and stabilizing structure 1300 has a low profile, or cross-sectional thickness, to reduce the perceived or actual bulk of the apparatus. In one example, the positioning and stabilizing structure 1300 comprises at least one strap having a rectangular cross-section. In one example the positioning and stabilizing structure 1300 comprises at least one flat strap.

In one form of the present technology, a positioning and stabilizing structure 1300 is provided that is configured so as not to be too large and bulky to prevent the user from comfortably moving their head from side to side.

In one form of the present technology, a positioning and stabilizing structure 1300 comprises a strap constructed from a laminate of a textile user-contacting layer, a foam inner layer and a textile outer layer. In one form, the foam is porous to allow moisture, (e.g., sweat), to pass through the strap. In one form, a skin contacting layer of the strap is formed from a material that helps wick moisture away from the user's face. In one form, the textile outer layer comprises loop material to engage with a hook material portion.

In certain forms of the present technology, a positioning and stabilizing structure 1300 comprises a strap that is extensible, e.g. resiliently extensible. For example the strap may be configured in use to be in tension, and to direct a force to draw the display screen 1220 and/or the display unit housing 1205 toward a portion of a user's face, particularly proximate to the user's eyes and in line with their field of vision. In an example the strap may be configured as a tie.

In one form of the present technology, the positioning and stabilizing structure 1300 comprises a first tie, the first tie being constructed and arranged so that in use at least a portion of an inferior edge thereof passes superior to an otobasion superior of the user's head and overlays a portion of a parietal bone without overlaying the occipital bone.

In one form of the present technology, the positioning and stabilizing structure 1300 includes a second tie, the second tie being constructed and arranged so that in use at least a portion of a superior edge thereof passes inferior to an otobasion inferior of the user's head and overlays or lies inferior to the occipital bone of the user's head.

In one form of the present technology, the positioning and stabilizing structure 1300 includes a third tie that is constructed and arranged to interconnect the first tie and the second tie to reduce a tendency of the first tie and the second tie to move apart from one another.

In certain forms of the present technology, a positioning and stabilizing structure 1300 comprises a strap that is bendable and e.g. non-rigid. An advantage of this aspect is that the strap is more comfortable against a user's head.

In certain forms of the present technology, a positioning and stabilizing structure 1300 comprises a strap constructed to be breathable to allow moisture vapour to be transmitted through the strap, In certain forms of the present technology, a system is provided comprising more than one positioning and stabilizing structure 1300, each being configured to provide a retaining force to correspond to a different size and/or shape range. For example the system may comprise one form of positioning and stabilizing structure 1300 suitable for a large sized head, but not a small sized head, and another. suitable for a small sized head, but not a large sized head.

In some forms, the positioning and stabilizing structure 1300 may include cushioning material (e.g., a foam pad) for contacting the user's skin. The cushioning material may provide added wearability to the positioning and stabilizing structure 1300, particularly if positioning and stabilizing structure 1300 is constructed from a rigid or semi-rigid material.

5.3.2.1 Temporal Connectors

As shown in FIG. 5B, some forms of the positioning and stabilizing structure 1300 include temporal connectors 1250, each of which may overlay a respective one of the user's temporal bones in use. A portion of the temporal connectors 1250, in-use, are in contact with a region of the user's head proximal to the otobasion superior, i.e. above each of the user's ears.

The temporal connectors 1250 may be lateral portions of the positioning and stabilizing structure 1300, as each temporal connector 1250 is positioned on either the left or the right side of the user's head.

In some forms, the temporal connectors 1250 may extend in an anterior-posterior direction, and may be substantially parallel to the sagittal plane.

In some forms, the temporal connectors 1250 may be coupled to the display unit housing 1205. For example, the temporal connectors 1250 may be connected to lateral sides of the display unit housing 1205.

In some forms, the temporal connectors 1250 may be arranged in-use to run generally along or parallel to the Frankfort Horizontal plane of the head and superior to the zygomatic bone (e.g., above the user's cheek bone).

In some forms, the temporal connectors 1250 may be positioned against the user's head similar to arms of eye-glasses, and be positioned more superior than the anti-helix of each respective ear.

In some forms, the temporal connectors 1250 may have a generally elongate and flat configuration. In other words, each temporal connector 1250 is far longer and wider (direction from top to bottom in the paper plane) than thick (direction into the paper plane).

In some forms, the temporal connectors 1250 may each have a three-dimensional shape which has curvature in all three axes (X, Y and Z). Although the thickness of each temporal connector 1250 may be substantially uniform, its height varies throughout its length. The purpose of the shape and dimension of each temporal connector 1250 is to conform closely to the head of the user in order to remain unobtrusive and maintain a low profile (e.g., not appear overly bulky).

In some forms, the temporal connectors 1250 may be constructed from a rigid or semi-rigid material, which may include plastic, Hytrel® (thermoplastic polyester elastomer), or another similar material. The rigid or semi-rigid material may be self-supporting and/or able to hold its shape without being worn. This can make it more intuitive or obvious for users to understand how to use the positioning and stabilizing structure 1300 and may contrast with a positioning and stabilizing structure 1300 that is entirely floppy and does not retain a shape. Maintaining the temporal connectors 1250 in the in-use state prior to use may prevent or limit distortion whilst the user is donning the positioning and stabilizing structure 1300 and allow a user to quickly fit or wear the head-mounted display system 1000.

In certain forms, the temporal connectors 1250 may be rigidizers, which may allow for a more effective (e.g., direct) translation of tension through the temporal connectors 1250 because rigidizers limit the magnitude of elongation or deformation of the arm while in-use.

In certain forms, the positioning and stabilizing structure 1300 may be designed so that the positioning and stabilizing structure 1300 springs 'out of the box' and generally into its in-use configuration. In addition, the positioning and stabilizing structure 1300 may be arranged to hold its in-use shape once out of the box (e.g., because rigidizers may be formed to maintain the shape of some or part of the positioning and stabilizing structure 1300). Advantageously, the orientation of the positioning and stabilizing structure 1300 is made clear to the user as the shape of the positioning and stabilizing structure 1300 is generally curved much like the rear portion of the user's head. That is, the positioning and stabilizing structure 1300 is generally dome shaped.

In certain forms, a flexible and/or resilient material may be disposed around the rigid or semi-rigid material of the temporal connectors 1250. The flexible material may be more comfortable against the user's head, in order to improve wearability and provide soft contact with the user's face. In one form, the flexible material is a textile sleeve at is permanently or removably coupled to each temporal connector 1250.

In one form, a textile may be over-moulded onto at least one side of the rigidizer. In one form, the rigidizer may be formed separately to the resilient component and then a sock of user contacting material (e.g., Breath-O-Prene™) may be wrapped or slid over the rigidizer. In alternative forms, the user contacting material may be provided to the rigidizer by adhesive, ultrasonic welding, sewing, hook and loop material, and/or stud connectors.

In some forms, the user contacting material may be on both sides of the rigidizer, or alternatively may only be on the user contacting side (e.g., the user contacting side) of the rigidizer to reduce bulk and cost of materials.

In some forms, the temporal connectors 1250 are constructed from a flexible material (e.g., a textile), which may be comfortable against the user's skin, and may not require an added layer to increase comfort.

Some forms of the positioning and stabilizing structure 1300 may include only temporal connectors 1250. The temporal connectors 1250 may be shaped like temples or arms of eye-glasses, and may rest against the user's head in a similar manner. For example, the temporal arms 3304 may provide a force directed into lateral sides of the user's head (e.g., toward the respective temporal bone).

5.3.2.2 Posterior Support Portion

As shown in FIG. 5B, some forms of the positioning and stabilizing structure 1300 may include a rear support, e.g. a posterior support portion 1350 for assisting in supporting the display screen 1220 and/or the display unit housing 1205 proximate to the user's eyes. The posterior support portion 1350 may assist in anchoring the display screen 1220 and/or the display unit housing 1205 to the user's head in order to appropriately orient the display screen 1220 proximate to the user's eyes.

In some forms, the posterior support portion 1350 may be coupled to the display unit housing 1205 via the temporal connectors 1250.

In certain forms, the temporal connectors 1250 may be directly coupled to the display unit housing 1205 and to the posterior support portion 1350.

In some forms, the posterior support portion 1350 may have a three-dimensional contour curve to fit to the shape of a user's head. For example, the three-dimensional shape of the posterior support portion 1350 may have a generally round three-dimensional shape adapted to overlay a portion of the parietal bone and the occipital bone of the user's head, in use.

In some forms, the posterior support portion 1350 may be a posterior portion of the positioning and stabilizing structure 1300. The posterior support portion 1350 may provide an anchoring force directed at least partially in the anterior direction.

In certain forms, the posterior support portion 1350 is the inferior-most portion of the positioning and stabilizing structure 1300. For example, the posterior support portion 1350 may contact a region of the user's head between the occipital bone and the trapezius muscle. The posterior support portion 1350 may hook against an inferior edge of the occipital bone (e.g., the occiput). The posterior support portion 1350 may provide a force directed in the superior direction and/or the anterior direction in order to maintain contact with the user's occiput.

In certain forms, the posterior support portion 1350 is the inferior-most portion of the entire head-mounted display system 1000. For example, the posterior support portion 1350 may be positioned at the base of the user's neck (e.g., overlaying the occipital bone and the trapezius muscle more inferior than the user's eyes) so that the posterior support portion 1350 is more inferior than the display screen 1220 and/or the display unit housing 1205.

In some forms, the posterior support portion 1350 may include a padded material, which may contact the user's head (e.g., overlaying the region between the occipital bone and the trapezius muscle). The padded material may provide additional comfort to the user, and limit marks caused by the posterior support portion 1350 pulling against the user's head.

5.3.2.3 Forehead Support

As shown in FIGS. 5A and 5B, some forms of the positioning and stabilizing structure 1300 may include a forehead support 1360 that can contact the user's head superior to the user's eyes, while in use. For example, the forehead support 1360 may overlay the frontal bone of the user's head. In certain forms, the forehead support 1360 may also be more superior than the sphenoid bones and/or the temporal bones. This may also position the forehead support 1360 more superior than the user's eyebrows.

In some forms, the forehead support 1360 may be an anterior portion of the positioning and stabilizing structure 1300, and may be disposed more anterior on the user's head than any other portion of the positioning and stabilizing structure 1300. The posterior support portion 1350 may provide a force directed at least partially in the posterior direction.

In some forms, the forehead support 1360 may include a cushioning material (e.g., textile, foam, silicone, etc.) that may contact the user, and may help to limit marks caused by the straps of the positioning and stabilizing structure 1300. The forehead support 1360 and the interfacing structure 1100 may work together in order to provide comfort to the user.

In some forms, the forehead support 1360 may be separate from the display unit housing 1205, and may contact the user's head at a different location (e.g., more superior) than the display unit housing 1205.

In some forms, the forehead support 1360 can be adjusted to allow the positioning and stabilizing structure 3000 to accommodate the shape and/or configuration of a user's face.

In some forms, the temporal connectors 1250 may be coupled to the forehead support 1360 (e.g., on lateral sides of the forehead support 1360). The temporal connectors 1250 may extend at least partially in the inferior direction in order to couple to the posterior support portion 1350.

In certain forms, the positioning and stabilizing structure 1300 may include multiple pairs of temporal connectors 1250. For example, one pair of temporal connectors 1250 may be coupled to the forehead support 1360, and one pair of temporal connectors 1250 may be coupled to the display unit housing 1205.

In some forms, the forehead support 1360 can be presented at an angle which is generally parallel to the user's forehead to provide improved comfort to the user. For example, the forehead support 1360 may position the user in an orientation that overlays the frontal bone, and is substantially parallel to the coronal plane. Positioning the forehead support substantially parallel to the coronal plane can reduce the likelihood of pressure sores which may result from an uneven presentation.

In some forms, the forehead support 1360 may be offset from a rear support that contacts a posterior region of the user's head (e.g., an area overlaying the occipital bone and the trapezius muscle). In other words, an axis along a rear strap would not intersect the forehead support 1360, which may be disposed more inferior and anterior than the axis along the rear strap. The resulting offset between the forehead support 1360 and the rear strap may create moments that oppose the weight force of the display screen 1220 and/or the display unit housing 1205. A larger offset may create a larger moment, and therefore more assistance in maintaining a proper position of the display screen 1220 and/or the display unit housing 1205. The offset may be increased by moving the forehead support 1360 closer to the user's eyes (e.g., more anterior and inferior along the user's head), and/or increasing the angle of the rear strap so that it is more vertical.

5.3.2.4 Adjustable Straps

Portions of the positioning and stabilizing structure 1300 may be adjustable, in order to impart a selective tensile force on the display screen 1220 and/or the display unit housing 1205 in order to secure a position of the display screen 1220 and/or the display unit housing 1205.

In some forms, the display unit housing 1205 may include at least one loop or eyelet 1254, and at least one of the temporal connectors 1250 may be threaded through that loop, and doubled back on itself. The length of a strap of the positioning and stabilizing structure 1300 threaded through the respective eyelet 1254 may be selected by the user in order to adjust the tensile force. For example, threading a greater length through the eyelet 1254 may supply a greater tensile force.

In some forms, at least one of the temporal connectors 1250 may include an adjustment portion 1256 and a receiving portion 1258. The adjustment portion 1256 may be positioned through the eyelet 1254 on the display unit housing 1205, and may be coupled to the receiving portion 1258 (e.g., by doubling back on itself). The adjustment portion 1256 may include a hook material, and the receiving portion 1258 may include a loop material (or vice versa), so that the adjustment portion 1256 may be removably held in the desired position. In some examples, the hook material and the loop material may be Velcro.

In certain forms, the strap may be constructed at least partially from a flexible and/or resilient material, which may conform to a shape of the user's head and/or may allow the adjustment portion to be threaded through the eyelet 1254. For example, the adjustment portion(s) 1256 may be constructed from an elastic textile, which may provide an elastic, tensile force. The remained of the temporal connectors 1250 may be constructed from the rigid or semi-rigid material described above (although it is contemplated that additional sections of the temporal connectors 1250 may also be constructed from a flexible material).

5.3.2.4.1 Top Strap Portion

In some forms, the positioning and stabilizing structure 3000 may include a top strap portion, which may overlay a superior region of the user's head.

In some forms, the top strap portion may extend between an anterior portion of the head-mounted display system 1000 and a posterior region of the head-mounted display system 1000.

In some forms, the top strap portion may be constructed from a flexible material, and may be configured to compliment the shape of the user's head.

In certain forms, the top strap portion may be connected to the display unit housing 1205. For example, the top strap portion may be coupled to the superior face 1230. The top strap portion may also be coupled to the display unit housing 1205 proximate to a posterior end of the display unit housing 1205.

In certain forms, the top strap portion may be coupled to the forehead support 1360. For example, the top strap portion may be coupled to the forehead support 1360 proximate to a superior edge. The top strap portion may be connected to the display unit housing 1205 through the forehead support 1360.

In some forms, the top strap portion may be connected to the posterior support portion 1350. For example, the top strap portion may be connected proximate to a superior edge of the posterior support portion 1350.

In some forms, the top strap portion may overlay the frontal bone and the pariental bone of the user's head.

In certain forms, the top strap portion may extend along the sagittal plane as it extends between the anterior and posterior portions of the head-mounted display system 1000.

In certain forms, the top strap portion may apply a tensile force oriented at least partially in the superior direction, which may oppose the force of gravity.

In some forms, the top strap portion may be adjustable in order to impart a selective tensile force on the display screen 1220 and/or the display unit housing 1205 in order to secure a position of the display screen 1220 and/or the display unit housing 1205.

In certain forms, the display unit housing 1205 and/or the forehead support 1360 may include at least one loop or eyelet 1254, and the top strap portion may be threaded through that eyelet 1254, and doubled back on itself. The length of the top strap portion threaded through the eyelet 1254 may be selected by the user in order to adjust the tensile force provided by the positioning and stabilizing structure 1300. For example, threading a greater length of the top strap portion through the eyelet 1254 may supply a greater tensile force.

In some forms, the top strap portion may include an adjustment portion and a receiving portion. The adjustment portion may be positioned through the eyelet 1254, and may be coupled to the receiving portion (e.g., by doubling back on itself). The adjustment portion may include a hook material, and the receiving portion may include a loop material (or vice versa), so that the adjustment portion may be removably held in the desired position. In some examples, the hook material and the loop material may be Velcro.

5.3.2.5 Rotational Control

In some forms, the display unit housing 1205 and/or the display screen 1220 may pivot relative to the user's face while the user has donned the positioning and stabilizing structure 1300. This may allow the user to see the physical environment without looking through the head-mounted display unit 1200 (e.g., without viewing computer generated images). This may be useful for users who want to take a break for viewing the virtual environment, but do not wish to doff the positioning and stabilizing structure 1300.

In certain forms, the pivot connection 1260 may be coupled to the temporal connectors 1250. The head-mounted display unit 1200 may be able to pivot about an axis extending between the temporal connectors 1250 (e.g., a substantially horizontal axis that may be substantially perpendicular to the Frankfort horizontal, in use).

In certain forms, the display screen 1220 and/or the display unit housing 1205 includes a pair of arms 1210, which extend away from the display screen 1220 (e.g., in a cantilevered configuration), and may extend in the posterior direction, in use.

In certain forms, the pair of arms 1210 may extend at least partially along the temporal connectors 1250, and may connect to the temporal connectors 1250 at the pivot connection 1260.

In some forms, the pivot connection 1260 may be a ratchet connection, and may maintain the display unit housing 1205 in a raised position without additional user intervention.

In some forms, the display screen 1220 and/or the display unit housing 1205 may include a neutral position (see e.g., FIG. 5B; substantially horizontal in use) and a pivoted position (e.g., pivoted relative to the horizontal axis, in use).

In certain forms, the display screen 1220 and/or the display unit housing 1205 may pivot between approximately 0° and approximately 90° relative to the temporal connectors 1250. In certain forms, the display screen 1220 and/or the display unit housing 1205 may pivot between approximately 0° and approximately 80° relative to the temporal connectors 1250. In certain forms, the display screen 1220 and/or the display unit housing 1205 may pivot between approximately 0° and approximately 70° relative to the temporal connectors 1250. In certain forms, the display screen 1220 and/or the display unit housing 1205 may pivot between approximately 0° and approximately 60° relative to the temporal connectors 1250. In certain forms, the display screen 1220 and/or the display unit housing 1205 may pivot between approximately 0° and approximately 50° relative to the temporal connectors 1250. In certain forms, the display screen 1220 and/or the display unit housing 1205 may pivot between approximately 0° and approximately 45° relative to the temporal connectors 1250. At least at its maximum pivotal position, the display screen 1220 may be more superior than the user's eyes, so that the user does not have to look through the display screen 1220 to view the physical environment.

5.3.3 Controller

As shown in FIG. 6, some forms of the head-mounted display system 1000 include a controller 1270 that can be engagable by the user in order to provide user input to the virtual environment and/or to control the operation of the head-mounted display system 1000. The controller 1270 can be connected to the head-mounted display unit 1200, and provide the user the ability to interact with virtual objects output to the user from the head-mounted display unit 1200.

5.3.3.1 Handheld Controller

In some forms, the controller 1270 may include a handheld device, and may be easily grasped by a user with a single hand.

In certain forms, the head-mounted display system 1000 may include two handheld controllers. The handheld controllers may be substantially identical to one another, and each handheld controller may be actuatable by a respective one of the user's hands.

In some forms, the user may interact with the handheld controller(s) in order to control and/or interact with virtual objects in the virtual environment.

In some forms, the handheld controller includes a button that may be actuatable by the user. For example, the user's fingers may be able to press the button while grasping the handheld controller.

In some forms, the handheld controller may include a directional control (e.g., a joystick, a control pad, etc.). The user's thumb may be able to engage the directional control while grasping the handheld controller.

In certain forms, the controller 1270 may be wirelessly connected to the head-mounted display unit 1200. For example, the connector 1270 and the head-mounted display unit 1200 may be connected via Bluetooth, Wi-Fi, or any similar means.

In certain forms, the controller 1270 and the head-mounted display unit 1200 may be connected with a wired connection.

5.3.3.2 Fixed Controller

In some forms, at least a portion of the controller 1270 may be integrally formed on the display unit housing 1205.

In some forms, the controller 1270 may include control buttons that are integrally formed on the display unit housing 1205. For example, the control buttons may be formed on the superior face 1230 and/or the inferior face 1232, so as to be engageable by the user's fingers when holding the user's palm rests against the lateral left or right face 1234, 1236 of the display unit housing 1205. Control buttons may also be disposed on other faces of the display unit housing 1205.

In some forms, the user may interact with the control buttons in order to control at least one operation of the head-mounted display system 1000. For example, the control button may be an On/Off button, which may selectively control whether the display screen 1220 is outputting an image to the user.

In certain forms, the control buttons and the head-mounted display unit 1200 may be connected with a wired connection.

In some forms, the head-mounted display system 1000 may include both the handheld controller and the control buttons.

In some forms, having only control button(s) may be preferable in an AR or MR device. While wearing the AR or MR head-mounted display system 1000, the user may be interacting with their physical environment (e.g., walking around, using tools, etc.). Thus, the user may prefer to keep their hands free of controllers 1270.

5.3.4 Speaker

As shown in FIG. 6, some forms of the head-mounted display system 1000 includes a sound system or speakers 1272 that may be connected to the head-mounted display unit 1200 and positionable proximate to the user's ears in order to provide the user with an auditory output.

In some forms, the speakers 1272 be positionable around the user's ears, and may block or limit the user from hearing ambient noise.

In certain forms, the speakers 1272 may be wirelessly connected to the head-mounted display unit 1200. For example, the speakers 1272 and the head-mounted display unit 1200 may be connected via Bluetooth, Wi-Fi, or any similar means.

In some forms, the speaker 1272 includes a left ear transducer and a right ear transducer. In some forms, the left and right ear transducers may output different signals, so that the volume and or noise heard by the user in one ear (e.g., the left ear) may be different than the volume and or noise heard by the user in the other ear (e.g., the right ear).

In some forms, the speaker 1272 (e.g., the volume of the speaker 1272) may be controlled using the controller 1270.

5.3.5 Power Source

As shown in FIG. 6, some forms of the head-mounted display system 1000 may include an electrical power source 1274 can provide electrical power to the head-mounted display unit 1200 and any other electrical components of the head-mounted display system 1000.

In certain forms, the power source 1274 may include a wired electrical connection that may be coupled to an external power source, which may be fixed to a particular location.

In certain forms, the power source 1274 may include a portable battery that may provide power to the head-mounted display unit 1200. The portable battery may allow the user greater mobility than compared to a wired electrical connection.

In certain forms, the head-mounted display system 1000 and/or other electronic components of the head-mounted display system 1000 may include internal batteries, and may be usable without the power source 1274.

In some forms, the head-mounted display system 1000 may include the power source 1274 in a position remote from the head-mounted display unit 1200. Electrical wires may extend from the distal location to the display unit housing 1205 in order to electrically connect the power source 1274 to the head-mounted display unit 1200.

In certain forms, the power source 1274 may be coupled to the positioning and stabilizing structure 1300. For example, the power source 1274 may be coupled to a strap of the positioning and stabilizing structure 1300, either permanently or removably. The power supply 1274 may be coupled to a posterior portion of the positioning and stabilizing structure 1300, so that it may be generally opposite the display unit housing 1205 and/or the head-mounted display unit 1200. The weight of the power source 1274, and the weight head-mounted display unit 1200 and the display unit housing 1205 may therefore be spread throughout the head-mounted display system 1000, instead of concentrated at the anterior portion of the head-mounted display system 1000. Shifting weight to the posterior portion of the display interface may limit the moment created at the user's face, which may improve comfort and allow the user to wear the head-mounted display system 1000 for longer periods of time.

In certain forms, the power source 1274 may be supported by a user distal to the user's head. For example, the power source 1274 may connected to the head-mounted display unit 1200 and/or the display unit housing 1205 only through an electrical connector (e.g., a wire). The power source 1274 may be stored in the user's pants pocket, on a belt clip, or a similar way which supports the weight of the power source 1274. This removes weight that the user's head is required to support, and may make wearing the head-mounted display system 1000 more comfortable for the user.

5.3.6 Control System

In some forms, the control system 1276 may be powered by the power source 1274 (e.g., at least one battery) used for powering components of the control system 1276. For example, sensors of the control system 1276 may be powered by the power source 1274.

In some forms, the at least one battery of the power source 1274 may be a low power system battery 1278 and a main battery 1280.

In certain forms, the low power system battery 1278 may be used to power a real time (RT) clock 1282 of the control system 1276.

5.3.6.1.1 Integrated Power Support Portion

In some forms, a battery support portion 1288 may support the low power system battery 1278 and/or the main battery 1280. The battery support portion 1288 may be directly supported on the head-mounted display system 1000.

In some forms, the battery support portion 1288 may be disposed within the display unit housing 1205.

In some forms, the battery support portion 1288 may be disposed on the positioning and stabilizing structure 1300. For example, the battery support portion 1288 may be coupled to the posterior support portion 1350. The weight of the head-mounted display system 1000 may be better balanced around the user's head.

5.3.6.1.2 Remote Power Support Portion

In some forms, a battery support portion 1288 may support the low power system battery 1278 and/or the main battery 1280. The battery support portion 1288 may be coupled to the user independently of the positioning and stabilizing structure 1300 and/or the display unit housing 1205 (e.g., it may be coupled via a belt clip). The battery support portion 1288 also may be supported remote from the user's body (e.g., if the head-mounted display system 1000 receives power from a computer or video game console). A tether may couple the battery support portion 1288 to the control system 1276 and/or other electronics. The positioning of the battery support portion may improve comfort for the user, since the weight of the low power system battery 1278 and/or the main battery 1280 are not supported by the user's head.

5.3.6.2 Orientation Sensor

In some forms, the control system 1276 includes an orientation sensor 1284 that can sense the orientation of the user's body. For example, the orientation sensor 1284 may sense when the user rotates their body as a whole, and/or their head individually. In other words, the orientation sensor 1284 may measure an angular position (or any similar parameter) of the user's body. By sensing the rotation, the sensor 1284 may communicate to the display screen 1220 to output a different image.

In some examples, an external orientation sensor may be positioned in the physical environment where the user is wearing the head-mounted display system 1000. The external position sensor may track the user's movements similar to the orientation sensor 1284 described above. Using an external orientation sensor may reduce the weight required to be supported by the user.

5.3.6.2.1 Camera

In some forms, the control system 1276 may include at least one camera, which may be positioned to view the physical environment of the user.

In some forms, the orientation sensor 1284 is a camera, which may be configured to observe the user's physical environment in order to measure and determine the orientation of the user's head (e.g., in what direction the user's head has tilted).

In some forms, the orientation sensor 1284 includes multiple cameras positioned throughout the head-mounted display system 1000 in order to provide a more complete view of the user's physical environment, and more accurately measure the orientation of the user's head.

5.3.6.3 Eye Sensor

In some forms, the control system 1276 may include an eye sensor that can track movement of the user's eyes. For example, the eye sensor may be able to measure a position of at least one of the user's eyes, and determine which direction at least one of the user's eyes are looking.

In some forms, the control system 1276 may include two eye sensors. Each sensor may correspond to one of the user's eyes.

In some forms, the eye sensors may be disposed in or proximate to the lenses 1240.

In some forms, the eye sensors may measure an angular position of the user's ears in order to determine the visual output from the display screen 1220.

In some forms, the user's eye may act as a controller, and the user may move their eyes in order to interact with virtual objects. For example, a virtual cursor may follow the position of the user's eyes. The eye sensor may track and measure the movement of the user's eyes, and communicate with a processing system 1286 (described below) in order to move the virtual cursor.

5.3.6.4 Processing System

In some forms, the control system 1276 includes a processing system 1286 (e.g., a microprocessor) that may receive the measurements from the various sensors of the control system 1276.

In some forms, the processing system 1286 may receive measurements recorded by the orientation sensor 1284 and/or the eye sensors. Based on these measured values, the processor can communicate with the display screen 1220 in order to change the image being output. For example, if the user's eyes and/or the user's head pivots in the superior direction, the display screen 1220 may display a more superior portion of the virtual environment (e.g., in response to direction from the processing system 1286).

5.4 Additional Aspects of the Present Technology

FIGS. 7A-7D show a head-mounted display system 1000 according to examples of the present technology. In this example the head-mounted display system 1000 includes a head-mounted display unit 1200 configured to be compact in form. The head-mounted display system 1000 includes an interfacing structure comprising a face engaging portion 1110 configured to contact the user's face in use and a connection flange portion 1118 arranged to support the face engaging portion. Between the head-mounted display unit 1200 and the face engaging portion 1110 is a shroud 7000. The shroud 7000 acts to support the head-mounted display unit 1200 relative to the face engaging portion 1110 as described herein. The shroud 7000 comprises a posterior portion 7002 connected to the face engaging portion 1110 and an anterior portion 7004 defining a viewing opening through which a display of the head-mounted display unit 1200 may be viewed in use. The shroud 7000 further comprises a radially outward facing light-blocking surface 7006 extending between the posterior portion 7002 and the anterior portion 7004.

Referring to FIG. 7C, the face engaging portion 1110 comprises a forehead portion 1112 configured to cross the sagittal plane of the user's head and engage at least a portion of the user's forehead, in use. The face engaging portion 1110 also includes a pair of cheek portions 1114 provided on respective sides of the user's nose in use and configured to engage the user's cheeks in use. Lateral portions 1116 of the face engaging portion extend between the forehead portion 1112 and the cheek portions 1114 and are configured to engage sides of the user's face lateral of the user's eyes, in use. Referring to FIG. 7D along with FIG. 10A, a nasal portion 1115 may be seen bridging between the cheek portions 1114 and configured to extend around (or over) and/or engage the user's nose, in use.

In examples, the face engaging portion 1110 may comprise an elastomer (e.g., silicone). In some examples, a textile may be provided to the elastomer to provide a user contacting surface.

The face engaging portion is configured to contact the user's face around a periphery of the user's eyes, in use. The face engaging portion 1110 may engage the user's face at regions overlying the user's nose, maxilla, zygomatic bones, sphenoid bones and frontal bones. The face engaging portion 1110 may engage the user's face in regions shown in FIG. 4D, for example.

FIG. 8 shows an alternative example of a compact head-mounted display unit 1200, in this example shaped to be concave in form when facing in a posterior direction (i.e., towards the user). In this example, the anterior portion 7004 is shaped to be complementary with the head-mounted display unit 1200. For example, the anterior portion 7004 may have a convex shape that is complementary to the concave shape of the head-mounted display unit 1200, as shown in FIG. 8.

In examples, different portions of the face engaging portion 1110 may have different functional characteristics in order to improve anthropomorphic compliance to variations between users. For example, anthropomorphic variation in the forehead portion 1112 and/or cheek portions 1114 may be lower than in the lateral portions. As shown in FIGS. 9, 9A-1, and 9B-1, the face engaging portion 1110 generally comprises a flange in the form of a connection flange portion 1118 provided to an interface chassis 1102 at a non-user contacting portion thereof and supporting a loop portion (e.g., curved section with a free end) 1120 forming a user-contacting portion which provides a face contacting surface to the user. A cushion (e.g., foam) 1130 may be provided within the interior of the loop portion 1120. The size of the cushion 1130 may vary in different regions of the face engaging portion 1110. For example, the cushion 1130 in the forehead portion 1112 may be larger than the cushion in the lateral portions 1116, as shown in FIGS. 9 to 9B-1.

In an example where the loop portion of the face engaging portion forms a closed shape, the user-contacting portion may be a side of the closed shape configured to contact the user, and the non-user-contacting portion may be an opposite side not arranged to contact the user. In such examples, the interface chassis (described below) may be configured to connect to the non-user-contacting portion of the face-engaging portion.

In the illustrated example of FIG. 9, the cross-section of the lateral portions 1116 of the face engaging portion 1110 may be different to that of the forehead portion 1112 and/or cheek portions 1114. For example, the aspect-ratio of the cross-section of the lateral portions 1116 may be higher than that of the forehead portion 1112 and/or cheek portions 1114. Further, as shown in FIG. 9B-1, the connection flange portion 1118 in the lateral portions 1116 may be configured to tie the loop portion 1120 more lightly to the interface chassis 1102 than in the forehead portion 1112 and/or cheek portions 1114 (for example, by using a lower thickness of material). That is, the connection flange portion 1118 may be thinner in the lateral portion 1116 than in the forehead portion 1112 and/or cheek portions 1114. With such arrangement, the lateral portions 1116 may have increased flexibility (e.g., decreased stiffness) as compared to the forehead portion 1112 and/or cheek portions 1114 which may facilitate the lateral portions in conforming to variations of the contours along lateral portions of different users' faces.

In further examples, additional chord length may be provided to enhance anthropomorphic compliance and thus user comfort and/or light-blocking effectiveness across a broader range of users by providing the connection flange portion 1118 with a desired shape. For example, the connection flange portion 1118 in the lateral portions 1116 may have a concertina section 1134 as shown in the example of FIG. 9B-3, or the connection flange portion 1118 in the lateral portions 1116 may have an arc section 1136 as shown in the example of FIG. 9B-4.

Referring to FIG. 10A, the interfacing structure (e.g., face engaging portion 1110) may be connected to the interface chassis 1102 to form an interface assembly 1150. In examples, the interface chassis 1102 comprises a forehead portion 1103, cheek portions 1104, a nasal portion 1105, and lateral portions 1106 and generally has a shape that corresponds to a shape of the face engaging portion such that the interface chassis is coextensive with the face engaging portion along the regions of the user's face (e.g., around the periphery of the user's eyes).

In examples, the lateral portions 1106 of the interface chassis 1102 each comprise a superior lateral portion 1107 and an inferior lateral portion 1108. In this example, the forehead portion 1103 and inferior lateral portions 1108 have lower rigidity (e.g., greater flexibility) than the cheek portions, 1104, nasal portion 1105, and superior lateral portions 1107 which enables the interface chassis 1102 to have a desired flexibility and a desired rigidity in certain regions.

Still referring to FIG. 10A, the interface assembly 1150 may be connected to a frame assembly 7250 to form a head-mounted display support assembly 1400 configured to support a head-mounted display unit in use. The head-mounted display support assembly 1400 may connect to a positioning and stabilising structure (e.g., as described elsewhere in this disclosure) to hold the head-mounted display unit in an operational position in front of a user's face. The frame assembly 7250 may include a skeletal frame 7100 and a light-blocking surface 7006 (not shown in FIG. 10A, 11A, 12A or 13A) provided to the skeletal frame (the frame assembly may also be referred to as a shroud). The interface assembly 1150 (e.g., interface chassis 1102) may connect to the frame assembly 7250 (e.g., skeletal frame 7100) at a plurality of discrete locations which may allow at least some portions of the interface assembly 1150 to remain movable relative to at least some portions of the frame assembly 7250. In an example, the interface assembly 1150 may include interface attachment points 1152 oriented and configured to connect to frame attachment points 7252 on the frame assembly 7250.

In examples, the skeletal frame 7100 comprises a posterior portion 7110 connected to the face engaging portion 1110 via interface chassis 1102, and an anterior portion 7150 defining a viewing opening through which the display may be viewed in use. The posterior portion 7110 of the skeletal frame comprises a forehead portion 7112 crossing the sagittal plane of the user's head in use, and a pair of lateral portions 7114 extending from the forehead portion 7122 in an inferior direction. Each lateral portion 7114 comprises a superior lateral portion 7116 and an inferior lateral portion 7118. The anterior portion 7150 comprises a superior portion 7152 and an inferior portion 7154. In this example, the lateral portions 7114 (e.g., the inferior lateral portions 7118) of the posterior portion 7110 extend anteriorly to connect to the inferior portion 7154 of the anterior portion 7150 of the skeletal frame 7100. The anterior portion 7150 may connect directly or indirectly to the head-mounted display unit.

In this example, the anterior portion 7150 of the skeletal frame has greater rigidity (e.g., lesser flexibility) than the posterior portion 7110 and/or lateral portions 7114 (e.g., the anterior portion may comprise a material having greater rigidity than a material of the posterior portion 7110 and/or lateral portions 7114).

With regards to the interface chassis 1102 and the skeletal frame 7100, in examples, portions of these components may be made relatively rigid by selection of material (i.e., using a material that is semi-rigid, rigid, or relatively rigid as compared to other portions of the components) or by inclusion of a rigidising material (i.e., using a composite material where a part of the composite material is more rigid than other parts of the composite material and thereby adds rigidity to the composite material). Portions of the interface chassis and skeletal frame shown with cross hatching may be relatively rigid as compared to portions of the component shown without cross hatching.

In examples, the relatively rigid portions of the interface chassis 1102 and the skeletal frame 7100 may comprise a semi-rigid or rigid material (e.g., a thermoplastic material (e.g., a polyamide)), and the relatively flexible portions may comprise a relatively flexible thermoplastic material (e.g., Hytrel®) or an elastomer having a greater rigidity than the face engaging portion 1110. For example, referring to FIG. 10A, the anterior portion 7150 of the skeletal frame 7100 may comprise polyamide and the lateral portions 7114 may comprise Hytrel®.

In examples, the interface chassis 1102 and skeletal frame 7100 may have a rod-like or cylindrical shape, as shown in some figures. In other examples, the interface chassis 1102 and skeletal frame 7100 may have other shapes in cross-section, e.g., polygonal shapes, closed shapes with curved sides or at least some curved sides, etc.

Still referring to the example of FIGS. 10A and 10B, the skeletal frame 7100 comprises two struts 7130 extending between the posterior portion 7110 and the anterior portion 7150, laterally offset on opposing sides of a sagittal plane of the user's head in use, to provide a support structure between the posterior portion 7110 and the anterior portion 7150. The lateral portion 7114, which also extends between the posterior portion 7110 and the anterior portion 7150, may also form part of the support structure. Because of its skeletal nature, openings 7160 (only some of which are identified by reference character in the drawings) are formed between portions of the skeletal frame 7100. In examples, the openings 7160 may be covered by a light-blocking surface (i.e., shroud).

In this example, the struts 7130 are rigidised, comprising a rigidising portion 7134 in combination with a flexible portion 7132 (i.e., the flexible portion may have increased flexibility (e.g., decreased rigidity/stiffness) as compared to the rigidising portion (e.g., the flexible portion may comprise a material that has greater flexibility (e.g., lesser rigidity/stiffness) than a material of the rigidising portion)). Referring to FIG. 10B, this arrangement allows for flexure of the skeletal frame 7100 (e.g., the posterior portion 7110 and/or anterior portion 7050 may flex relative to the struts 7130, and/or the lateral portions 7114 may flex relative to the anterior portion 7150) to assist in accommodating variations in anthropomorphic characteristics of the user. The solid line shown in FIG. 10B indicates an expected average shape of the indicated portion of the skeletal frame 7100, while the dashed lines indicate exemplary limits of flexure of the indicated portion of the skeletal frame 7100 in use.

In the example shown in FIG. 11A and FIG. 11B, the forehead portion 1103 and lateral portions of the interface chassis 1102 are more flexible (e.g., have less rigidity/stiffness) than the cheek portions 1104 and nasal portion 1105. In the skeletal frame 7100, the superior lateral portions 7116 are more rigid (e.g., have less flexibility) than the inferior lateral portions 7118 and forehead portion 7112. Additionally, the rigidising portion 7134 of the struts is connected to the rigid portion of the superior lateral portions 7116. Referring to FIG. 11B, this arrangement allows for flexure of the skeletal frame 7100 (e.g., the superior lateral portions 7116 and struts 7130 may flex relative to the forehead portion 7112 and/or anterior portion 7150, and/or the inferior lateral portions 7118 may flex relative to the superior lateral portions 7116 and/or the anterior portion 7150 to assist in accommodating variations in anthropomorphic characteristics of the user. The solid line shown in FIG. 11B indicates an expected average shape of the indicated portion of the skeletal frame 7100, while the dashed lines indicate exemplary limits of flexure of the indicated portion of the skeletal frame 7100 in use.

The example as shown in FIG. 12A is substantially similar in structure to that shown in FIG. 10A. However, in the example of FIG. 12A the interface chassis 1102 and skeletal frame 7100 are configured to be connected at the cheek portions 1104 and lateral portions 1106, rather than the nasal portion 1105. Referring to FIG. 12B, this arrangement allows for flexure of the skeletal frame 7100 to assist in accommodating variations in anthropomorphic characteristics of the user. The solid line shown in FIG. 12B indicates an expected average shape of the indicated portion of the skeletal frame 7100, while the dashed lines indicate exemplary limits of flexure of the indicated portion of the skeletal frame 7100 in use.

Flexure of the interface chassis 1102 is in part enabled by pivoting of the struts 7130 relative to the posterior portion 7110 and/or the anterior portion 7150 of the skeletal frame 7100. Reference to pivotal movement should be understood to be in the sense of the relative movement of two parts, rather than requiring rotational movement of one part around a pin or shaft. In examples, the struts 7130 may comprise a flexible portion 7132 and a rigidising portion 7134. In the example shown in FIG. 12C, the rigidising portion 7134 is isolated from both the posterior portion 7110 and the anterior portion 7150 by the flexible portion 7132, providing a flexible connection at both ends which allows for pivotal movement. In the example shown in FIG. 12D, the rigidising portion 7134 is connected to a rigidised portion of the posterior portion 7110 thereby providing a relatively inflexible connection between the strut and the posterior portion, but is isolated from the anterior portion 7150 by the flexible portion 7132 (thereby providing a relatively flexible connection between the strut and the anterior portion). Thus, in the FIG. 12D example, pivotal movement of the strut 7130 relative to the posterior portion 7110 is limited or prevented, whereas pivotal movement of the strut relative to the anterior portion is enabled. FIG. 12E shows the inverse arrangement to FIG. 12D, where pivotal movement of the strut 7130 relative to the posterior portion 7110 is enabled and pivotal movement of the strut relative to the anterior portion 7150 is limited or prevented.

In the example shown in FIG. 13A and FIG. 13B, the forehead portion 1103, cheek portions 1104 and nasal portion 1105 are more rigid (e.g., have less flexibility) than the lateral portions 1106 of the interface chassis 1102. In this example, the skeletal frame 7100 comprises a central superior strut 7130 substantially aligned with the sagittal plane of the user's head in use, a first angled strut 7136 extending from a position proximal the central superior strut 7130 at the posterior portion 7110 to a position laterally offset from the central superior strut 7130 at the anterior portion 7150, and a second angled strut 7136 mirroring the first angled strut 7136. Referring to FIG. 13B, this arrangement allows for flexure of the skeletal frame 7100 to assist in accommodating variations in anthropomorphic characteristics of the user. The solid line shown in FIG. 13B indicates an expected average shape of the indicated portion of the skeletal frame 7100, while the dashed lines indicate exemplary limits of flexure of the indicated portion of the skeletal frame 7100 in use.

For example, the central superior strut 7130 and/or the first and second angled struts 7136 may pivot relative to the posterior portion 7110 and/or relative to the anterior portion 7150 of the skeletal frame. The lateral portions 7114 may also pivot relative to the anterior portion 7150.

Referring to FIG. 14A, a light-blocking surface 7006 in the form of a flexible sheet material, such as a textile or composite comprising textile, may be applied to the skeletal frame 7100 to cover the frame 7100 and provide a shroud blocking light from entering. In other examples, a material (e.g., plastic) other than textile may be used as the light-blocking surface 7006. In this example, the shroud (i.e. skeletal frame 7100 in combination with the light-blocking surface 7006) is configured to be adaptable at the posterior end to be attached to a range of interface chassis 1102 sizes through the posterior portion 7110 being made of relatively flexible material. In this example the interface chassis 1102 is relatively rigid-however it should be appreciated that some flexure may be achieved to adapt to anthropomorphic variation at each size of the interface chassis (as shown in FIG. 14B).

Referring to FIG. 15, in examples the posterior portion 7110 of the skeletal frame 7110 may be relatively rigid in comparison with that shown in FIG. 14A. However, some flexure of the interface chassis may still be achieved to adapt to anthropomorphic variation at each size of the interface chassis 1102 (as illustrated in FIG. 14B).

In examples, the face engaging portion 1110 may be configured to have a greater degree of adaptability in order to accommodate anthropomorphic change, particularly in the lateral regions, than the shroud 7000 and more particularly skeletal frame 7100 in other examples. FIG. 16 shows an example of a face engaging portion 1110, having a closed loop 1122 enclosing a cushion 1130, with superior and inferior folds 1124 providing a concertina effect.

In examples the shroud 7000, and more particularly skeletal frame 7100 may be configured to be selectively adjustable between discrete frame shape settings. In such embodiments, the face engaging portion 1110 may be configured to have a greater degree of adaptability in comparison with other examples described above.

In examples, the face engaging portion 1110 (for example, having a cross-section as shown in FIG. 16) may be manufactured flat, and shaped on assembly.

In examples, the interface chassis 1102 is integral with the skeletal frame 7100, such that the interface chassis 1102 comprises at least a portion of the posterior portion 7110 of the skeletal frame 7100. In examples, the posterior portion 7110 and lateral portions 7114 of the skeletal frame may be replaced by the interface chassis 1102. In other examples, the interface chassis 1102 may be eliminated and the face engaging portion 1110 may connect directly to the skeletal frame 7100.

As shown in FIGS. 17A-17C, according to one aspect of the present technology, the interface chassis 1102 comprises a main portion 1140 having a radially outward facing surface 1145, and a lip portion 1142 provided to a posterior end of the main portion 1140, and extending radially outward. As shown in FIG. 17B, the face engaging portion 1110 is provided to the lip portion 1142, and a posterior edge of the shroud 7000 overlaps the radially outward facing surface 1145 of the main portion 1140 of the interface chassis 1102, but not the lip portion 1142. In the example of FIG. 17C, at least one airway 1144 is provided between the interface chassis 1102 and the shroud 7000—more particularly a tortuous path between the lip portion 1142 and the shroud 7000, and the main portion 1140 and the shroud 7000.

In the example shown in FIG. 18A-18C, a perimeter flange 7070 of the shroud 7000 extends over a portion of a radially outward facing surface of the face engaging portion 1110. In the example of FIG. 18C, at least one airway 1144 is provided between the face engaging portion 1110 (and interface chassis 1102) and the shroud 7000—more particularly a tortuous path between the perimeter flange 7070 and the face engaging portion 1110, and the shroud 7000 and the interface chassis 1102.

As shown in FIG. 19A, according to one aspect of the present technology, the positioning and stabilising structure comprises a pair of temporal connectors, or lateral strap portions 1250, configured to be located on a respective lateral side of the user's head in use. In this example the lateral strap portions 1250 are configured to be connected to the shroud 7000. FIG. 19B shows an alternative example in which the lateral strap portions 1250 are connected to the head-mounted display unit 1200, with a pair of secondary lateral strap portions 1251 configured to be connected between the lateral strap portions 1250 and the shroud 7000.

In examples, as shown in FIG. 20, pivot connections 1260 may be provided between the lateral strap portions 1250 and shroud 7000. In examples the pivot connections 1260 are configured to bias the shroud 7000 to rotate in a superior direction—i.e. to increase contact pressure at a forehead portion 1112 of the face engaging portion 1110 relative to cheek portions 1114 of the face engaging portion 1110.

In other examples, the lateral strap portions 1250 may connect to other strap portions of the positioning and stabilising structure. For example, a rear strap portion may extend around a rear portion of the user's head (e.g., at or near the occipital bone) and connect to respective lateral strap portions. The lateral strap portions 1250 may also connect to a superior transverse strap portion extending over a top portion of the user's head (e.g., at or near the coronal plane) and connecting to respective lateral strap portions. In an example, a top strap may extend along the sagittal plane in use connecting between the superior transverse strap portion and a central portion of a superior edge of the shroud 7000 to help support the head-mounted display unit in the operational position.

In examples, as shown in FIGS. 21, 21-1 and 21-2, the connection flange portion 1118 of the face engaging portion 1110 may provide a concertina section to assist with adaption in response to anthropomorphic variation of the user. FIG. 21-1 shows the concertina section in a more extended position than the concertina section in FIG. 21-2.

In examples, as shown in FIG. 21A-21C, each of the lateral strap portions 1250 comprises a rigidising portion integral with the skeletal frame 7100. As seen in FIG. 21B, the rigidised lateral strap portion 1250 may comprise non-linear sections—for example an arcuate portion 1252 arcing over the user's ear. In examples, as shown in FIG. 21C and FIG. 21D, flexible and/or resilient material is disposed around the rigidised lateral strap portion 1250—in this example a textile sleeve 1253 surrounds the lateral strap portions 1250 which may comprise a semi-rigid or rigid material such as plastic, Hytrel® (thermoplastic polyester elastomer), or another similar material. In this example, cable locating features 1255 (e.g. open cable clips) are provided on a radially outward facing surface of the lateral strap portion 1250. Power and/or communication cables 1262 between the head-mounted display unit 1200 and components at the posterior of the user's head (e.g. a battery) may be secured by the cable locating features 1255 and hidden by the textile sleeve 1253.

5.5 Cleaning

In some forms, the head-mounted display system 1000 or at least a portion thereof, is designed to be used by a single user, and cleaned in a home of the user, e.g., washed in soapy water, without requiring specialised equipment for disinfection and sterilisation. Specifically, the positioning and stabilizing structure 1300 and the interfacing structure 1100 are designed to be cleaned, as they are both in direct contact with the user's head.

In some other forms, the components of the positioning and stabilizing structure 1300 and interfacing structure 1100 are used in labs, clinics and hospitals wherein a single head-mounted display may be reused on multiple persons or used during medical procedures. In each of the labs, clinics and hospitals the head-mounted displays, or relevant components thereof, can be reprocessed and be exposed to, for example, processes of thermal disinfection, chemical disinfection and sterilisation. As such, the design of the positioning and stabilizing structure and interfacing structure may need to be validated for disinfection and sterilisation of the mask in accordance with ISO17664.

Materials may be chosen to withstand reprocessing. For example, robust materials may be used in the positioning and stabilizing structure 1300 to withstand exposure to high level disinfection solutions and agitation with a brush. Further, some components of the positioning and stabilizing structure are separable, and in-use may be disconnected to improve the reprocessing efficacy.

In some examples, the interfacing structure 1100 may, in use, be in contact with the user's head and therefor may become dirty (e.g., from sweat). The interfacing structure 1100 may be designed to be removed from the display unit housing 1205, to provide the ability to remove it for cleaning and/or replacement. It may be desirable to wash the interfacing structure 1100 while not getting the positioning and stabilizing structure 1300 wet. Alternatively or in addition, the positioning and stabilizing structure 1300 may be dirty from contact with the user's head, and may be removed for cleaning and/or replacement independently of the interfacing structure 1100. In either case, this may be facilitated by allowing these components to disconnect for such a purpose.

In some examples, a cover (e.g., constructed from a textile, silicone, etc.) may be removably positioned over the interfacing structure and can be removed to be cleaned and/or replaced after each use. The cover may allow the interface structure 3400 to remain fixed to the display unit housing 1205, and still provide a surface that can be easily cleaned after being used.

5.6 External Computer

In some forms, the head-mounted display system 1000 (e.g., VR, AR, and/or MR) may be used in conjunction with a separate device, like a computer or video game console. For example, the display interface may be electrically connected to the separate device.

In some forms, at least some processing for the head-mounted display system 1000 may be performed by the separate device. The separate device may include a larger and/or more powerful processor than could be comfortably supported by the user (e.g., the processor of the separate device may be too heavy for the user to comfortably support on their head).

6 GLOSSARY

For the purposes of the present technology disclosure, in certain forms of the present technology, one or more of the following definitions may apply. In other forms of the present technology, alternative definitions may apply.

6.1 General

Ambient: In certain forms of the present technology, the term ambient will be taken to mean (i) external of the display interface and/or user, and (ii) immediately surrounding the display interface and/or user.

For example, ambient light with respect to a display interface may be the light immediately surrounding the user, e.g. the light in the same and/or adjacent room as a user, and/or natural light from the sun.

In certain forms, ambient (e.g., acoustic) noise may be considered to be the background noise level in the room where a user is located, other than for example, noise generated by the display device or emanating from speakers connected to the display device. Ambient noise may be generated by sources outside the room.

Leak: The word leak will be taken to be an unintended exposure to light. In one example, leak may occur as the result of an incomplete seal between a display unit and a users' face.

Noise, radiated (acoustic): Radiated noise in the present document refers to noise which is carried to the user by the ambient air. In one form, radiated noise may be quantified by measuring sound power/pressure levels of the object in question according to ISO 3744.

User: A person operating the display interface and/or viewing images provided by the display interface. For example, the person may be wearing, donning, and/or doffing the display interface.

6.1.1 Materials

Silicone or Silicone Elastomer: A synthetic rubber. In this specification, a reference to silicone is a reference to liquid silicone rubber (LSR) or a compression moulded silicone rubber (CMSR). One form of commercially available LSR is SILASTIC (included in the range of products sold under this trademark), manufactured by Dow Corning. Another manufacturer of LSR is Wacker. Unless otherwise specified to the contrary, an exemplary form of LSR has a Shore A (or Type A) indentation hardness in the range of about 35 to about 45 as measured using ASTM D2240

Polycarbonate: a thermoplastic polymer of Bisphenol-A Carbonate.

6.1.2 Mechanical Properties

Resilience: Ability of a material to absorb energy when deformed elastically and to release the energy upon unloading.

Resilient: Will release substantially all of the energy when unloaded. Includes e.g. certain silicones, and thermoplastic elastomers.

Hardness: The ability of a material per se to resist deformation (e.g. described by a Young's Modulus, or an indentation hardness scale measured on a standardised sample size).

'Soft' materials may include silicone or thermo-plastic elastomer (TPE), and may, e.g. readily deform under finger pressure.

'Hard' materials may include polycarbonate, polypropylene, steel or aluminium, and may not e.g. readily deform under finger pressure.

Stiffness (or rigidity) of a structure or component: The ability of the structure or component to resist deformation in response to an applied load. The load may be a force or a moment, e.g. compression, tension, bending or torsion. The structure or component may offer different resistances in different directions. The inverse of stiffness is flexibility.

Floppy structure or component: A structure or component that will change shape, e.g. bend, when caused to support its own weight, within a relatively short period of time such as 1 second.

Rigid structure or component: A structure or component that will not substantially change shape when subject to the loads typically encountered in use. An example of such a use may be setting up and maintaining a user interface in sealing relationship.

As an example, an I-beam may comprise a different bending stiffness (resistance to a bending load) in a first direction in comparison to a second, orthogonal direction. In another example, a structure or component may be floppy in a first direction and rigid in a second direction.

6.2 Materials

Closed-cell foam: Foam comprising cells that are completely encapsulated, i.e. closed cells.

Elastane: A polymer made from polyurethane.

Elastomer: A polymer that displays elastic properties. For example, silicone elastomer.

Ethylene-vinyl acetate (EVA): A copolymer of ethylene and vinyl acetate.

Fiber: A filament (mono or poly), a strand, a yarn, a thread or twine that is significantly longer than it is wide. A fiber may include animal-based material such as wool or silk, plant-based material such as linen and cotton, and synthetic material such as polyester and rayon. A fiber may specifically refer to a material that can be interwoven and/or interlaced (e.g., in a network) with other fibers of the same or different material.

Foam: Any material, for example polyurethane, having gas bubbles introduced during manufacture to produce a lightweight cellular form.

Neoprene: A synthetic rubber that is produced by polymerization of chloroprene. Neoprene is used in trade products: Breath-O-Prene.

Nylon: A synthetic polyamide that has elastic properties and can be used, for example, to form fibres/filaments for use in textiles.

Open-cell foam: Foam comprising cells, i.e. gas bubbles that aren't completely encapsulated, i.e. open cells.

Polycarbonate: a typically transparent thermoplastic polymer of Bisphenol-A Carbonate.

Polyethylene: A thermoplastic that is resistant to chemicals and moisture.

Polyurethane (PU): A plastic material made by copolymerizing an isocyanate and a polyhydric alcohol and, for example, can take the form of foam (polyurethane foam) and rubber (polyurethane rubber).

Semi-open foam: Foam comprising a combination of closed and open (encapsulated) cells.

Silicone or Silicone Elastomer: A synthetic rubber. In this specification, a reference to silicone is a reference to liquid silicone rubber (LSR) or a compression moulded silicone rubber (CMSR). One form of commercially available LSR is SILASTIC (included in the range of products sold under this trademark), manufactured by Dow Corning. Another manufacturer of LSR is Wacker. Unless otherwise specified to the contrary, an exemplary form of LSR has a Shore A (or Type A) indentation hardness in the range of about 35 to about 45 as measured using ASTM D2240.

Spacer Fabric: A composite construction comprised of two outer textile substrates joined together and kept apart by an intermediate layer of monofilaments.

Spandex: An elastic fibre or fabric, primarily comprised of polyurethane. Spandex is used in trade products: Lycra.

Textile: A material including at least one natural or artificial fiber. In this specification, a textile may refer to any material that is formed as a network of interwoven and/or interlaced fibers. A type of textile may include a fabric, which is constructed by interlacing the fibers using specific techniques. These include weaving, knitting, crocheting, knotting, tatting, tufting, or braiding. Cloth may be used synonymously with fabric, although may specifically refer to a processed piece of fabric. Other types of textiles may be constructed using bonding (chemical, mechanical, heat, etc.), felting, or other nonwoven processes. Textiles created through one of these processes are fabric-like, and may be considered synonymous with fabric for the purposes of this application.

Thermoplastic Elastomer (TPE): Are generally low modulus, flexible materials that can be stretched at room temperature with an ability to return to their approximate original length when stress is released. Trade products that use TPE include: Hytrel®, Dynaflex, Medalist Thermoplastic Polyurethane (TPU): A thermoplastic elastomer with a high durability and flexibility.

6.3 Mechanical Properties

Resilience: Ability of a material to absorb energy when deformed elastically and to release the energy upon unloading.

Resilient: Will release substantially all of the energy when unloaded. Includes e.g. certain silicones, and thermoplastic elastomers.

Hardness: The ability of a material per se to resist deformation (e.g. described by a Young's Modulus, or an indentation hardness scale measured on a standardised sample size).

'Soft' materials may include silicone or thermo-plastic elastomer (TPE), and may, e.g. readily deform under finger pressure.

'Hard' materials may include polycarbonate, polypropylene, steel or aluminium, and may not e.g. readily deform under finger pressure.

Stiffness (or rigidity) of a structure or component: The ability of the structure or component to resist deformation in response to an applied load. The load may be a force or a moment, e.g. compression, tension, bending or torsion. The structure or component may offer different resistances in different directions.

Floppy structure or component: A structure or component that will change shape, e.g. bend, when caused to support its own weight, within a relatively short period of time such as 1 second.

Rigid structure or component: A structure or component that will not substantially change shape when subject to the loads typically encountered in use.

As an example, an I-beam may comprise a different bending stiffness (resistance to a bending load) in a first direction in comparison to a second, orthogonal direction. In another example, a structure or component may be floppy in a first direction and rigid in a second direction.

6.4 Anatomy

The following definitions correspond references identified in FIGS. 1-2.

6.4.1 Anatomy of the Face

Ala: the external outer wall or "wing" of each nostril (plural: alar)

Alare: The most lateral point on the nasal ala.

Alar curvature (or alar crest) point: The most posterior point in the curved base line of each ala, found in the crease formed by the union of the ala with the cheek.

Auricle: The whole external visible part of the ear.

(nose) Bony framework: The bony framework of the nose comprises the nasal bones, the frontal process of the maxillae and the nasal part of the frontal bone.

Bridge (nasal): The nasal bridge is the midline prominence of the nose, extending from the Sellion to the Pronasale.

(nose) Cartilaginous framework: The cartilaginous framework of the nose comprises the septal, lateral, major and minor cartilages.

Cheilion: A point located at the corner of the mouth.

Columella: the strip of skin that separates the nares and which runs from the pronasale to the upper lip.

Columella angle: The angle between the line drawn through the midpoint of the nostril aperture and a line drawn perpendicular to the Frankfort horizontal while intersecting subnasale.

Endocanthion: The point at which the upper and lower eyelids meet, proximal to the Sellion.

Epicranius: The Epicranius, or frontal belly, refers to structures that cover the cranium.

External occipital protuberance: A protuberance on the outer surface of the occipital bone.

Frankfort horizontal plane: A line extending from the most inferior point of the orbital margin to the left tragion. The tragion is the deepest point in the notch superior to the tragus of the auricle.

Glabella: Located on the soft tissue, the most prominent point in the midsagittal plane of the forehead.

Interpupillary Distance: The distance between the centres of the pupils of the eyes.

Lateral nasal cartilage: A generally triangular plate of cartilage. Its superior margin is attached to the nasal bone and frontal process of the maxilla, and its inferior margin is connected to the greater alar cartilage.

Lip, inferior (labrale inferius): A point on the face between the mouth and supramenton, lying in the median sagittal plane.

Lip, superior (labrale superius): A point on the face between the mouth and nose, lying in the median sagittal plane.

Greater alar cartilage: A plate of cartilage lying below the lateral nasal cartilage. It is curved around the anterior part of the naris. Its posterior end is connected to the frontal process of the maxilla by a tough fibrous membrane containing three or four minor cartilages of the ala.

Nares (Nostrils): Approximately ellipsoidal apertures forming the entrance to the nasal cavity. The singular form of nares is naris (nostril). The nares are separated by the nasal septum.

Naso-labial sulcus or Naso-labial fold: The skin fold or groove that runs from each side of the nose to the corners of the mouth, separating the cheeks from the upper lip.

Naso-labial angle: The angle between the columella and the upper lip, while intersecting subnasale.

Otobasion inferior: The lowest point of attachment of the auricle to the skin of the face.

Otobasion superior: The highest point of attachment of the auricle to the skin of the face.

Pronasale: the most protruded point or tip of the nose, which can be identified in lateral view of the rest of the portion of the head.

Philtrum: the midline groove that runs from lower border of the nasal septum to the top of the lip in the upper lip region.

Pogonion: Located on the soft tissue, the most anterior midpoint of the chin.

Ridge (nasal): The nasal ridge is the midline prominence of the nose, extending from the Sellion to the Pronasale.

Sagittal plane: A vertical plane that passes from anterior (front) to posterior (rear). The midsagittal plane is a sagittal plane that divides the body into right and left halves.

Sellion: Located on the soft tissue, the most concave point overlying the area of the frontonasal suture.

Septal cartilage (nasal): The nasal septal cartilage forms part of the septum and divides the front part of the nasal cavity.

Subalare: The point at the lower margin of the alar base, where the alar base joins with the skin of the superior (upper) lip.

Subnasal point: Located on the soft tissue, the point at which the columella merges with the upper lip in the midsagittal plane.

Supramenton: The point of greatest concavity in the midline of the lower lip between labrale inferius and soft tissue pogonion.

Superciliary arch: A protuberance of the frontal bone above the eye.

Temporalis muscle: A muscle in the temporal fossa that serves to raise the lower jaw.

Temporomandibular joint: A freely moveable joint between the temporal bone and mandible that allows for the opening, closing, protrusion, retraction, and lateral movement of the mandible.

Vermillion, upper: A red part of the lips covered with stratified squamous epithelium which is in continuity with the oral mucosa of the gingivolabial groove.

6.4.2 Anatomy of the Skull

Frontal bone: The frontal bone includes a large vertical portion, the squama *frontalis*, corresponding to the region known as the forehead.

Lateral cartilage: Portion of cartilage lateral of the Septal cartilage and inferior to the Nasal bones.

Mandible: The mandible forms the lower jaw. The mental protuberance is the bony protuberance of the jaw that forms the chin.

Masseter minor: A lower portion of the Masseter muscle of which raises the lower jaw.

Maxilla: The maxilla forms the upper jaw and is located above the mandible and below the orbits. The frontal process of the maxilla projects upwards by the side of the nose, and forms part of its lateral boundary.

Nasal bones: The nasal bones are two small oblong bones, varying in size and form in different individuals; they are placed side by side at the middle and upper part of the face, and form, by their junction, the "bridge" of the nose.

Nasion: The intersection of the frontal bone and the two nasal bones, a depressed area directly between the eyes and superior to the bridge of the nose.

Occipital bone: The occipital bone is situated at the back and lower part of the cranium. It includes an oval aperture, the foramen magnum, through which the cranial cavity communicates with the vertebral canal. The curved plate behind the foramen magnum is the squama occipitalis.

Orbit: The bony cavity in the skull to contain the eyeball.

Parietal bones: The parietal bones are the bones that, when joined together, form the roof and sides of the cranium.

Septal cartilage: Cartilage of the nasal septum.

Sphenoid bone: A wedge shaped bone of the base of the cranium.

Supraorbital foramen: An opening in the inferior bone of the orbit for the passage of the Supraorbital nerve, artery and vein.

Temporal bones: The temporal bones are situated on the bases and sides of the skull, and support that part of the face known as the temple.

Trapezius minor: A triangular-shaped superficial muscle of the upper back.

Zygomatic bones: The face includes two zygomatic bones, located in the upper and lateral parts of the face and forming the prominence of the cheek.

6.5 User Interface

Frame: Frame will be taken to mean a display housing unit that bears the load of tension between two or more points of connection with a headgear and/or a hoop. The frame may seal against the user's face in order to limit and/or prevent the ingress and/or egress of light.

Hoop: Hoop will be taken to mean a form of positioning and stabilizing structure designed for use on a head. For example the hoop may comprise a collection of one or more struts, ties and stiffeners configured to locate and retain a user interface in position on a users' face for holding a display unit in an operational position in front of a user's face. Some ties are formed of a soft, flexible, elastic material such as a laminated composite of foam and fabric/textile. In some forms, the term headgear may be synonymous with the term hoop.

Membrane: Membrane will be taken to mean a typically thin element that has, preferably, substantially no resistance to bending, but has resistance to being stretched.

Seal: May be a noun form ("a seal") which refers to a structure, or a verb form ("to seal") which refers to the effect. Two elements may be constructed and/or arranged to 'seal' or to effect 'sealing' therebetween without requiring a separate 'seal' element per se.

Shell: A shell will be taken to mean a curved, relatively thin structure having bending, tensile and compressive stiffness. For example, a curved structural wall of a mask may be a shell. In some forms, a shell may be faceted. In some forms a shell may be airtight. In some forms a shell may not be airtight.

Stiffener: A stiffener will be taken to mean a structural component designed to increase the bending resistance of another component in at least one direction.

Strut: A strut will be taken to be a structural component designed to increase the compression resistance of another component in at least one direction.

Swivel (noun): A subassembly of components configured to rotate about a common axis, preferably independently, preferably under low torque. In one form, the swivel may be constructed to rotate through an angle of at least 360 degrees. In another form, the swivel may be constructed to rotate through an angle less than 360 degrees.

Tie (noun): A structure designed to resist tension.

6.6 Shape of Structures

Products in accordance with the present technology may comprise one or more three-dimensional mechanical structures, for example a mask cushion or an impeller. The three-dimensional structures may be bounded by two-dimensional surfaces. These surfaces may be distinguished using a label to describe an associated surface orientation, location, function, or some other characteristic. For example a structure may comprise one or more of an anterior surface, a posterior surface, an interior surface and an exterior surface. In another example, a seal-forming structure may comprise a face-contacting (e.g. outer) surface, and a separate non-face-contacting (e.g. underside or inner) surface. In another example, a structure may comprise a first surface and a second surface.

To facilitate describing the shape of the three-dimensional structures and the surfaces, we first consider a cross-section through a surface of the structure at a point, p. See FIG. 3A to FIG. 3E, which illustrate examples of cross-sections at point p on a surface, and the resulting plane curves. FIGS. 3A to 3E also illustrate an outward normal vector at p. The outward normal vector at p points away from the surface. In some examples we describe the surface from the point of view of an imaginary small person standing upright on the surface.

6.6.1 Curvature in One Dimension

The curvature of a plane curve at p may be described as having a sign (e.g. positive, negative) and a magnitude (e.g. 1/radius of a circle that just touches the curve at p).

Positive curvature: If the curve at p turns towards the outward normal, the curvature at that point will be taken to be positive (if the imaginary small person leaves the point p they must walk uphill). See FIG. 3A (relatively large positive curvature compared to FIG. 3B) and FIG. 3B (relatively small positive curvature compared to FIG. 3A). Such curves are often referred to as concave.

Zero curvature: If the curve at p is a straight line, the curvature will be taken to be zero (if the imaginary small person leaves the point p, they can walk on a level, neither up nor down). See FIG. 3C.

Negative curvature: If the curve at p turns away from the outward normal, the curvature in that direction at that point will be taken to be negative (if the imaginary small person leaves the point p they must walk downhill). See FIG. 3D (relatively small negative curvature compared to FIG. 3E) and FIG. 3E (relatively large negative curvature compared to FIG. 3F). Such curves are often referred to as convex.

6.6.2 Curvature of Two Dimensional Surfaces

A description of the shape at a given point on a two-dimensional surface in accordance with the present technology may include multiple normal cross-sections. The multiple cross-sections may cut the surface in a plane that includes the outward normal (a "normal plane"), and each cross-section may be taken in a different direction. Each cross-section results in a plane curve with a corresponding curvature. The different curvatures at that point may have the same sign, or a different sign. Each of the curvatures at that point has a magnitude, e.g. relatively small. The plane curves in FIGS. 3A to 3E could be examples of such multiple cross-sections at a particular point.

Principal curvatures and directions: The directions of the normal planes where the curvature of the curve takes its maximum and minimum values are called the principal directions. In the examples of FIG. 3A to FIG. 3E, the maximum curvature occurs in FIG. 3A, and the minimum occurs in FIG. 3E, hence FIG. 3A and FIG. 3E are cross sections in the principal directions. The principal curvatures at p are the curvatures in the principal directions.

Region of a surface: A connected set of points on a surface. The set of points in a region may have similar characteristics, e.g. curvatures or signs.

Saddle region: A region where at each point, the principal curvatures have opposite signs, that is, one is positive, and the other is negative (depending on the direction to which the imaginary person turns, they may walk uphill or downhill).

Dome region: A region where at each point the principal curvatures have the same sign, e.g. both positive (a "concave dome") or both negative (a "convex dome").

Cylindrical region: A region where one principal curvature is zero (or, for example, zero within manufacturing tolerances) and the other principal curvature is non-zero.

Planar region: A region of a surface where both of the principal curvatures are zero (or, for example, zero within manufacturing tolerances).

Edge of a surface: A boundary or limit of a surface or region.

Path: In certain forms of the present technology, 'path' will be taken to mean a path in the mathematical-topological sense, e.g. a continuous space curve from f(0) to f(1) on a surface. In certain forms of the present technology, a 'path' may be described as a route or course, including e.g. a set of points on a surface. (The path for the imaginary person is where they walk on the surface, and is analogous to a garden path).

Path length: In certain forms of the present technology, 'path length' will be taken to mean the distance along the surface from f(0) to f(1), that is, the distance along the path on the surface. There may be more than one path between two points on a surface and such paths may have different path lengths. (The path length for the imaginary person would be the distance they have to walk on the surface along the path).

Straight-line distance: The straight-line distance is the distance between two points on a surface, but without regard to the surface. On planar regions, there would be a path on the surface having the same path length as the straight-line distance between two points on the surface. On non-planar surfaces, there may be no paths having the same path length as the straight-line distance between two points. (For the imaginary person, the straight-line distance would correspond to the distance 'as the crow flies'.)

6.6.3 Space Curves

Space curves: Unlike a plane curve, a space curve does not necessarily lie in any particular plane. A space curve may be closed, that is, having no endpoints. A space curve may be considered to be a one-dimensional piece of three-dimensional space. An imaginary person walking on a strand of the DNA helix walks along a space curve. A typical human left ear comprises a helix, which is a left-hand helix, see FIG. 3M. A typical human right ear comprises a helix, which is a right-hand helix, see FIG. 3N. FIG. 3O shows a right-hand helix. The edge of a structure, e.g. the edge of a membrane or impeller, may follow a space curve. In general, a space curve may be described by a curvature and a torsion at each point on the space curve. Torsion is a measure of how the curve turns out of a plane. Torsion has a sign and a magnitude. The torsion at a point on a space curve may be characterised with reference to the tangent, normal and binormal vectors at that point.

Tangent unit vector (or unit tangent vector): For each point on a curve, a vector at the point specifies a direction from that point, as well as a magnitude. A tangent unit vector is a unit vector pointing in the same direction as the curve at that point. If an imaginary person were flying along the curve and fell off her vehicle at a particular point, the direction of the tangent vector is the direction she would be travelling.

Unit normal vector: As the imaginary person moves along the curve, this tangent vector itself changes. The unit vector pointing in the same direction that the tangent vector is changing is called the unit principal normal vector. It is perpendicular to the tangent vector.

Binormal unit vector: The binormal unit vector is perpendicular to both the tangent vector and the principal normal vector. Its direction may be determined by a right-hand rule (see e.g. FIG. 3L), or alternatively by a left-hand rule (FIG. 3K).

Osculating plane: The plane containing the unit tangent vector and the unit principal normal vector. See FIGS. 3K and 3L.

Torsion of a space curve: The torsion at a point of a space curve is the magnitude of the rate of change of the binormal unit vector at that point. It measures how much the curve deviates from the osculating plane. A space curve which lies in a plane has zero torsion. A space curve which deviates a relatively small amount from the osculating plane will have a relatively small magnitude of torsion (e.g. a gently sloping helical path). A space curve which deviates a relatively large amount from the osculating plane will have a relatively large magnitude of torsion (e.g. a steeply sloping helical path). With reference to FIG. 3O, since T2>T1, the magnitude of the torsion near the top coils of the helix of FIG. 3O is greater than the magnitude of the torsion of the bottom coils of the helix of FIG. 3O With reference to the right-hand rule of FIG. 3M, a space curve turning towards the direction of the right-hand binormal may be considered as having a right-hand positive torsion (e.g. a right-hand helix as shown in FIG. 3O). A space curve turning away from the direction of the right-hand binormal may be considered as having a right-hand negative torsion (e.g. a left-hand helix).

Equivalently, and with reference to a left-hand rule (see FIG. 3K), a space curve turning towards the direction of the left-hand binormal may be considered as having a left-hand positive torsion (e.g. a left-hand helix). Hence left-hand positive is equivalent to right-hand negative.

6.6.4 Holes

A surface may have a one-dimensional hole, e.g. a hole bounded by a plane curve or by a space curve. Thin structures (e.g. a membrane) with a hole, may be described as having a one-dimensional hole. See for example the one dimensional hole in the surface of structure shown in FIG. 3F, bounded by a plane curve.

A structure may have a two-dimensional hole, e.g. a hole bounded by a surface. For example, an inflatable tyre has a two dimensional hole bounded by the interior surface of the tyre. In another example, a bladder with a cavity for air or gel could have a two-dimensional hole. In a yet another example, a conduit may comprise a one-dimension hole (e.g. at its entrance or at its exit), and a two-dimension hole bounded by the inside surface of the conduit. See also the two dimensional hole through the structure shown in FIG. 3H, bounded by a surface as shown.

6.7 Other Remarks

A portion of the disclosure of this patent document contains material which is subject to copyright protection. The copyright owner has no objection to the facsimile reproduction by anyone of the patent document or the patent disclosure, as it appears in Patent Office patent files or records, but otherwise reserves all copyright rights whatsoever.

Unless the context clearly dictates otherwise and where a range of values is provided, it is understood that each intervening value, to the tenth of the unit of the lower limit, between the upper and lower limit of that range, and any other stated or intervening value in that stated range is encompassed within the technology. The upper and lower limits of these intervening ranges, which may be independently included in the intervening ranges, are also encompassed within the technology, subject to any specifically excluded limit in the stated range. Where the stated range includes one or both of the limits, ranges excluding either or both of those included limits are also included in the technology.

Furthermore, where a value or values are stated herein as being implemented as part of the technology, it is understood that such values may be approximated, unless otherwise stated, and such values may be utilized to any suitable significant digit to the extent that a practical technical implementation may permit or require it.

Unless defined otherwise, all technical and scientific terms used herein have the same meaning as commonly understood by one of ordinary skill in the art to which this technology belongs. Although any methods and materials similar or equivalent to those described herein can also be used in the practice or testing of the present technology, a limited number of the exemplary methods and materials are described herein.

When a particular material is identified as being used to construct a component, obvious alternative materials with similar properties may be used as a substitute. Furthermore, unless specified to the contrary, any and all components herein described are understood to be capable of being manufactured and, as such, may be manufactured together or separately.

It must be noted that as used herein and in the appended claims, the singular forms "a", "an", and "the" include their plural equivalents, unless the context clearly dictates otherwise.

All publications mentioned herein are incorporated herein by reference in their entirety to disclose and describe the methods and/or materials which are the subject of those publications. The publications discussed herein are provided solely for their disclosure prior to the filing date of the present application. Nothing herein is to be construed as an admission that the present technology is not entitled to antedate such publication by virtue of prior invention. Further, the dates of publication provided may be different from the actual publication dates, which may need to be independently confirmed.

The terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The subject headings used in the detailed description are included only for the ease of reference of the reader and should not be used to limit the subject matter found throughout the disclosure or the claims. The subject headings should not be used in construing the scope of the claims or the claim limitations.

Although the technology herein has been described with reference to particular examples, it is to be understood that these examples are merely illustrative of the principles and applications of the technology. In some instances, the terminology and symbols may imply specific details that are not required to practice the technology. For example, although the terms "first" and "second" may be used, unless otherwise specified, they are not intended to indicate any order but may be utilised to distinguish between distinct elements. Furthermore, although process steps in the methodologies may be described or illustrated in an order, such an ordering is not required. Those skilled in the art will recognize that such ordering may be modified and/or aspects thereof may be conducted concurrently or even synchronously.

It is therefore to be understood that numerous modifications may be made to the illustrative examples and that other arrangements may be devised without departing from the spirit and scope of the technology.

6.8 Selected Reference Signs List

100 User
1000 Head-mounted display system
1100 Interfacing structure
1102 Chassis portion
1103 forehead portion,
1104 cheek portions,
1105 nasal portion, and
1106 lateral portions.
1107 superior lateral portion
1108 inferior lateral portion
1110 Face engaging portion
1112 Forehead portion
1114 Cheek portion
1115 Nasal portion
1116 Lateral portion
1118 Connection flange portion
1120 Loop portion
1122 Closed loop
1124 Fold
1130 Cushion
1140 Main protrusion of interface chassis
1142 Lip portion of interface chassis
1144 Airway
1200 Head-mounted display unit
1205 Display unit housing
1220 Display screen
1230 Superior face 1232 Inferior face
1234 Lateral left face
1236 Lateral right face
1238 Anterior face
1240 Lens
1250 Temporal connector
1251 Secondary lateral strap portions
1252 Arcuate portion
1253 textile sleeve
1254 Eyelet
1255 cable locating features
1256 Adjustment portion
1258 Receiving portion
1260 Pivot connection
1262 Cable
1270 Controller
1272 Speaker
1274 Power source
1276 Control system
1278 Low power system battery
1280 Main battery
1282 Real time clock
1284 Orientation sensor
1286 Processing system
1288 Battery support portion
1290 Control system support
1300 Positioning and stabilising structure
1350 Posterior support portion
1360 Forehead support
7000 Shroud
7002 Posterior portion
7004 Anterior portion
7006 Light-blocking surface
7100 Skeletal frame
7110 Posterior portion
7112 Forehead portion
7114 Lateral portions
7116 Superior lateral portion
7118 Inferior lateral portion
7130 Strut
7132 Flexible portion
7134 Rigidised portion
7136 Angled strut
7150 Anterior portion
7152 Superior portion
7154 Inferior portion

The invention claimed is:

1. A user interface assembly for a head-mounted display system, comprising:

a face-engaging portion configured to contact the user's face around a periphery of the user's eyes, in use, the face-engaging portion including a user-contacting portion configured to contact the user and a non-user-contacting portion opposite the user-contacting portion; and an interface chassis having increased rigidity as compared to the face-engaging portion and being configured to support the face-engaging portion in use, the interface chassis being connected to the non-user-contacting portion of the face-engaging portion;

the interface chassis being configured to extend along with the face-engaging portion around the periphery of the user's eyes in use, and including a forehead portion, pair of lateral portions, pair of cheek portions, and a nasal portion, wherein the interface chassis includes at least one relatively rigid portion and at least one relatively flexible portion to permit flexing of the at least one relatively flexible portion relative to at least the at least one relatively rigid portion to accommodate anthropometric variation in users' faces, the at least one relatively rigid portion having increased rigidity as compared to the at least one relatively flexible portion, and wherein the at least one relatively rigid portion comprises a different material than the at least one relatively flexible portion.

2. The user interface assembly according to claim 1, wherein the at least one relatively rigid portion includes the nasal portion and/or the pair of cheek portions of the interface chassis, and the at least one relatively flexible portion includes the forehead portion and/or the lateral portions.

3. The user interface assembly according to claim 2, wherein the nasal portion of the interface chassis has increased rigidity as compared to the forehead portion.

4. The user interface assembly according to claim 2, wherein the pair of cheek portions of the interface chassis has increased rigidity as compared to lateral portions.

5. The user interface assembly according to claim 1, wherein the interface chassis comprises a thermoplastic material.

6. The user interface assembly according to claim 1, wherein the at least one relatively rigid portion comprises a first thermoplastic material and the at least one relatively flexible portion comprises 1) a second thermoplastic material that is less rigid that the first thermoplastic material, or 2) an elastomer material that is less rigid than the first thermoplastic material.

7. The user interface assembly according to claim 6, wherein the first thermoplastic material is a polyamide.

8. The user interface assembly according to claim 6, wherein the second thermoplastic material is Hytrel®.

9. A head-mounted display system, comprising:
a head-mounted display unit comprising a display;
a positioning and stabilising structure structured and arranged to hold the head-mounted display unit in an operational position in front of a user's face in use; and
the user interface assembly according to claim 1.

10. The user interface assembly according to claim 1, further comprising a cushion disposed between the face-engaging portion and the interface chassis to support the face-engaging portion when the face-engaging portion contacts the user's face in use.

11. The user interface assembly according to claim 10, wherein the cushion comprises foam.

12. A head-mounted display support assembly for supporting a head-mounted display unit, comprising:
an interface assembly including a face-engaging portion configured to contact the user's face around a periphery of the user's eyes, in use, the face-engaging portion including a user-contacting portion configured to contact the user and a non-user-contacting portion opposite the user-contacting portion; and
a frame assembly including an anterior portion adapted to connect to a head-mounted display unit and a posterior portion connected to the interface assembly;
the frame assembly including a support structure bridging the anterior portion and the posterior portion, wherein the support structure is configured to flex relative to the posterior portion and/or anterior portion such that the posterior portion is movable relative to the anterior portion, in use, to accommodate anthropometric variation in users' faces.

13. The head-mounted display support assembly of claim 12, wherein the posterior portion of the frame assembly includes a forehead portion and a pair of lateral portions.

14. The head-mounted display support assembly according to claim 13, wherein the anterior portion of the frame assembly has increased rigidity as compared to at least the forehead portion of the frame assembly.

15. The head-mounted display support assembly according to claim 12, wherein the support structure includes at least one strut disposed between the posterior portion and the anterior portion of the frame assembly.

16. The head-mounted display support assembly according to claim 15, wherein the strut has increased rigidity as compared to the posterior portion of the frame assembly.

17. The head-mounted display support assembly according to claim 15, wherein the at least one strut includes a flexible portion and a rigidising portion that provides rigidity to the strut, the rigidizing portion having increased rigidity as compared to the flexible portion.

18. The head-mounted display support assembly according to claim 15, wherein the at least one strut has a first flexible connection with the posterior portion and a second inflexible connection with the anterior portion, the first flexible connection being relatively flexible as compared to the second inflexible connection.

19. The head-mounted display support assembly according to claim 15, wherein the at least one strut is disposed between the forehead portion and the anterior portion of the frame assembly.

20. The head-mounted display support assembly according to claim 12, wherein the interface assembly includes 1) a face-engaging portion configured to contact the user's face around a periphery of the user's eyes, in use, and 2) an interface chassis having increased rigidity as compared to the face-engaging portion and being configured to support the face-engaging portion in use.

21. The head-mounted display support assembly according to claim 20, wherein the posterior portion of the frame assembly is connected to the interface chassis.

22. The head-mounted display support assembly according to claim 12, wherein the posterior portion of the frame assembly is connected to the interface assembly only at a plurality of discrete attachment points.

23. The head-mounted display support assembly according to claim 12, wherein the frame assembly comprises a thermoplastic material.

24. A head-mounted display system, comprising:
a head-mounted display unit comprising a display;
a positioning and stabilising structure structured and arranged to hold the head-mounted display unit in an operational position in front of a user's face in use; and
the head-mounted display support assembly according to claim 12.

* * * * *